United States Patent [19]

Ertz et al.

[11] Patent Number: 5,003,577
[45] Date of Patent: Mar. 26, 1991

[54] VOICE AND DATA INTERFACE TO A VOICE-MAIL SERVICE SYSTEM

[75] Inventors: Douglas J. Ertz; Larry A. Friedman, both of Boulder; William Katamura, Lafayette, all of Colo.; Cheuk W. Kwok, Sudbury, Mass.; David J. Marinelli, Louisville, Colo.

[73] Assignee: AT&T Bell Laboratories, Murray Hill, N.J.

[21] Appl. No.: 334,050

[22] Filed: Apr. 5, 1989

[51] Int. Cl.[5] .......................... H04J 3/06; H04J 3/12; H04M 3/50; H04M 11/00
[52] U.S. Cl. .................................... 379/89; 370/60.1; 370/61; 370/105.2; 379/94; 379/96
[58] Field of Search ................... 379/89, 88, 94, 96; 370/60.1, 61, 62, 94.2, 105.2, 110.1

[56] References Cited

U.S. PATENT DOCUMENTS

| | | | |
|---|---|---|---|
| 4,581,486 | 4/1986 | Matthews et al. | 379/88 |
| 4,612,416 | 9/1986 | Emerson et al. | 379/88 |
| 4,646,346 | 2/1987 | Emerson et al. | 379/214 |
| 4,748,656 | 3/1988 | Gibbs et al. | 379/93 |
| 4,763,356 | 8/1988 | Day, Jr. et al. | 379/368 |
| 4,790,003 | 12/1988 | Kepley et al. | 379/88 |
| 4,853,952 | 8/1989 | Jachmann et al. | 379/88 |

FOREIGN PATENT DOCUMENTS

| | | | |
|---|---|---|---|
| 3221683 | 12/1983 | Fed. Rep. of Germany | 379/89 |
| 0202156 | 12/1982 | Japan | 379/67 |
| 59-169262 | 9/1984 | Japan | 379/100 |
| 59-214365 | 12/1984 | Japan. | |
| 59-214366 | 12/1984 | Japan | 379/100 |

OTHER PUBLICATIONS

"Integrated Digital Switching System with Queing Storage Facility", S. Hattori et al., ICC '80, Seattle, Wash., Jun. 1980, pp. 27.4.1-27.4.5.
"ISDN in the Office-HICOM", Special Issue Telecom Report and *Siemens Magazine COM*, Dec. 1985, pp. 1-111.
S. Girishankar, "Northern to Deliver Better Meridian Mail", Communications Week, 5-23-88, p. 32.
Northern Telecom MBS Consultant Programs, Consultant Bulletin, Meredian Mail MP, p. 31 (undated).
Convergence Column, "Wang Adds Voice Products", Communications Week, Issue No. 229 (Jan. 2, 1989), p. 8.

*Primary Examiner*—Thomas W. Brown
*Attorney, Agent, or Firm*—David Volejnicek

[57] ABSTRACT

A user-access interface to a voice message service system (16) includes a voice channel (13) and a data channel (14). The data channel enables the user to interact with the voice-mail service system via a video terminal or display-equipped computer (11) and to print message headers on the terminal or display. The user can then visually scan the headers. The user can then listen to the messages or record new messages via the voice channel. The interactive interface between the terminal or computer and the voice message service system over the data channel is provided by a function (30) executing on the terminal or computer and a function (31) executing on the voice-message service system.

29 Claims, 80 Drawing Sheets

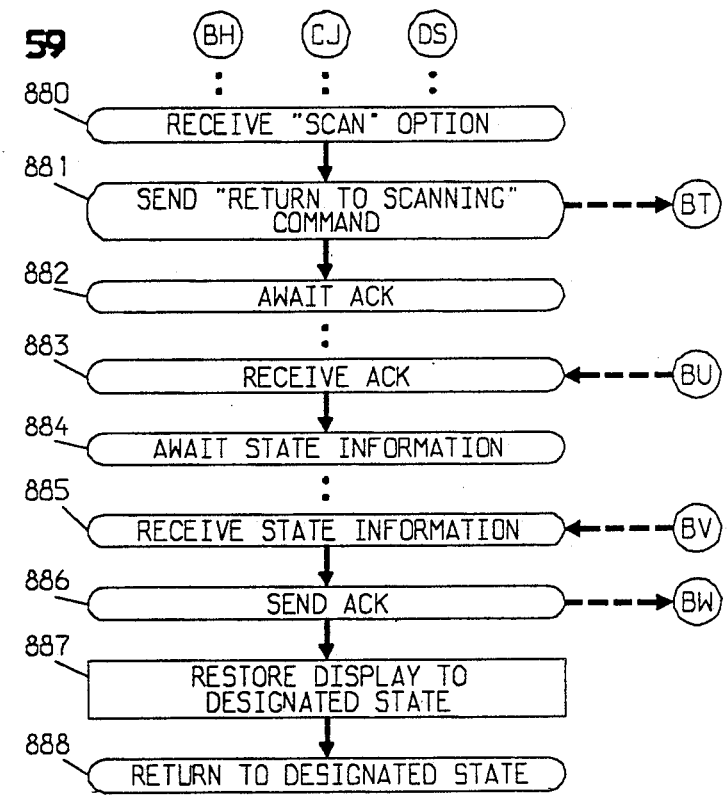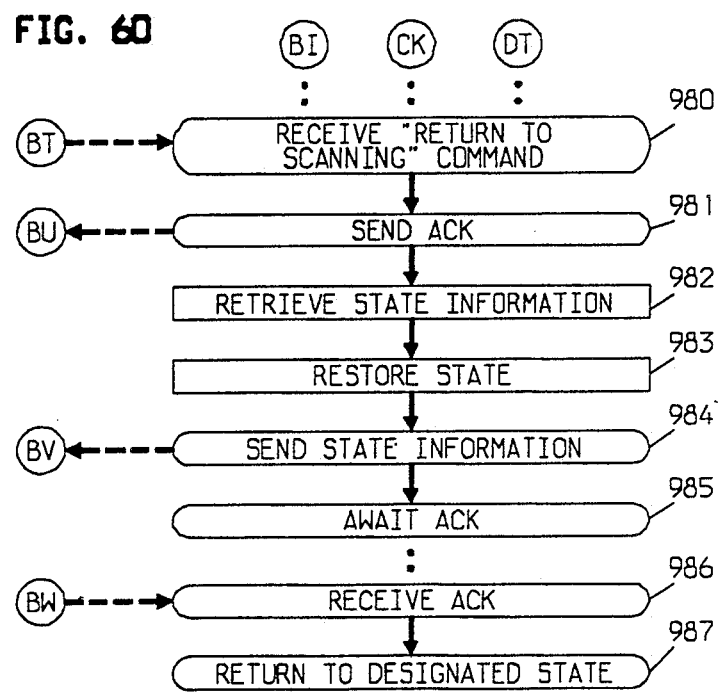

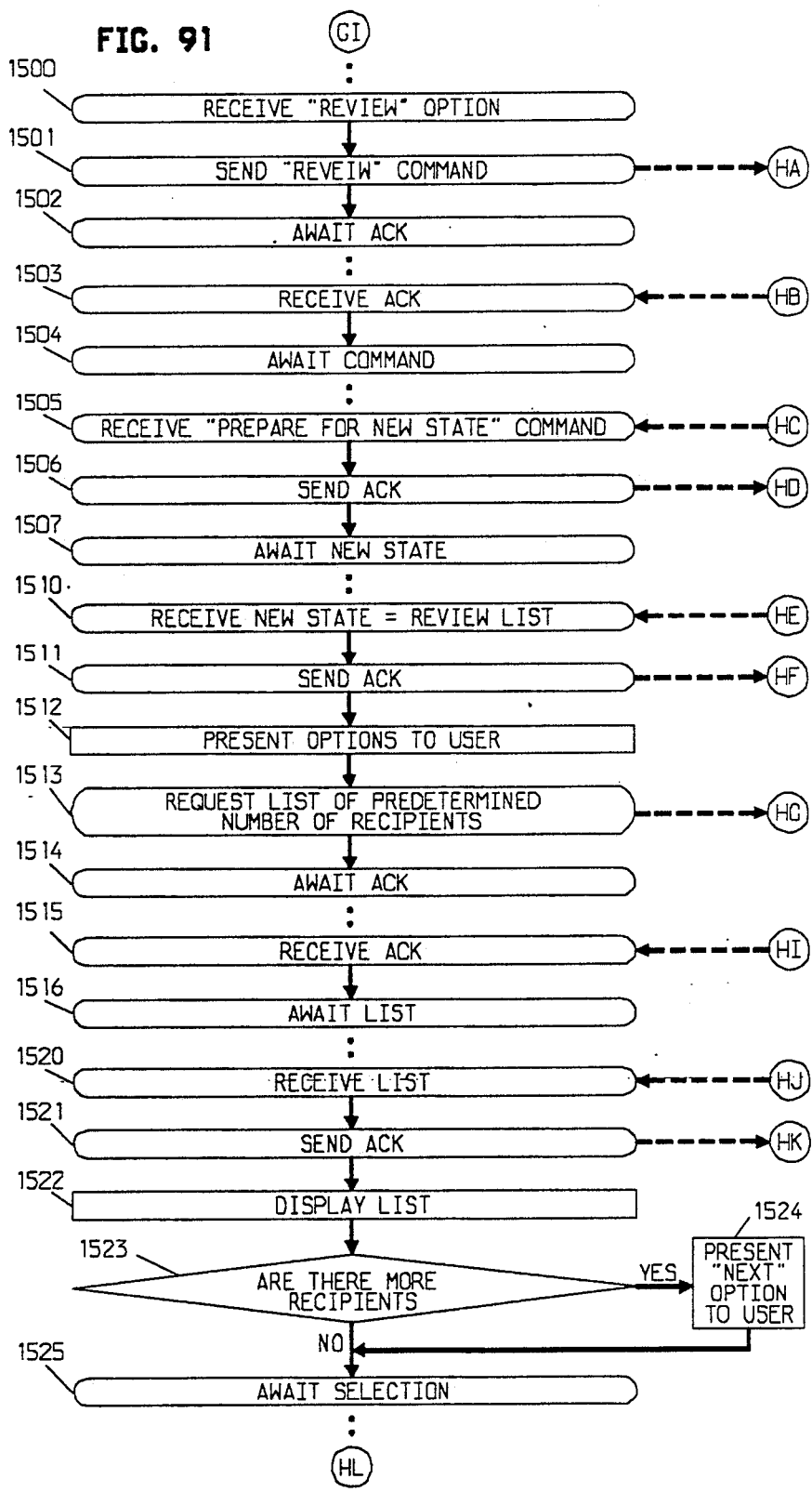

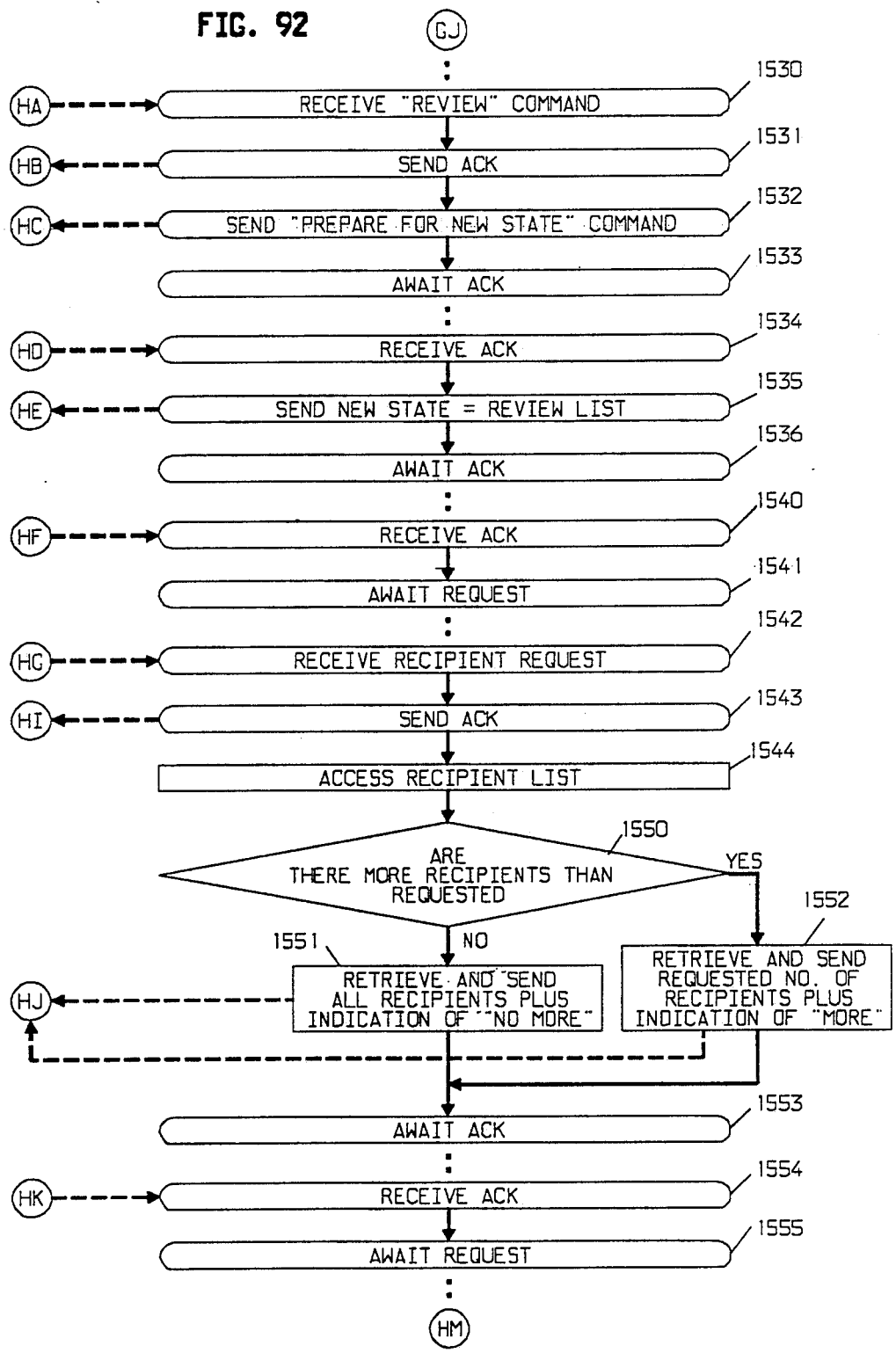

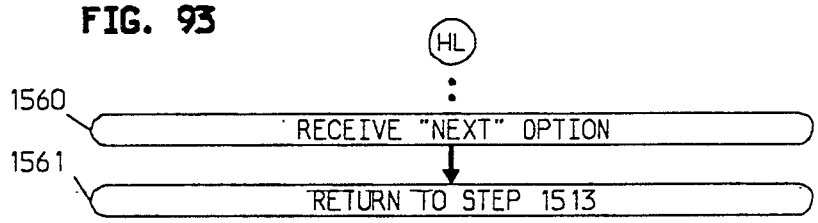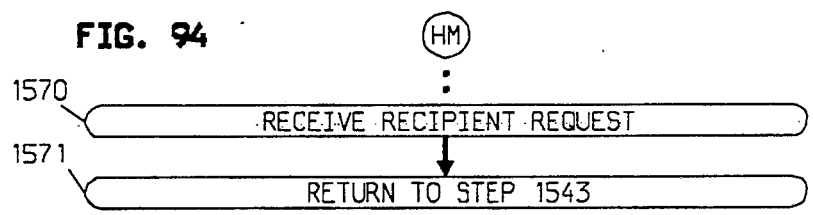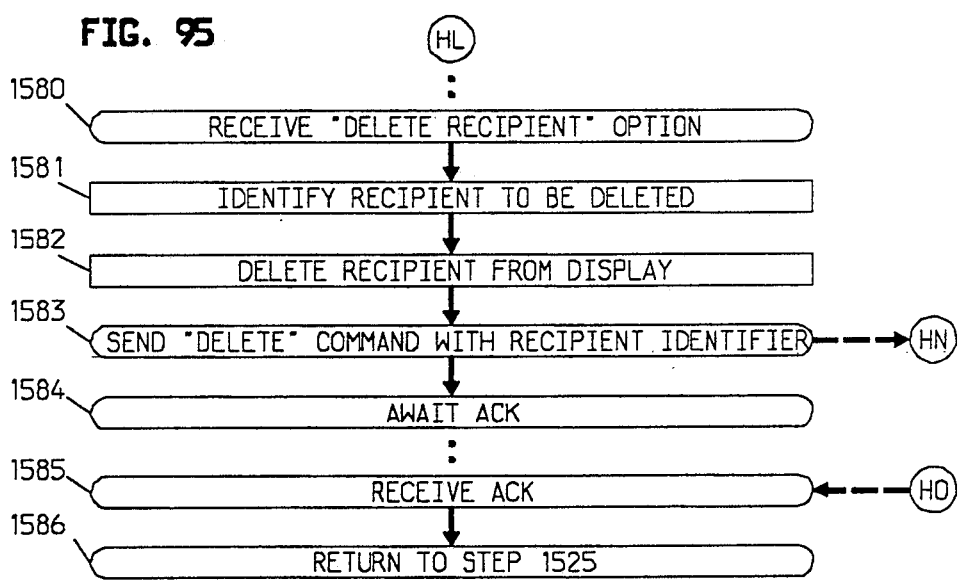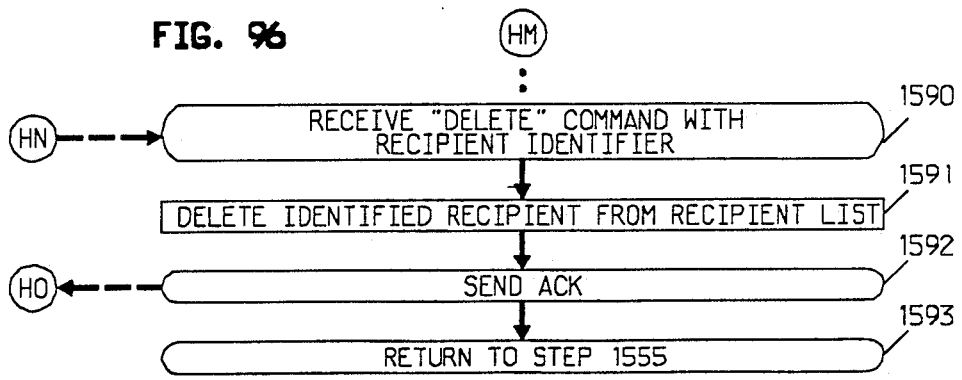

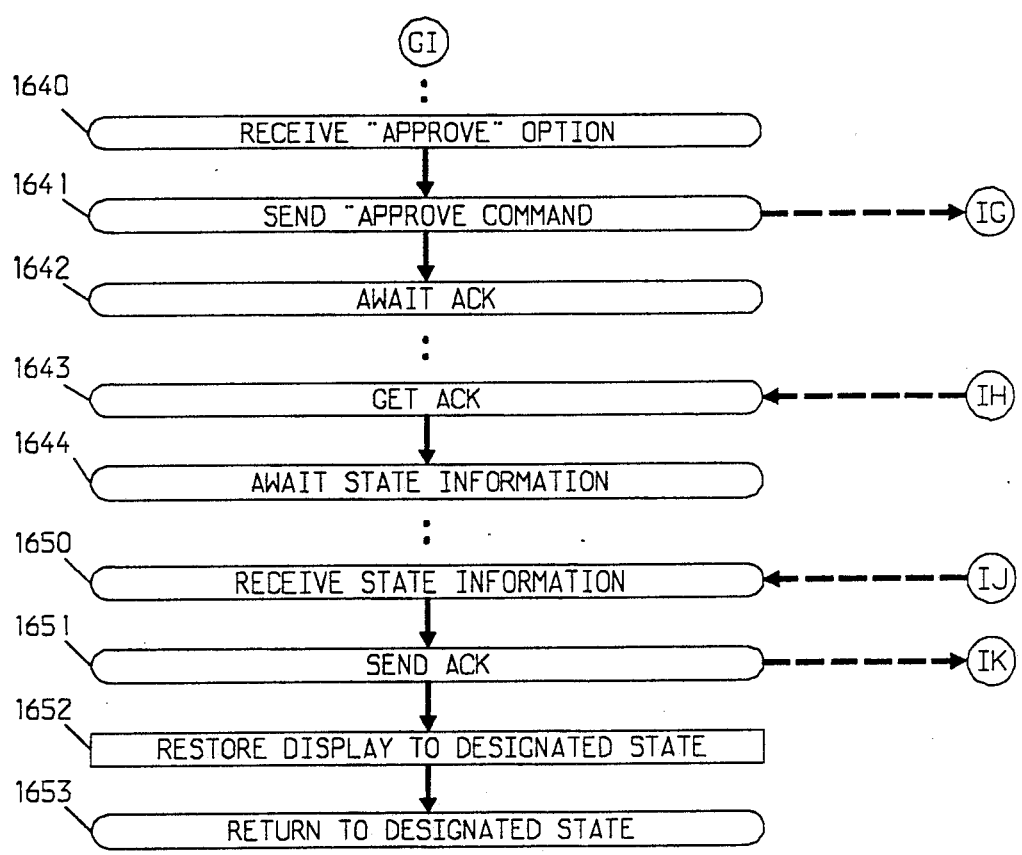

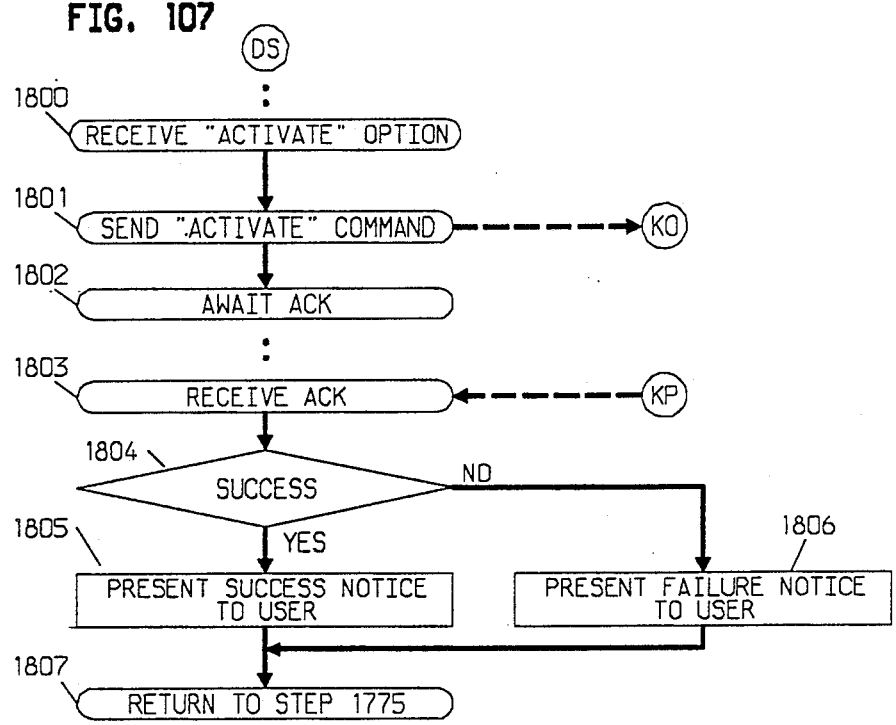
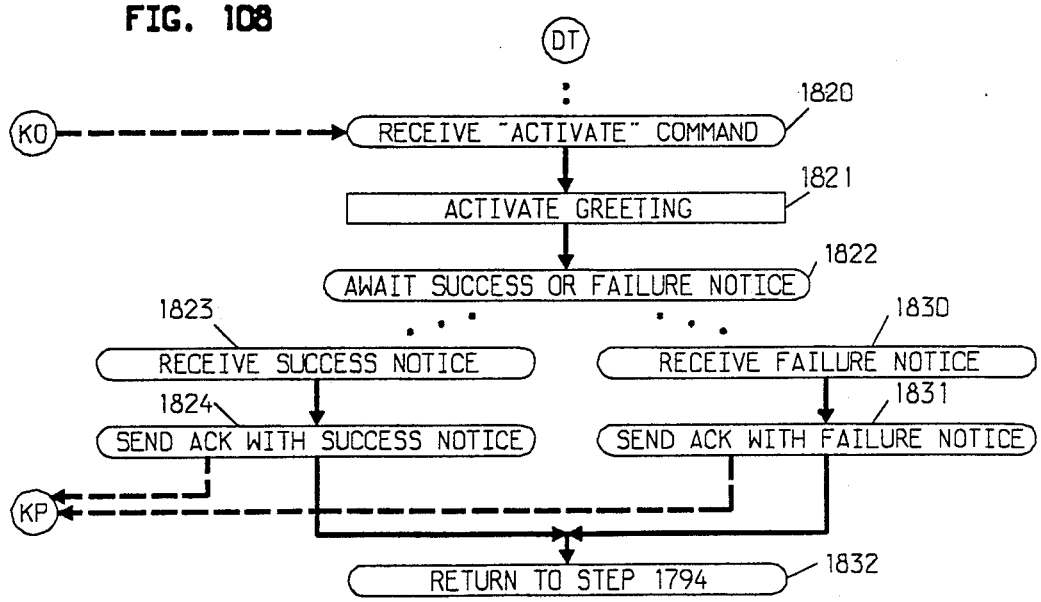

FIG. 112

NEW MESSAGE SUMMARY                      THERE ARE (NO) MORE

| FROM | EXT | DELIVERY | TIME | SOURCE |
|---|---|---|---|---|
| ☐ C ROBERSTON | 4889 | 9:00a | 3/21 | MBOX |
| ☐ M VAN-ANDEL | 4984 | 10:15a | 3/21 | CA |
| ☐ OUTSIDE CALL |  | 10:30a | 3/21 | CA |
| ☐ T QUINN | 4603 | 2:38p | 3/21 | MBOX |
| ☐ J DOE | 1111 | 3:00p | 3/21 | LWC |

(HELP AND/OR ERROR MESSAGES)

| ☐ PLAY MESSAGE | ☐ DELETE MESSAGE | ☐ MORE HEADERS | ☐ SCAN OLD | ☐ SCAN UNOPENED | ☐ RETURN TO ACTIVITY MENU |
| ☐ HELP | ☐ WAIT | ☐ DISCONNECT | ☐ DIRECTORY | ☐ TRANSFER | |

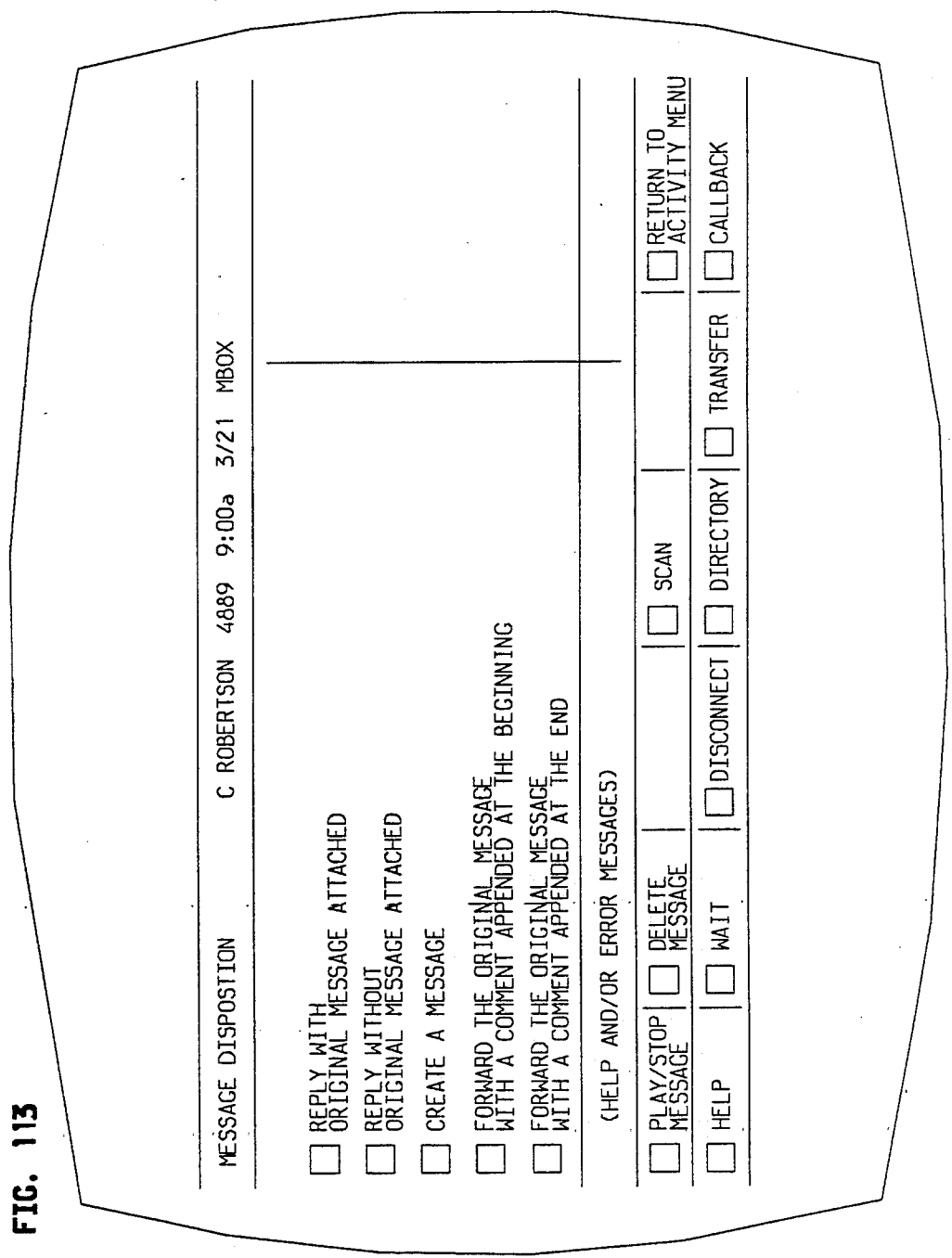

VOICE AND DATA INTERFACE TO A VOICE-MAIL SERVICE SYSTEM

TECHNICAL FIELD

This invention relates generally to voice-mail systems, and relates particularly to user interfaces to such systems.

BACKGROUND OF THE INVENTION

Voice-mail service systems are well known in the art. They principally provide to a calling party the ability to send a voice message to a called party without contacting another human being e.g., answering service operator, in the process, and enable the called party to retrieve those messages at will via his or her telephone, also without intervention of another human being. These systems also typically formulate a header for each message that identifies, e.g., when the message was received and the telephone number and/or identity of the calling party. The called party can retrieve and review the header information—for example, to determine what new messages have been received—without retrieving and listening to the messages themselves. An example of such a system, is the AT&T Audix ® voice-mail service system.

SUMMARY OF THE INVENTION

Conventional voice-mail service systems provide only an audio—i.e., telephone set—access to the voice messages and message headers stored therein. We have realized that this is unfortunate, because it is inconvenient and time-consuming for a called party to scroll through his or her message headers in voice mode, i.e., by listening to the header information.

The invention is directed to solving this and other disadvantages of the prior art. According to the invention, a combined voice and data access to the voice-mail service system is provided to users. The user-access interface to the voice-mail service system includes a voice channel or connection—the conventional voice connection, for example—plus a concurrent data channel or connection, thereby providing the user both visual and audio access to the voice mail system in a single communication session. The data connection enables the user to interact with the voice-mail service system visually via a display terminal or a display-equipped computer (such as a personal computer), supplying data control signals to the system to effect operation of the system, and receiving responses to the control signals. In particular, the user can receive and print message headers on the terminal or display, so that he or she can then visually scan the headers. The visual scanning of message headers is substantially faster for most users than voice-mode scanning. And, by means of the data connection, the user is able to access message headers (as well as the corresponding messages) in random order. Additionally, the user can then play or record messages via the voice connection under control of data control signals supplied to the system over the data connection. In contrast to a data-only interface that would require the user to retrieve or store messages in digital form, and hence would require that each user's terminal or computer be equipped with a digital-to-audio and an audio-to-digital converter, the combined voice-and-data interface allows all users to share use of the converter which is included in the voice-mail service system.

As a further advantage, the digital connection enables the provisioning of a myriad of different user-access interfaces, each customized for a given application, merely by modifying the functionality of that portion of the interface which interacts with the user(e.g., a personal-computer-resident interactive application program).

These and other advantages and features of the invention will become more apparent from the following description of an illustrative embodiment of the invention considered together with the drawing.

BRIEF DESCRIPTION OF THE DRAWING

FIGS. 3-14 are a state diagram of the operation of function 31 of FIG. 1;

Figure 1:
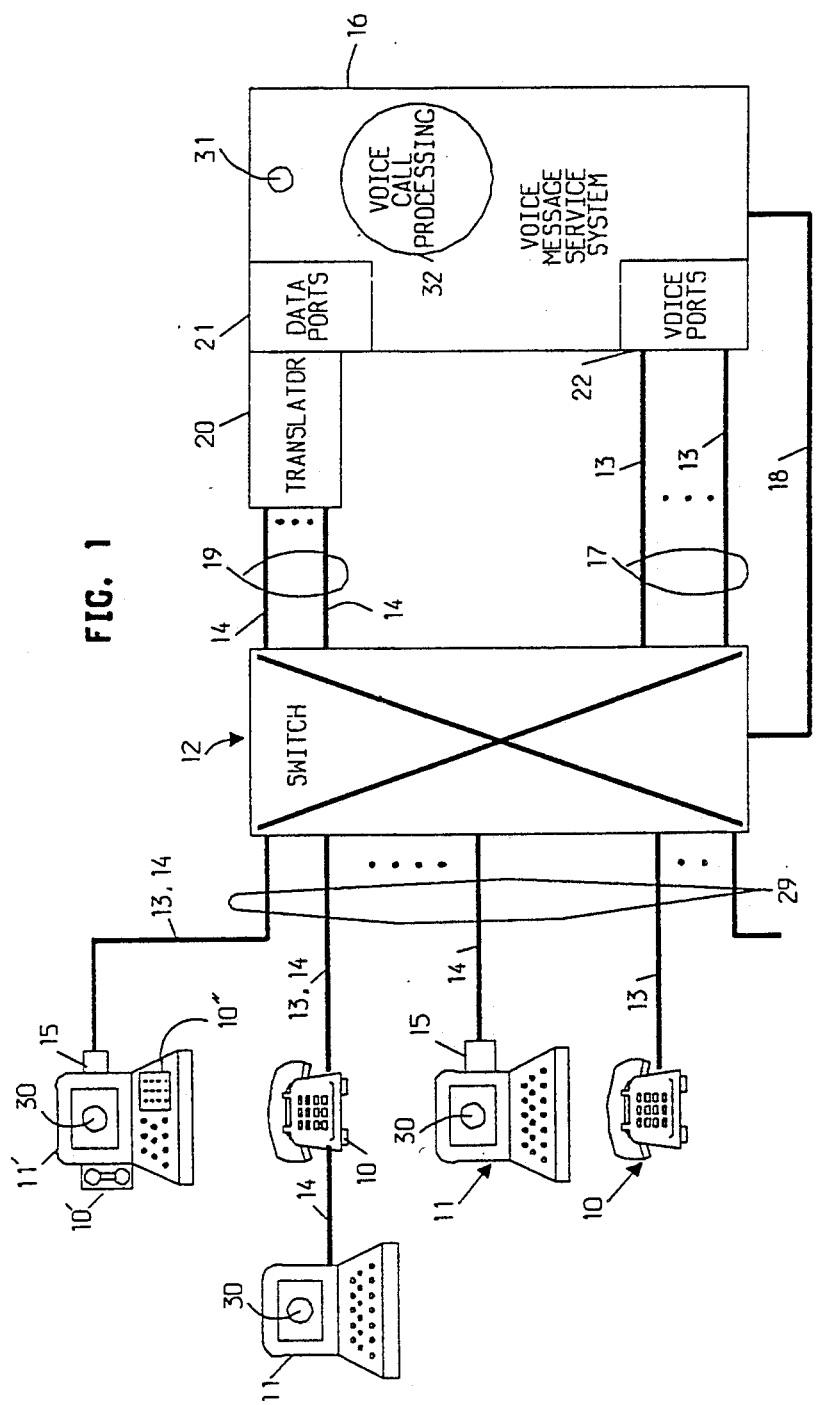
FIG. 1 is a block diagram of a voice-mail service system including an illustrative embodiment of the invention.
Figure 13:
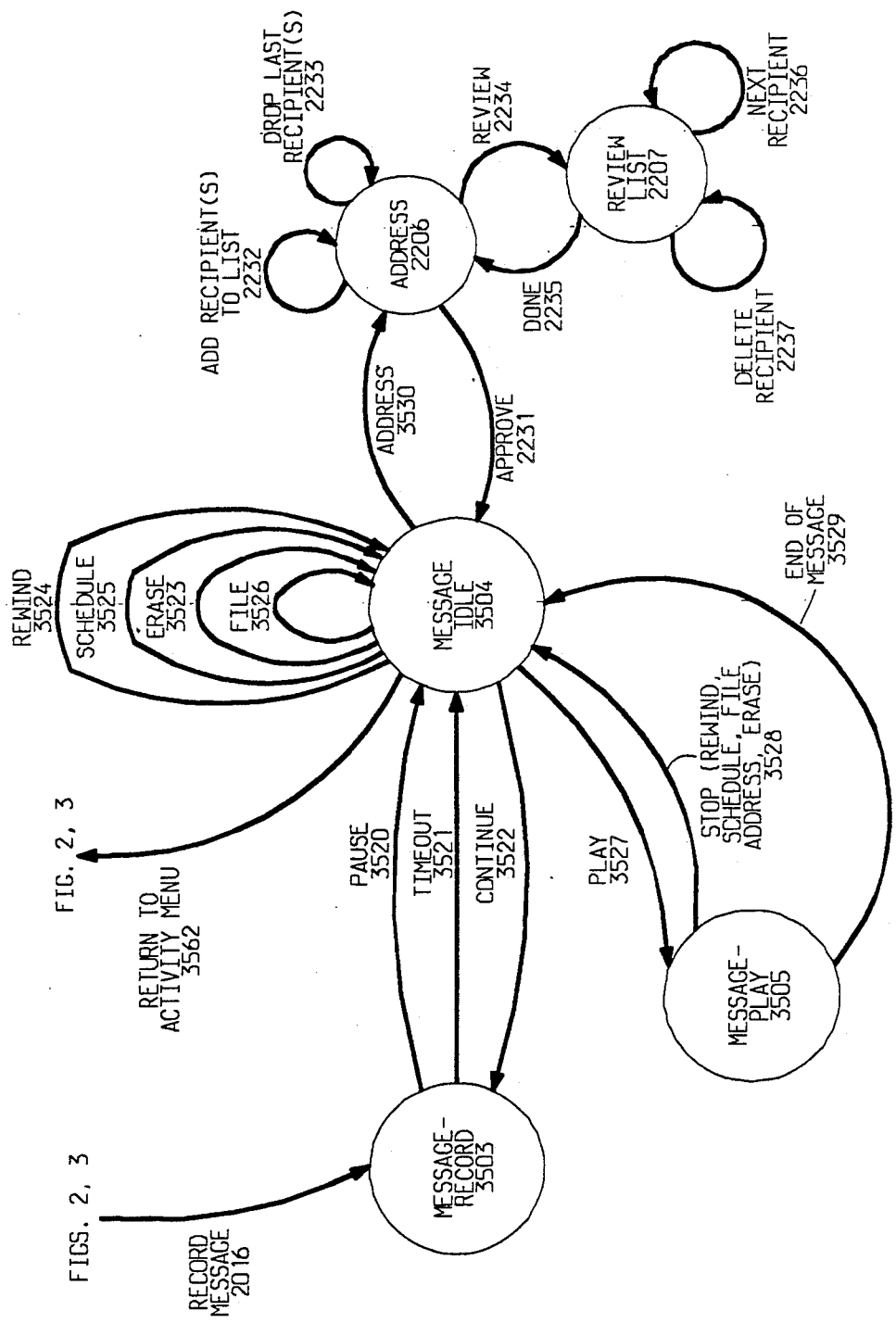
Figure 14:
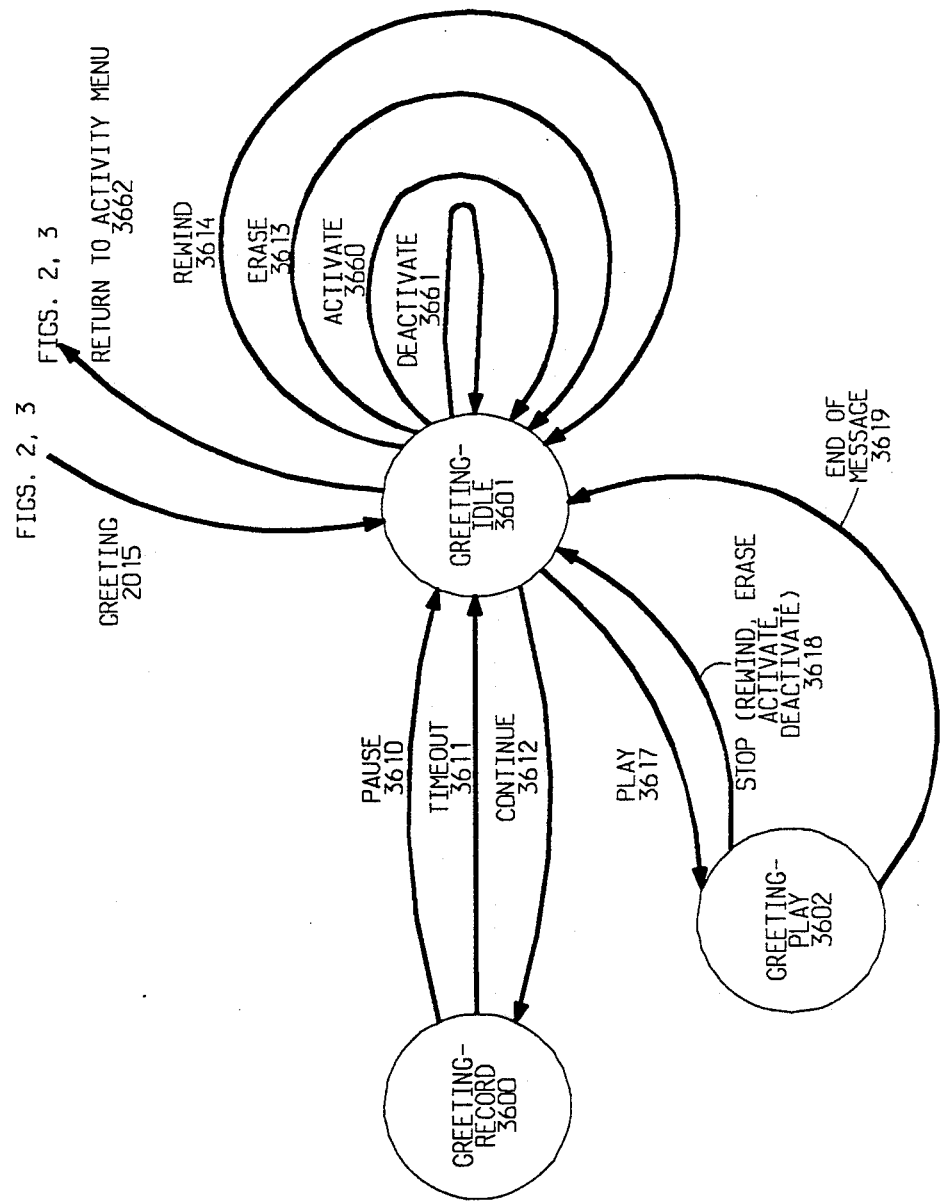
Figure 15:
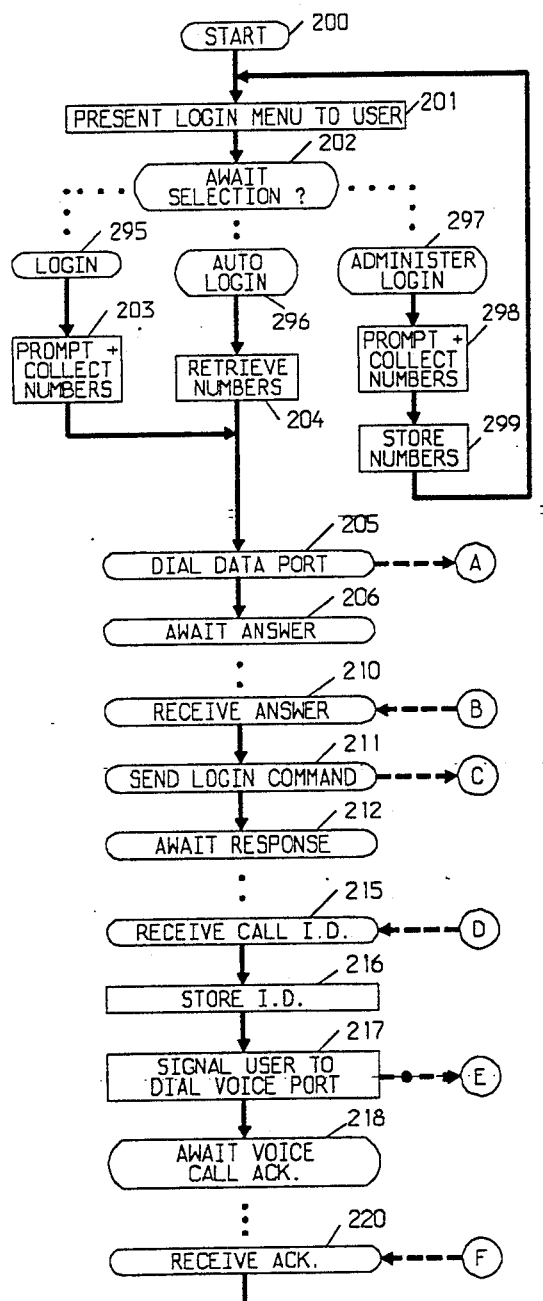
Figure 110:
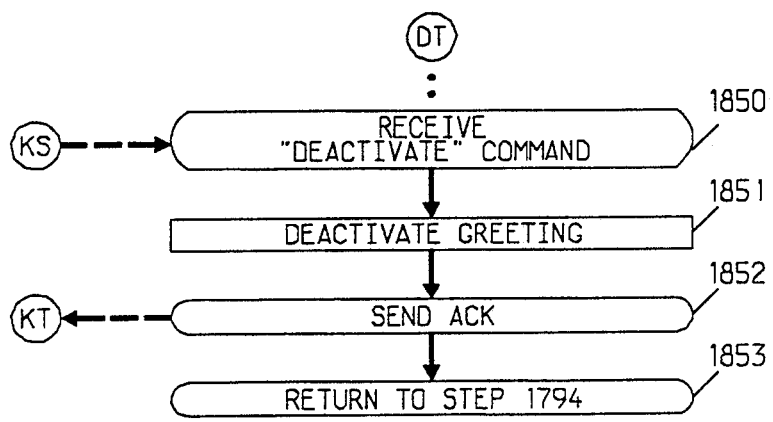

The odd-numbered ones of FIGS. 15-110 are flow diagrams of the operation of function 30 in the transitions and states of FIGS. 2 and 4-14;

The even-numbered ones of FIGS. 15-110 are flow diagrams of the operation of function 31 in the transitions and states of FIGS. 3-14 and FIGS. 111-113 show illustrative screen displays of a terminal 11 of FIG. 1.

DETAILED DESCRIPTION

FIG. 1 shows the configuration of a communication system that provides voice-mail services to users. At their premises, users are equipped with terminal equipment. The terminal equipment includes voice terminals 10, such as standard or digital telephone sets, and data terminals 11, such as personal computers (PCs) or the AT&T 510D video terminals. Alternatively, a voice terminal may even take the form of a handset 10 and a touch pad 10 incorporated into a data terminal 11. (For ease of reference, voice terminals in all forms will hereinafter be designated by the numeral 10, and data terminals in all forms will hereinafter be designated by the numeral 11.) Users, i.e., their equipment, are interconnected for communication through a switching system 12. Switching system 12 is illustratively a private branch exchange (PBX) such as the AT&T System 75 or System 85 PBX. Voice terminals 10 are connected to switching system 12 via voice channels 13, while data terminals 11 are connected to switching system 12 via data channels 14. A voice channel 13 and a data channel 14 may be carried by either separate physical links 29 or a common link 29. For example, where voice terminal 10 is a standard telephone set and data terminal 11 is a stand-alone PC or terminal, voice channel 13 may be carried by a conventional telephone loop while data channel 14 is carried by a separate data link that supports the ISDN xB+D or the AT&T DCP protocol. Alternatively, where voice terminal 10 is a digital telephone set and data terminal is a PC or a terminal coupled to that set, or where voice terminal 10 is incorporated into data terminal 11, both voice and data channels 13 and 14 are commonly carried by a single link that supports the ISDN protocol, in a conventional manner.

Data terminals 11 are coupled to links 29 either through digital telephones or through interfaces 15. An illustrative interface to a DCP link 29 is the AT&T PC/PBX interface. The PC/PBX interface and the DCP protocol are described in U.S. Pat. No. 4,748,656.

Also connected to switching system 12 is a voice-mail service system 16, illustratively the AT&T Audix voice-mail service system. The connection to system 16 is made up of voice links 17 and a control link 18 such as an AT&T DCIU protocol link—as is conventional and described in U.S. Pat. Nos. 4,646,346 and 4,612,416—plus data links 19. Voice links 17 carry voice channels 13. Data links 19 are illustratively links that support the ISDN or DCP protocol. Data links carry data channels 14. Voice links 17 are coupled to voice ports 22 of system 16 directly, whereas data links 19 are coupled to data ports 21 of system 16 by an interface 20. Interface 20 merely translates between the protocol used on data links 19 and the protocol or format that is understood or used internally by system 16. Translators of this nature are well-known in the art. If system 16 understands the protocol of links 19 directly, no interface 20 is needed. Operation of an illustrative voice-mail service system and its interface to a PBX are described in U.S. Pat. No. 4,790,003.

Figure 2:
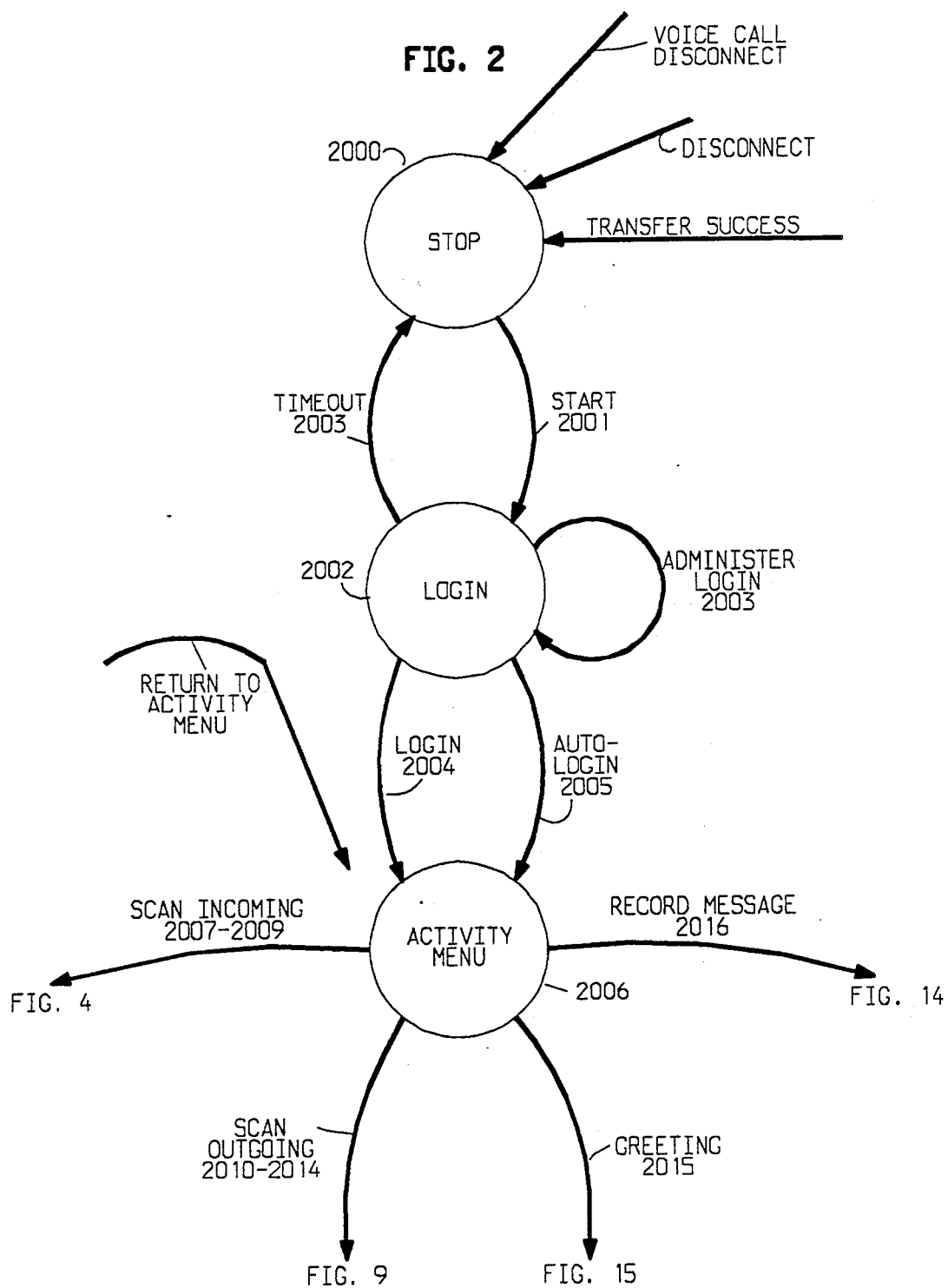
FIGS. 2 and 4-14 are a state diagram of the operation of function 30 of FIG. 1.

According to the invention, to permit communication by data terminal 11 with system 16 over data channels 14, terminal 11 includes a voice message system interface function 30. Function 30 is illustratively implemented in software. Similarly, to permit communication by system 16 with terminal 11 over data channels 14, system 16 includes a data terminal interface function 31. Function 31 is likewise illustratively implemented in software. The operation of function 30 is shown by the state diagram of FIGS. 2 and 4–14; the steps involved in those states and state transitions are shown by the flow diagrams of odd-numbered ones of FIGS. 15–110. Similarly, the operation of function 31 is shown by the state diagram of FIGS. 3–14, while the steps involved in those steps are shown by the flow diagrams of even-numbered ones of FIGS. 15–110. FIGS. 2–110 are referred to jointly in the following description of the operation of functions 30 and 31.

Illustratively, the communication protocol used between system 16 and terminal 11 has two layers above the physical layer. Layer 2 guarantees delivery of messages between system 16 and terminal 11, and notifies them if a failure occurs while trying to deliver a layer 3 message. Most acknowledgments are at layer 2 of the protocol, and command and response messages are at level 3. For purposes of simplifying the description, however, no distinction is made hereinbelow between the two layers.

Initially, function 30 is stopped, i.e., not invoked or executing, in "stop" state 2000 of FIG. 2. Upon being invoked, i.e., upon being started, function 30 makes transition 2001 to "login" state 2002. The operation of function 30 in state 2002 is shown in FIG. 15. Upon starting to execute, on data terminal 11, at step 200, function 30 presents a menu of possible login-related activities to a user of terminal 11, by displaying a login menu on the screen of terminal 11, at step 201. Function 30 then awaits the user's selection of one of the options from the login menu, at step 202. Further activities of function 30 depend upon which login menu option is selected, as indicated at step 202.

A user selects the LOGIN or AUTO-LOGIN option to establish a connection to system 16. If the user selects the LOGIN option, the user must provide the system with login information, such as the user's own phone number, the user's password to system 16, the data-link telephone number of system 16, and the voice-link telephone number of system 16. If the user selects the AUTO-LOGIN option, the login information is assumed to be stored in memory of terminal 11. Accordingly, if the LOGIN option was selected, function 30 receives the selection at step 295, and causes the user to be prompted for the requisite login information via messages displayed on the screen of terminal 11 and causes the login information to be collected from keyboard of terminal 11, at step 203. Conversely, if the AUTO-LOGIN option was selected, function 30 receives the selection at step 296 and causes the requisite login information to be retrieved from memory, at step 204. From this point on, the LOGIN and AUTO-LOGIN procedures are identical.

To originally store the requisite login information for AUTO-LOGIN purposes, the user selects at step 202 the ADMINISTER-LOGIN option. This selection causes function 30 to make a transition 2003 that does not result in a state change, as shown in FIG. 2. In response to receiving the user's selection, at step 297 of FIG. 15, function 30 causes the user to be prompted for login information and causes that information to be collected, in the same manner as at step 203, at step 298. Function 30 then stores this information in memory of terminal 11, at step 299, and returns to step 201 to re-present the login menu to the user.

Returning to the discussion of the LOGIN and AUTO-LOGIN procedures, when function 30 is in possession of the requisite login information, it initiates a data call to system 16, using the data-link telephone number of system 16 to dial a data port 21 of system 16 over data channel 14, at step 205, in a conventional manner. It then waits for the call to be answered by system 16, at step 206.

The data call that is initiated by terminal 11 over a data channel 14 is received and processed by system 12 in a conventional manner. System 12 responds to the dialed number by connecting the data call and channel 14 to system 16 via a link 19.

Figure 3:
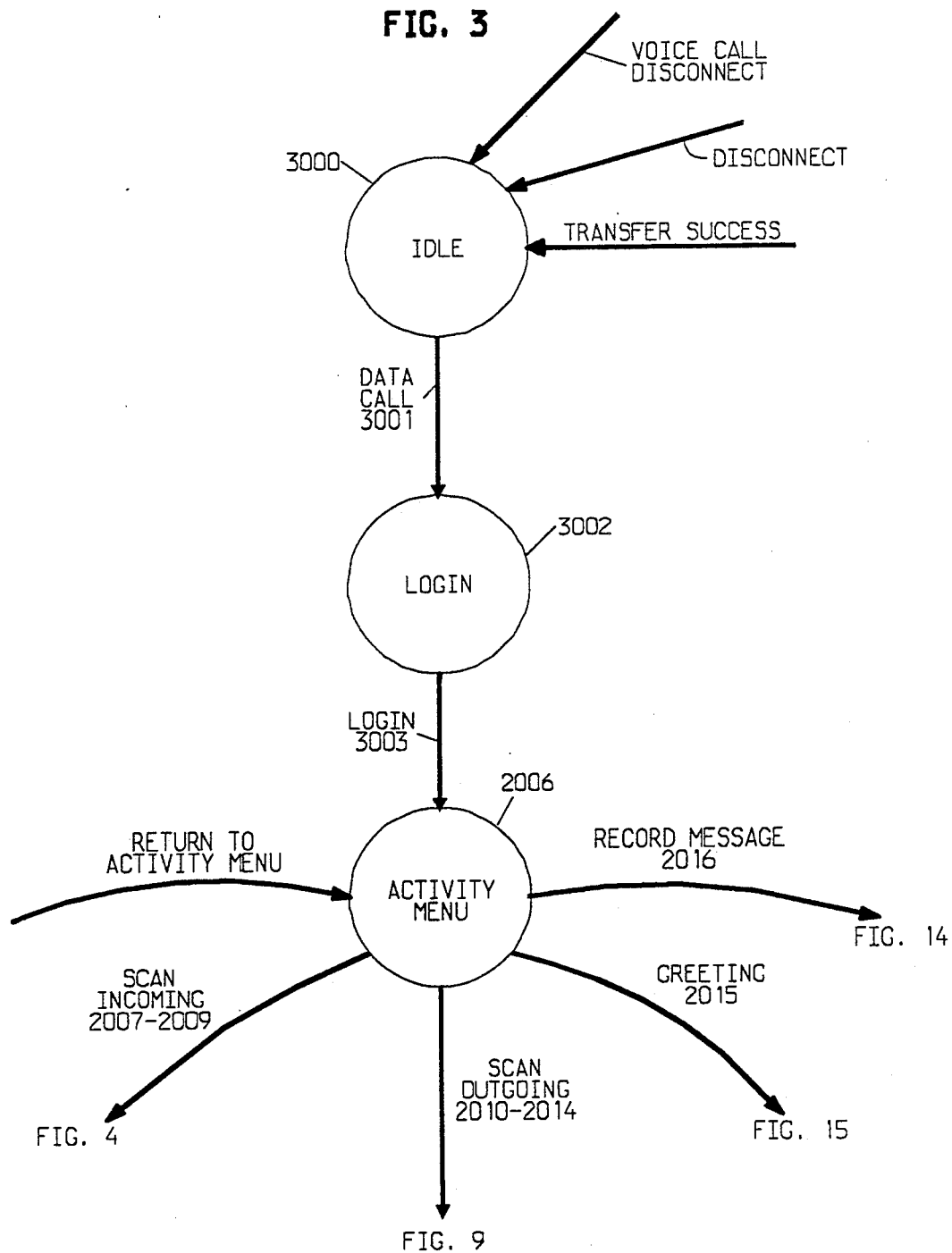
Figure 16:
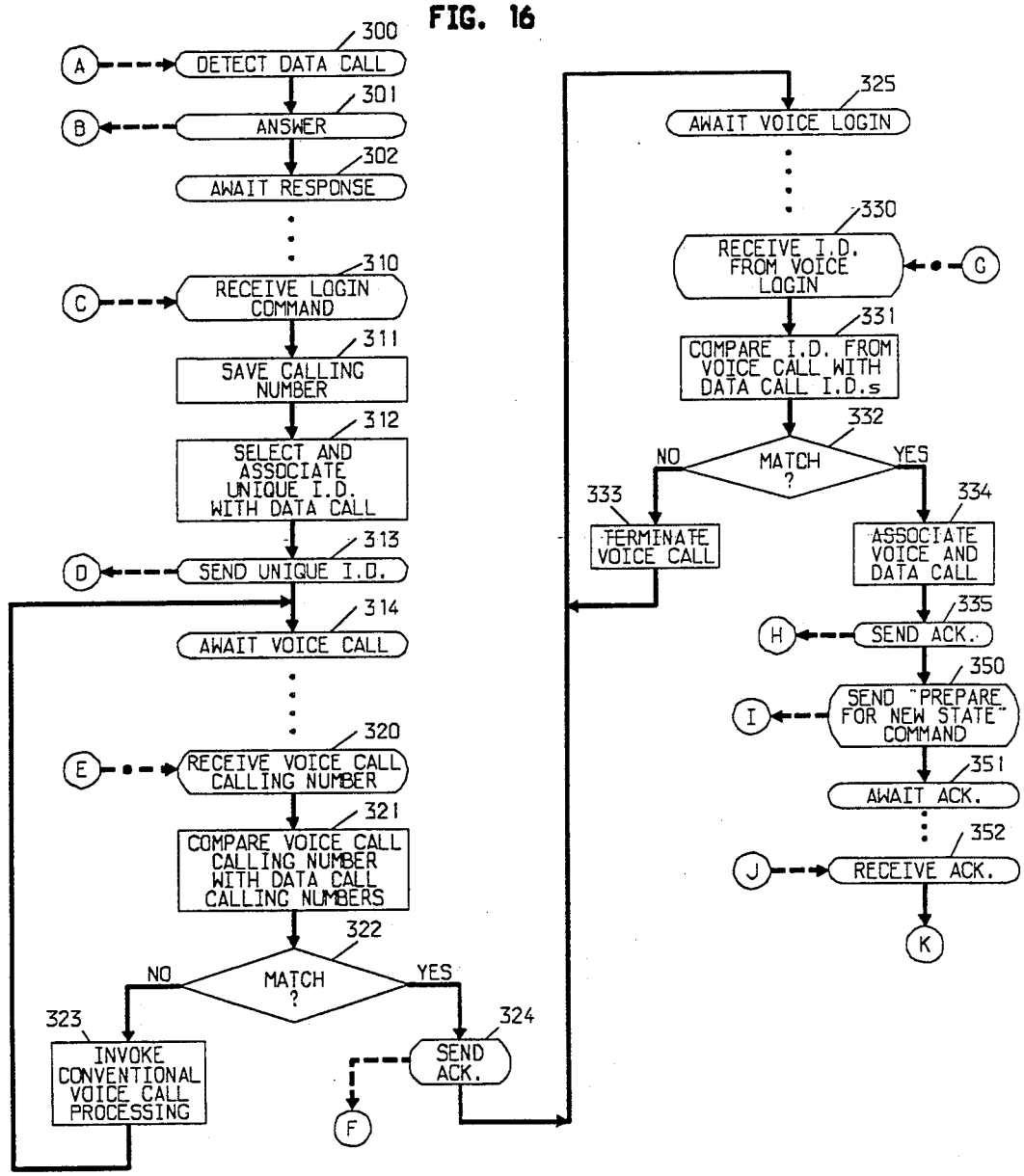

Initially, function 31 is in "idle" state 3000 of FIG. 3 and not actively executing. When function 31 of system 16 detects that a call is coming in over a link 19, it makes a transition to 3001 to begin state 3002. The operation of function 31 in state 3002 is shown in FIG. 16. Upon detecting the incoming data call in a conventional manner, at step 300, function 31 answers the call, at step 301, again conventionally. A data communication path is thus established between system 16 and terminal 11 over a channel 14 and a link 19 through system 12. Function 31 then waits for a response from the caller, at step 302.

When it receives indication that system 16 has answered the call, at step 210 of FIG. 15, and that a communication path to system 16 has thus been established, function 30 responds by sending a login command over the data path to system 16, at step 211. The command includes the calling, i.e., the user's, telephone number. Function 30 then awaits a response from system 16, at step 212.

Function 31 receives the login command at step 310 of FIG. 16. In response, it saves the calling telephone number that was included in the command, at step 311. Function 31 then selects and associates with this data call a unique I.D., at step 312. Any I.D. and any method of selection may be used, as long as the selected I.D. is unique to this call. Function 31 then sends the selected I.D. to terminal 11 over the data call, at step 313, and proceeds to await establishment of a voice call from voice terminal 10, at step 314.

Function 30 receives the I.D. associated with the data call, at step 215 of FIG. 15, and stores it, at step 216. Function 30 then signals the user to dial a voice port 22 of system 16 from voice terminal 10, at step 217, illustratively by displaying a message to that effect on the screen of terminal 11. Alternatively at step 217, if data terminal 11 has access to voice link 13 of voice terminal 10, function 30 of terminal 11 may perform the dialing of voice port 22 for the user automatically. Function 30 then awaits receipt via the data call of an acknowledgment from system 16 that the requisite voice call has been established, at step 218.

The user establishes a voice call to system 16 from terminal 10 in a conventional manner. As part of, or following, the call establishment, the calling telephone number is conveyed to system 16, and is transferred to function 31. This conveyance is accomplished in a conventional manner, either by means of an automatic number identification (ANI) feature of switch 12, or by means of a user response to a prompt from system 16.

When function 31 receives the calling telephone number of a voice call, at step 320 of FIG. 16, it compares this number against the stored calling telephone numbers of all presently-existing data calls (which it stored during execution of step 311 for each of those calls), at step 321. If no match is detected, at step 322, function 31 treats the voice call as a conventional attempt to access system 16. Function 31 therefore invokes the conventional voice call processing function of system 16, at step 323, and then returns to step 314.

If function 31 detects at step 322 a match between the calling numbers of a voice and a data call, it recognizes that those two calls originated with the same user. Function 31 therefore sends an acknowledgment of the establishment of the voice call to terminal 11 via the data call, at step 324, and waits for the user to log in over the voice call, at step 325.

Upon receiving the acknowledgment of the establishment of a voice call, at step 220 of FIG. 15, function 30 signals the user to log in over the voice call, and provides the user with the I.D. associated with the data call, at step 221, illustratively by displaying the information on the screen of terminal 11. Alternatively at step 221, if data terminal 11 has access to voice link 13 of voice terminal 10, function 30 of terminal 11 may perform the logging into system 16 for the user automatically. Function 30 then awaits an acknowledgment from system 16 that the user has been logged in properly, at step 222.

The user logs in to system 16 over the voice call in the conventional manner, with the exception that he or she provides the I.D. identifying the data call as part of the login procedure. System 16 responds to the conventional portion of the login information conventionally. The data call I.D. that was provided to system 16 as part of the login is given to function 31.

In response to being given the data call I.D. from the voice call, at step 330 of FIG. 16, function 31 compares this I.D. with the I.D.s of presently-existing data calls, at step 331. If no match is detected, at step 332, function 31 treats the voice call as being erroneous, and it causes the voice call to be terminated, at step 333. Function then returns to step 325.

If function 31 detects a match between the I.D. provided by the voice call and a data call's I.D., at step 334, it recognizes the two calls as being related, i.e., as being part of the same communication session between the user and system 16. Function 31 therefore creates an association between the two calls, at step 334, illustratively by storing in memory of system 16 information that relates the two calls together. Function 31 then sends an acknowledgment over the data call to terminal 11, at step 335, to advise it that the voice call login succeeded in establishing a voice and data call association.

The success of the login leads both functions 30 and 31 to make a transition to a new state. Function 31 therefore sends a command to terminal 11 to advise function 30 to prepare for a new state, at step 350. Function 31 then waits for an acknowledgment from terminal 11, at step 351. When it receives the acknowledgment at step 352, function 31 makes a transition 3003 to activity menu state 2006.

Figure 18:
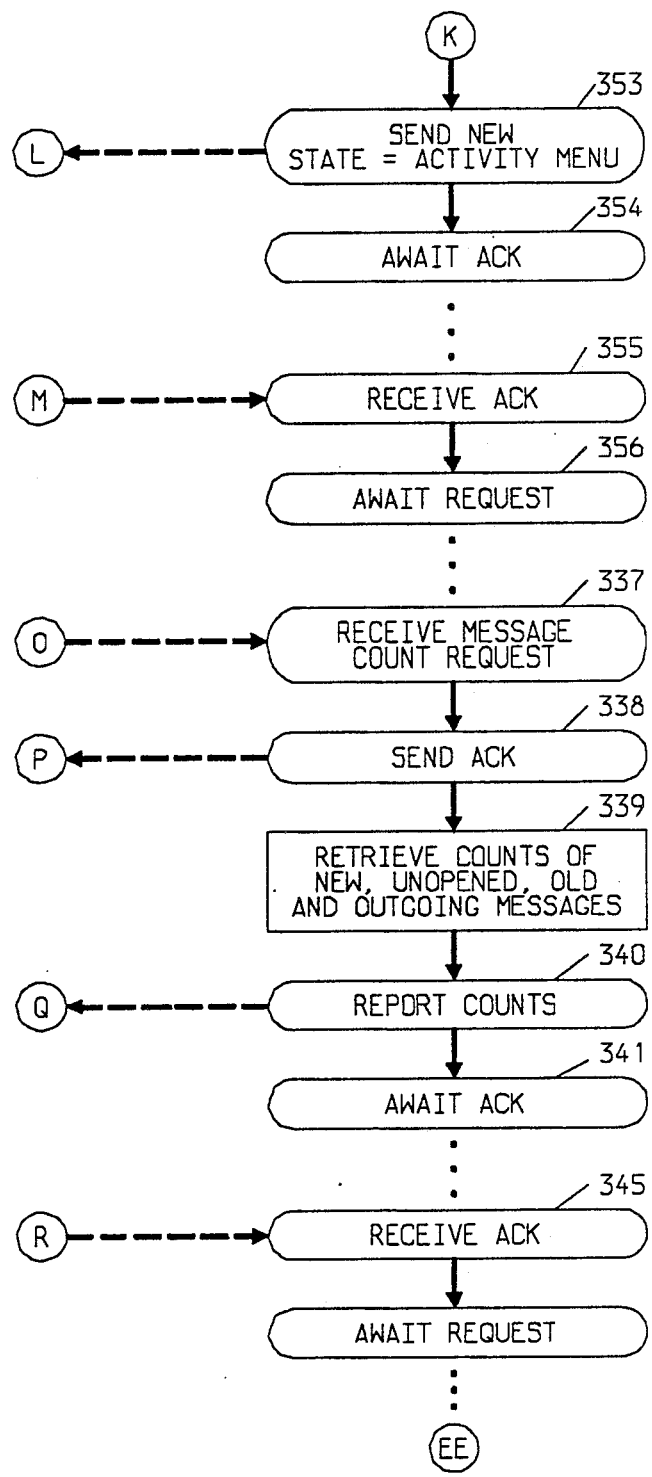

The activities of function 31 in state 2006 are shown in FIG. 18. Function 31 sends a message to terminal 11 advising function 30 that the new state is the activity menu state, at step 353. Function 31 again waits for an acknowledgment, at step 353, and upon receipt thereof, at step 355, function 31 waits, at step 336, to be informed by terminal 11 of what activity the user has selected to engage in.

Returning to step 222 of FIG. 15, function 30 awaits acknowledgment of success of the voice call login for only a predetermined period of time. Function 30 is thus prevented from awaiting indefinitely the arrival of an acknowledgment of a voice call that was terminated at step 333 and for which no acknowledgment has been or will be given. If the allotted time period times out before the acknowledgment is received, function 30 makes a transition 2003 back to stop state 2000. Function 30 notifies the user of the timeout at step 226, illustratively by displaying a message on the screen of terminal 11. Function 30 then conventionally terminates the data call to system 16, at step 227, and quits, at step 228.

If, however, function 30 receives the login acknowledgement, at step 229, before the allotted time period times out at step 225, it proceeds to wait for receipt of a command from system 16, at step 250.

Function 30 receives the "prepare for a new state" command from system 16, at step 251. It acknowledges the command, at step 253, and then waits for receipt of the new state, at step 253. When it receives the message from system 16, at step 254, that the new state is the activity menu state, function 30 acknowledges it, at step 255, and makes a transition 2004 or 2005—depending on whether the successful login was a LOGIN or an AUTO-LOGIN, respectively—to "activity menu" state 2006 (see FIG. 2).

Figure 17:
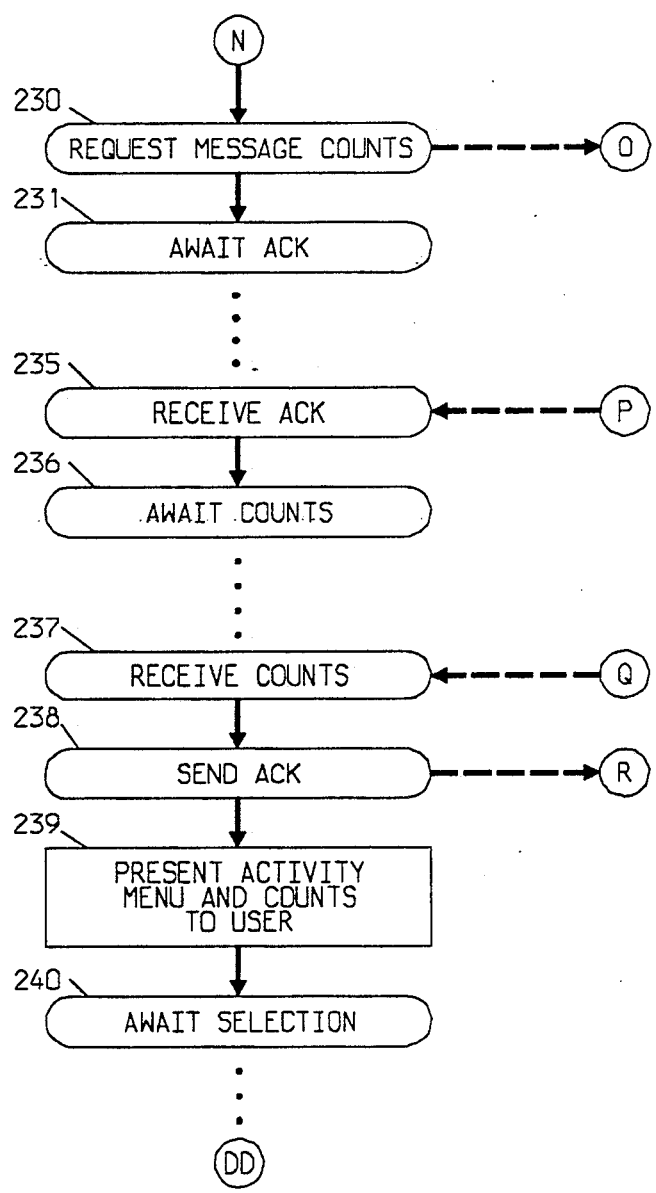

The activities of function 30 in state 2006 are shown in FIG. 17. First, function 30 requests of system 16 the counts of the various kinds of messages that system 16 may be storing. Function 30 sends the request to system 16 over the data call, at step 230. Function 30 then awaits receipt from system 16 of an acknowledgment of the request, at step 231.

Function 31 receives the message count request, at step 337 of FIG. 18, and sends an acknowledgment thereof to terminal 11 over the data call, at step 330. Function 31 then retrieves the counts of the various types of incoming and outgoing messages that are associated in system 16 with the user of terminal 11, at step 339, and reports these counts to terminal 11, at step 340. Function 31 then awaits receipt from terminal 11 of an acknowledgment of the counts, at step 341.

Function 30 receives the acknowledgment of its request, at step 235 of FIG. 17, and then waits for receipt of the requested counts, at step 236. When it receives the counts, at step 237, function 30 sends an acknowledgment to system 16 over the data call, at step 238. Function 30 then presents the count to the user, along with a menu of activities that the user may opt to undertake, at step 239. Function 30 then awaits selection by the user of one of the menu items, at step 240.

Function 31 responds to receipt of the acknowledgment from terminal 11, at step 345 of FIG. 18, by returning to step 336 to await receipt of a new command from terminal 11.

Figure 111:
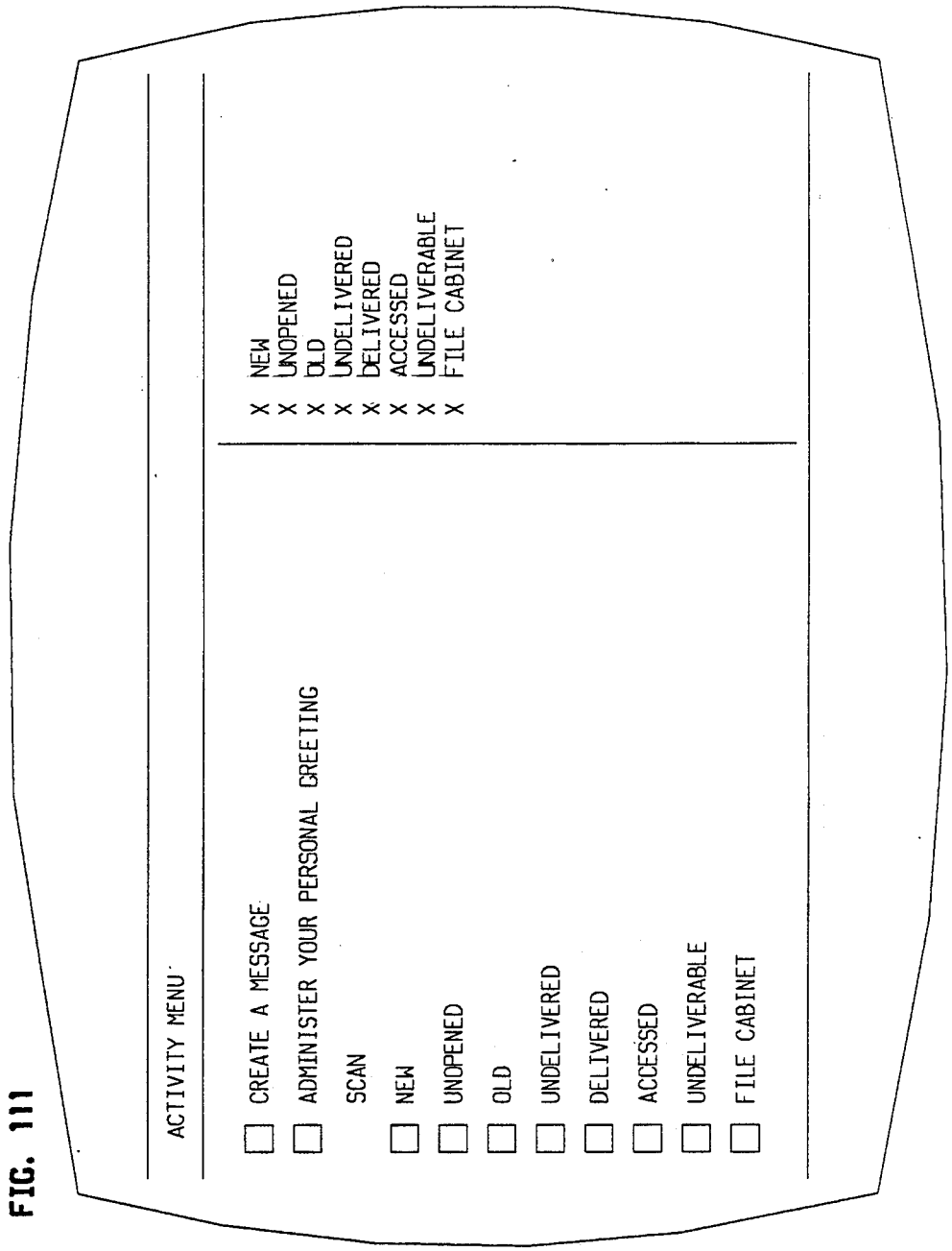

The options presented to the user by the activity menu at step 239 are to scan the headers of one of the types of incoming messages—new, old, and unopened—to scan the headers of one of the types of outgoing messages—undelivered, delivered, accessed, undeliverable, and file cabinet—to record a new outgoing message, and to administer the user's greeting. These are the conventional choices presented by system 16 to users. An illustrative activity menu screen displayed by terminal 11 is shown in FIG. 111.

Figure 4:
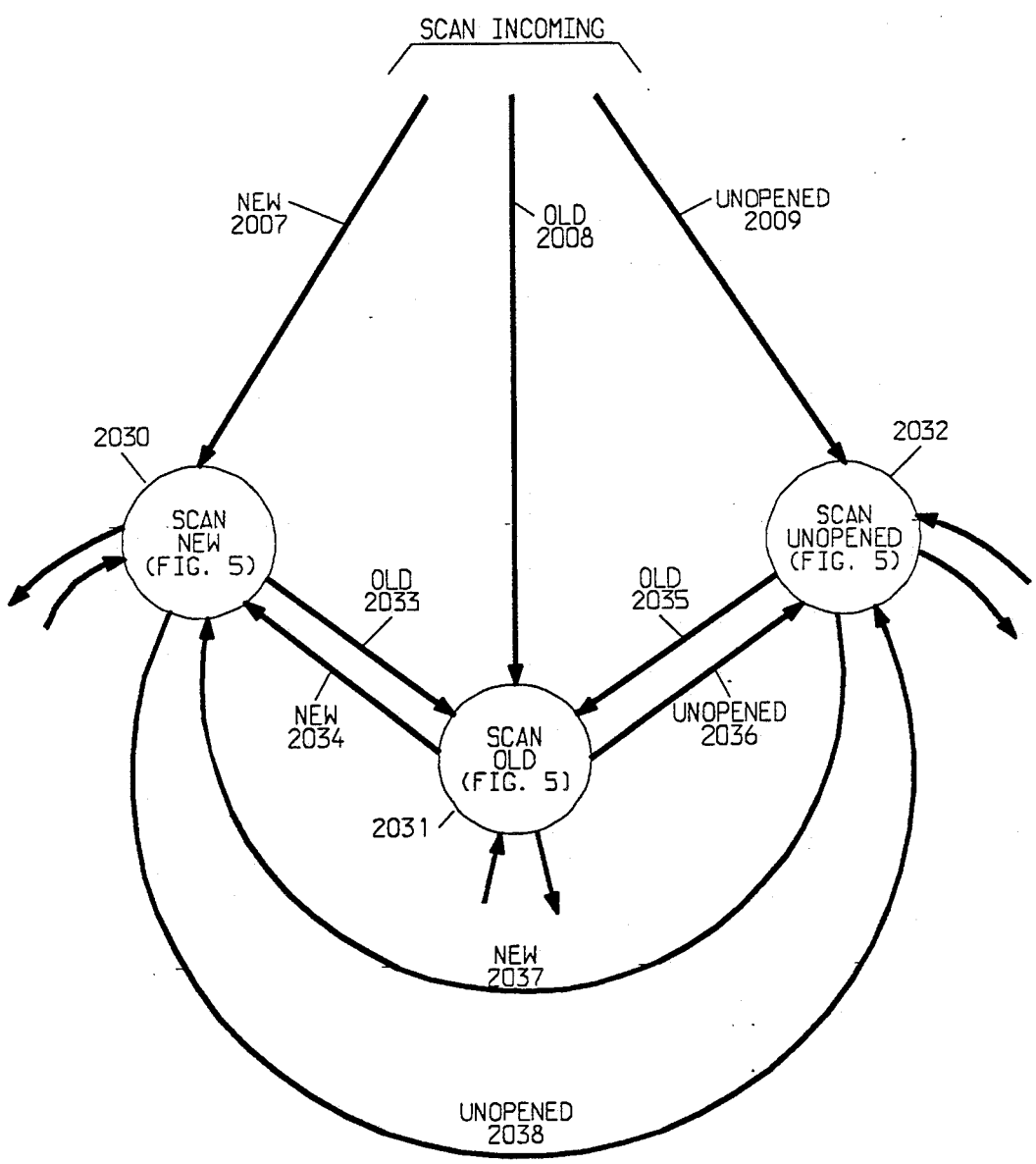

Any one of the selections causes a transition of functions 30 and 31 from activity menu state 2006 to a new state representative of the selection, as shown in FIGS. 2 and 3. For example (considering first the incoming message options), as shown in FIG. 4, selection of the "scan new message headers" option causes functions 30 and 31 to make transition 2007 to "scan new" state 2030; selection of the "scan old message headers" option causes functions 30 and 31 to make transition 2008 to "scan old" state 2031; and selection of the "scan unopened message headers" option causes functions 30 and 31 to make transition 2009 to "scan unopened" state 2032. Activities of functions 30 and 31 are the same for each of these transitions 2007-2009 and states 2030-2032, albeit with respect to a different message type. These activities are shown in FIG. 19 for function 30 and in FIG. 20 for function 31.

Figure 19:
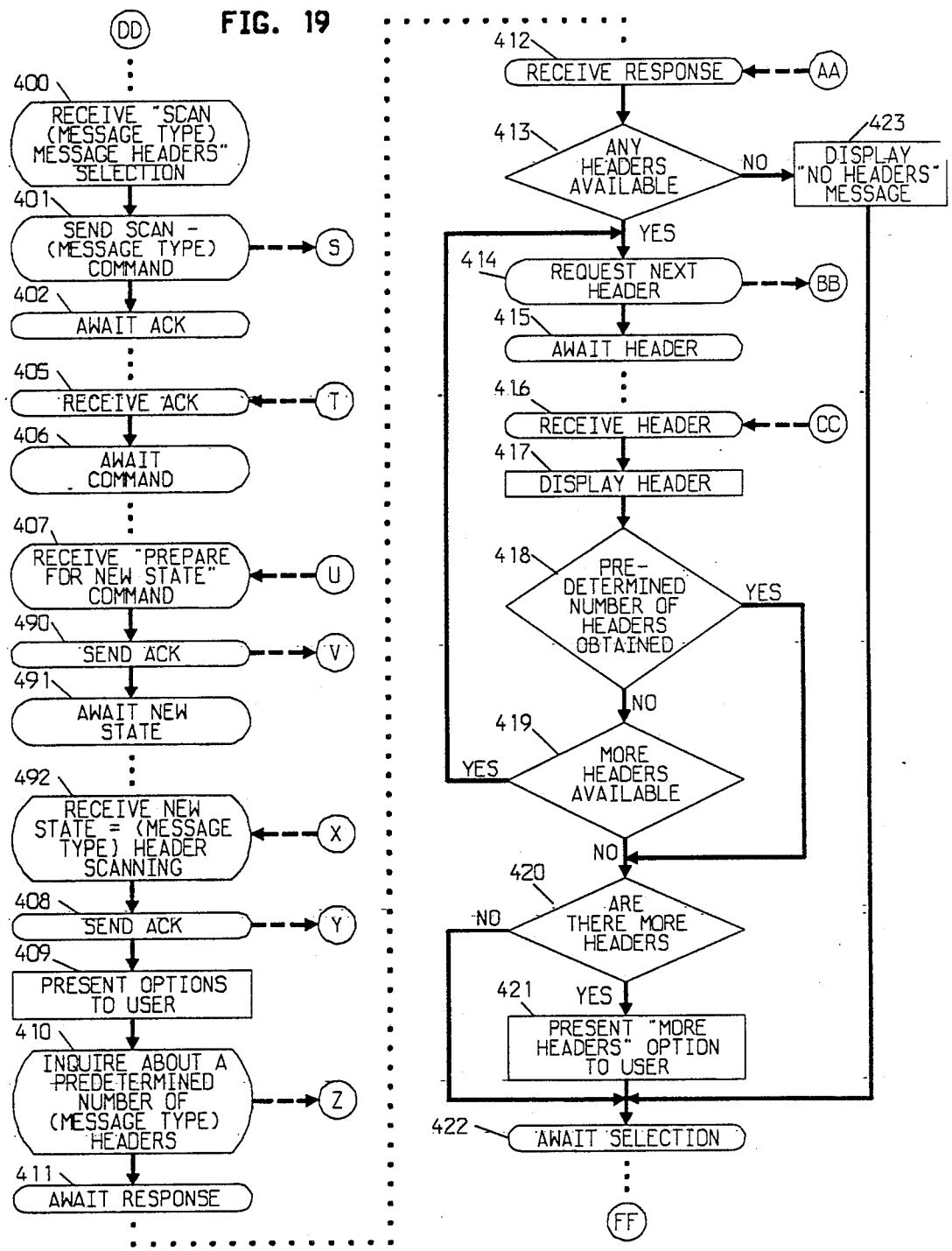

Assuming that the user selects one of the incoming message options, function 30 receives the selection, at step 400 of FIG. 19, and responds by sending a SCAN-NEW, SCAN-OLD, or SCAN-UNOPENED command (depending upon the particular selection made by the user) command to system 16 over the data channel, at step 401, to inform system 16 of the selection. Function 30 then awaits acknowledgment of the command, at step 402.

Figure 20:
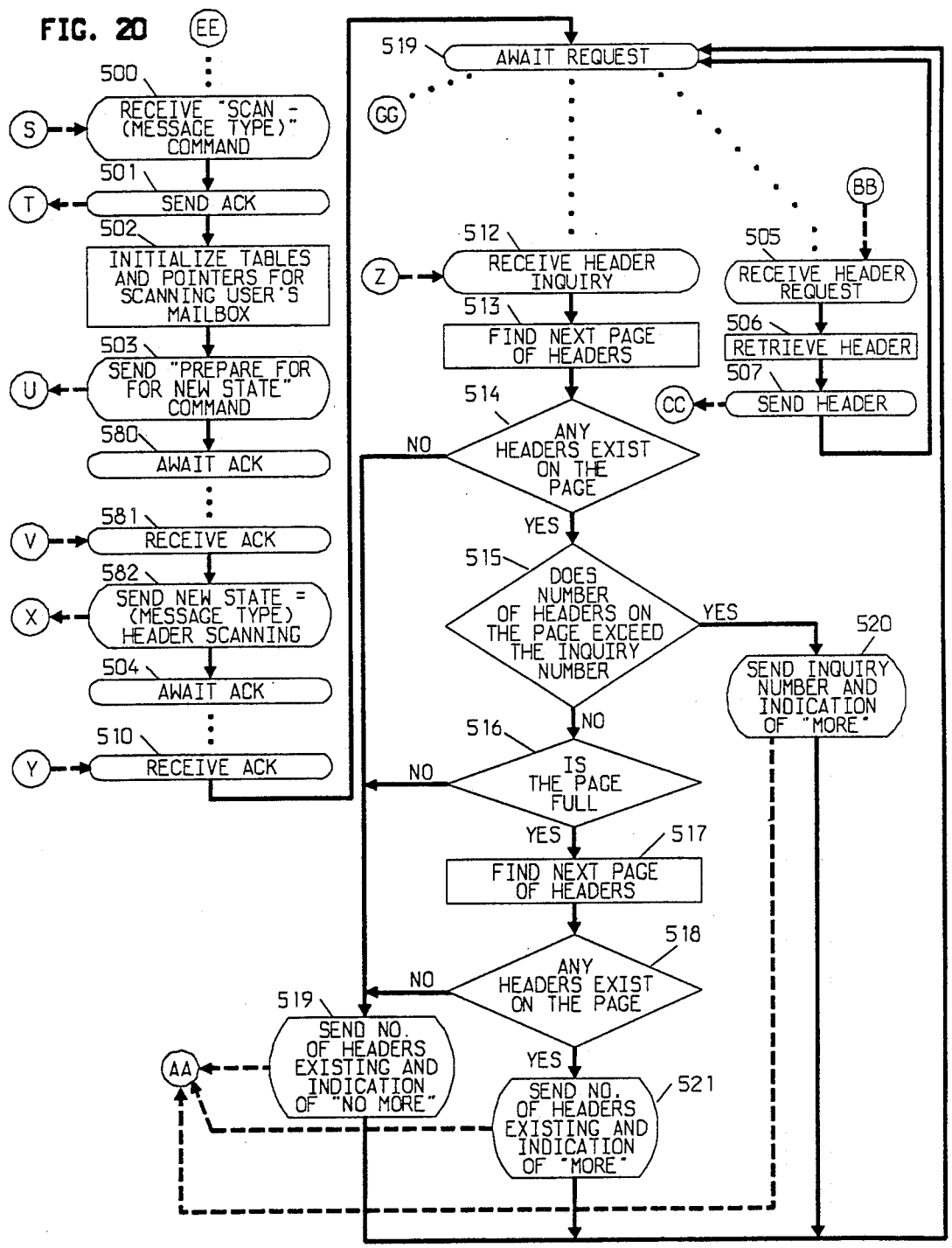

Function 31 receives the command, at step 500 of FIG. 20, acknowledges it, at step 501, and in response to the command initializes conventional system 16 tables and pointers requisite for scanning the user's mailbox, in a conventional manner, at step 502. Function 31 then sends a "prepare for new state" command to terminal 11 over the data channel, at step 503, and waits for an acknowledgment, at step 580. When it receives the acknowledgment, at step 581, function 31 sends a message over the data channel to terminal 11 indicating that the new state is message header scanning of the selected message type, at step 582. Function 31 then waits for an acknowledgment of the new state message, at step 504. Upon receipt thereof, at step 510, function 31 enters the new state and waits for arrival of a new request from terminal 11, at step 519.

Function 30 receives the acknowledgement of the SCAN command, at step 405 of FIG. 19, and then waits for a command from system 16, at step 406. When it receives the "prepare for new state" command, at step 407, function 30 acknowledges it, at step 490, and then waits to receive the new state from system 16, at step 491. When it receives the new state message from system 16, at step 492, function 30 acknowledges it, at step 408, and then enters the new state indicated by the received message and presents a menu of options relating to message header scanning to the user, at step 409.

At this point, function 30 can perform any one of a myriad of activities, each customized for a particular application. The following is merely illustrative of one possible course of action. Function 30 sends an inquiry to system 16 about a predetermined number of headers of the message type that was selected by the user at step 400, at step 410, and then waits for a response, at step 411. The predetermined number is the number of headers that terminal 11 is prepared to deal with at a single time, illustratively the number of headers that can be displayed simultaneously on the screen of terminal 11.

System 16 treats message headers in batches, or pages. Each page illustratively consists of 10 headers. When function 31 receives the inquiry about message headers, at step 512 of FIG. 20, function 31 finds the next—here the first—page of headers of the selected type, at step 513, and checks whether there are any headers on the page, at step 514. If there are no headers on the page, meaning that no headers—and hence no messages—of the selected type exist, function 31 sends back to terminal 11 the number zero as indicative of the number of headers that exist, and an indication that no more headers exist, at step 519. If there are headers on the page, function 31 checks whether their number exceeds the number of headers that terminal 11 inquired about, at step 515, and if so, sends back to terminal 11 the number that was inquired about plus an indication that there are more, at step 520. If the number of headers on the page does not exceed the inquiry number, function 31 checks whether the page is full of headers, at step 516. If not, function 31 sends back to terminal 11 the number of headers that do exist on the page, plus an indication that there are no more headers, at step 519. If the page is determined at step 516 to be full, function 31 finds the next page of headers, at step 517, and checks whether there are any headers on this page, at step 518. If there are no headers on this next page, function 31 proceeds to step 519; otherwise, function 31 sends the number of headers that exist on the previous page plus an indication that there are more headers, at step 521. Following steps 519-521, function 31 returns to step 519 to await the next request from terminal 11.

Function 30 receives the response to its inquiry, at step 412 of FIG. 19, and checks the number returned in the response to determine if there are any headers of the selected type available in system 16, at step 413. If not, function 30 causes a message to that effect to be displayed on the screen of terminal 11, at step 423, and then proceeds to await the user's selection from the menu of options that were presented at step 409, at step 422.

If function 30 determines at step 413 that headers are available, it requests the next—herein the first—header from system 16, at step 414, and then awaits its arrival, at step 415.

When function 31 receives a header request, at step 505, it responds thereto by retrieving the requested header, at step 506, and sending the retrieved header to terminal 11, at step 507. Function 31 then returns to step 519 to await the next request from terminal 11.

When it receives the requested header, at step 416, function 30 displays the received headers, at step 417, along with the options mentioned at step 409. Function 30 also checks whether the predetermined number (see step 410) of headers has already been obtained, at step 418. If so, function 30 proceeds to step 420; if not, function 30 checks the number in the response that it received at step 412 to determine whether more headers are available on the page of headers that is presently being accessed by system 16, at step 419. If more headers are available on this page, function 30 returns to step 414 to request another header; if no more headers are available on this page, function 30 proceeds to step 420.

At step 420, function 30 checks the indication that accompanied the number in the response received at step 412 to determine if there are more readers of the selected type available in system 16. If so, function 30 presents an additional "more headers" option to the user, at step 421. Function 30 then waits for the user's selection of one of the presented options, at step 422.

Unlike in a conventional voice mail system, wherein messages are automatically moved into the unopened or old message categories after the message header or the message itself has been provided to the user, herein messages change categories only after the user exits from the present scanning state, to allow the user to page back to previously-viewed headers and to previously-listened-to messages.

The options that are available to the user at step 422 include: "more headers", "play message", "delete message", "scan" any of the other types of incoming messages, "return to activity menu", "help", "wait", "disconnect", "directory", and "transfer". An illustrative message headers screen displayed by terminal 11 is shown in FIG. 110.

Figure 5:
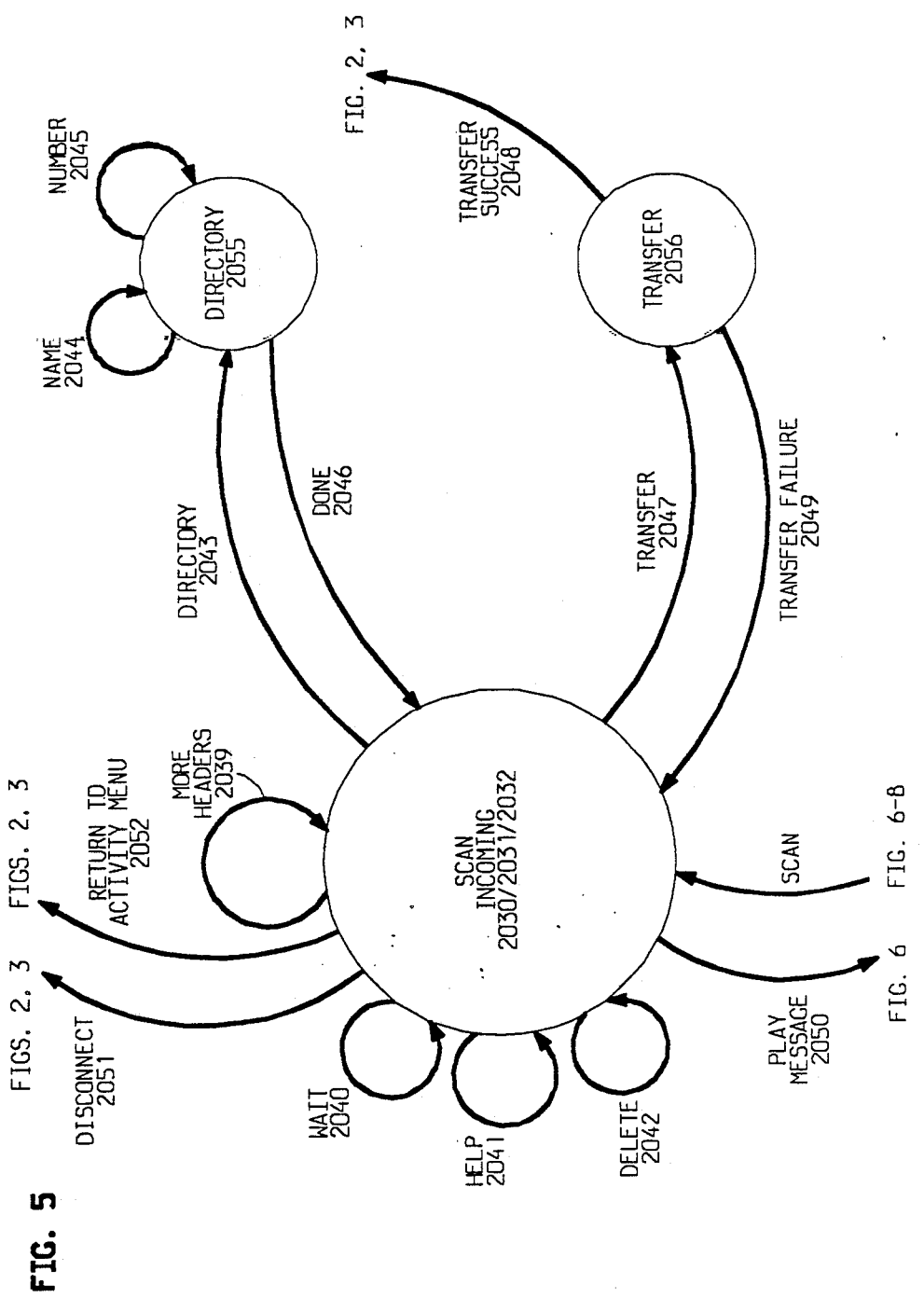

As shown by FIGS. 4 and 5, some of the options presented to the user in the scan states 2030–2032 cause functions 30 and 31 to undergo state transitions, while others do not. FIG. 4 shows the options and associated transitions that are unique to each of the scan states 2030–2032, while FIG. 5 shows the options and associated transitions that are common to each of the scan states 2030–2032.

Figure 21:
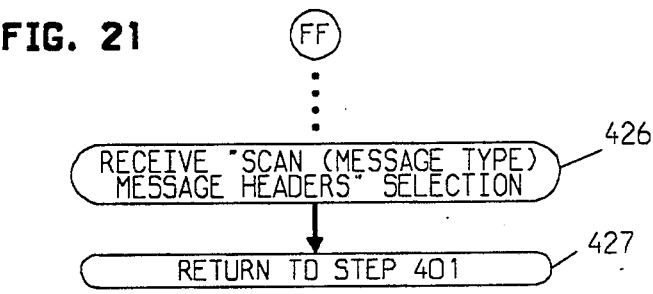
Figure 22:
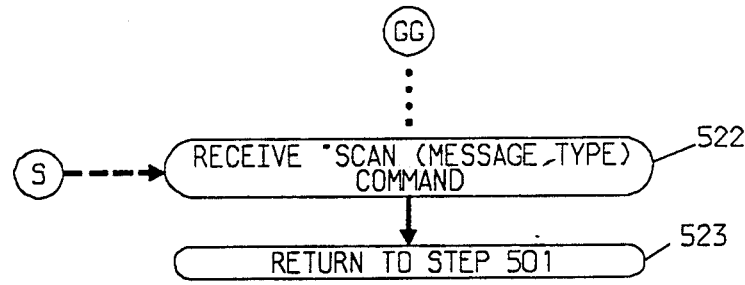

The "scan new message headers", "scan unopened message headers", and "scan old message headers" are the same options as are available on the activity menu presented to the user at step 239 of FIG. 17. They merely enable the user to make these activity menu selections without returning to the activity menu. As shown in FIG. 4, two of the three options are available to the user in each state 2030–2032, depending upon the state that the system is in. Selection of one of these options causes function 30 and 31 to make one of the transitions 2033–2038 to a new state 2030–2032, depending upon the present state of the system and the option selected, as shown in FIG. 4. The activities performed by functions 30 and 31 as part of these transitions are shown in FIGS. 21 and 22, respectively. When received by function 30, at step 426 of FIG. 21, the user's selection of one of the "scan message headers" options causes function 30 to return to step 401 to perform the scanning, at step 427. When function 31 receives the new SCAN command, at step 522 of FIG. 22, it returns to step 501 to satisfy the request, at step 523.

Figure 23:
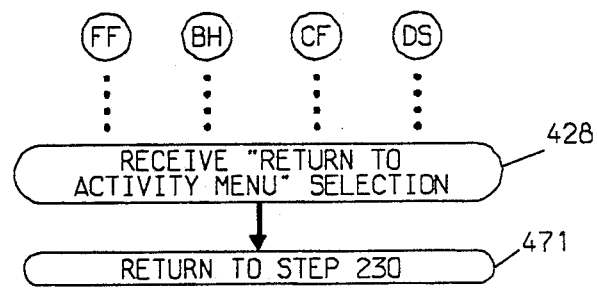
Figure 24:
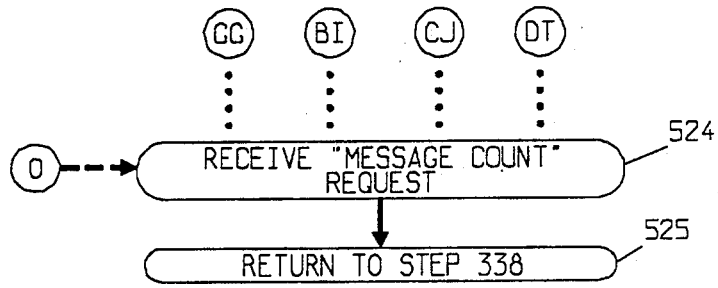

The "return to activity menu" option enables the user to return to the selections made available to him or her at step 239 of FIG. 17. Selection of this option causes functions 30 and 31 to make a transition 2052 back to activity menu state 2006 (see FIG. 5). The activities performed by functions 30 and 31 in response to the selection of this option are shown in FIGS. 23 and 24, respectively. When received by function 30, at step 428 of FIG. 23, the "return to activity menu" selection causes function 30 to return to step 230 of FIG. 17, at step 471. When function 31 receives the message count request sent by function 30 at step 230, at step 524 of FIG. 24, function 31 returns to step 338 of FIG. 18 to satisfy the request, at step 525.

Figure 25:
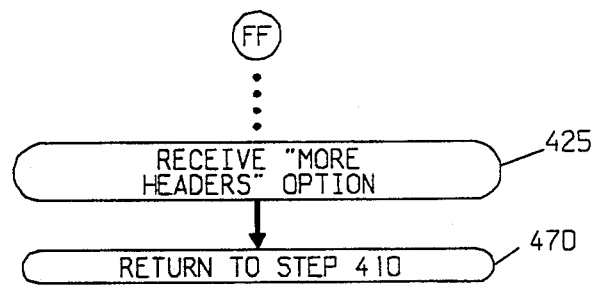
Figure 26:
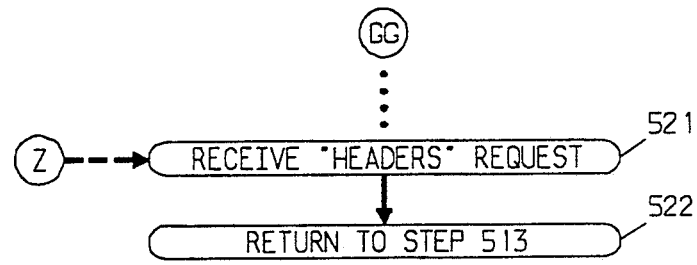

The "more headers" option allows the user to retrieve hitherto-unretrieved headers of messages of the selected type. As shown in FIG. 5, selection of this option causes functions 30 and 31 to undergo a transition 2039 which does not result in a state change. The activities performed by functions 30 and 31 in response to the user's selection of the "more headers" option are shown in FIGS. 25 and 26, respectively. When received by function 30, at step 425 of FIG. 26, the user's selection of the "more headers" option causes function 30 to return to step 410 of FIG. 19, at step 470, in order to retrieve and display a new header. When function 31 receives the new inquiry about headers, at step 521 of FIG. 26, it returns to step 513 of FIG. 20 to satisfy that inquiry, at step 522.

The selection of the "wait" option triggers a conventional wait response of system 16. When system 16 does not receive input, such as a new request or command, from a user within a predetermined period of time from when system 16 completed its response to the last-received request or command, system 16 issues a prompt to the user via the voice channel to cause the user to do something. If the user does not respond within a predetermined period of time to the prompt, system 16 disconnects the user and terminates the voice call. Selection of the "wait" option prolongs the above-mentioned predetermined time period.

Selection of the "wait" option causes functions 30 and 31 to undergo a transition 2040 which does not result in a state change (see FIG. 5). The activities performed by functions 30 and 31 in response to the user'selection of the "wait" option are shown in FIGS. 27 and 28, respectively.

Figure 27:
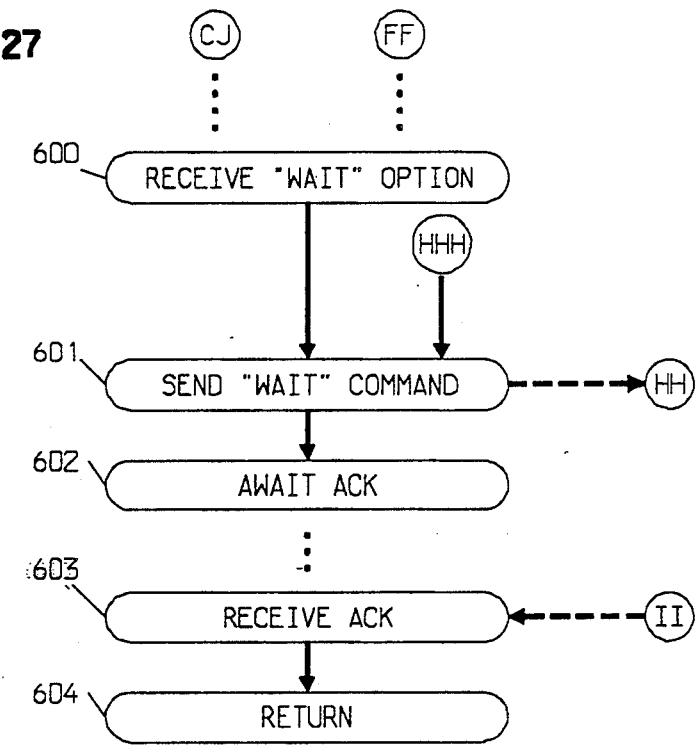

When function 30 receives selection of the "wait" option, at step 600 of FIG. 27, it sends a "wait" command to system 16 over the data channel, at step 601, and then waits for an acknowledgment, at step 602.

Figure 28:
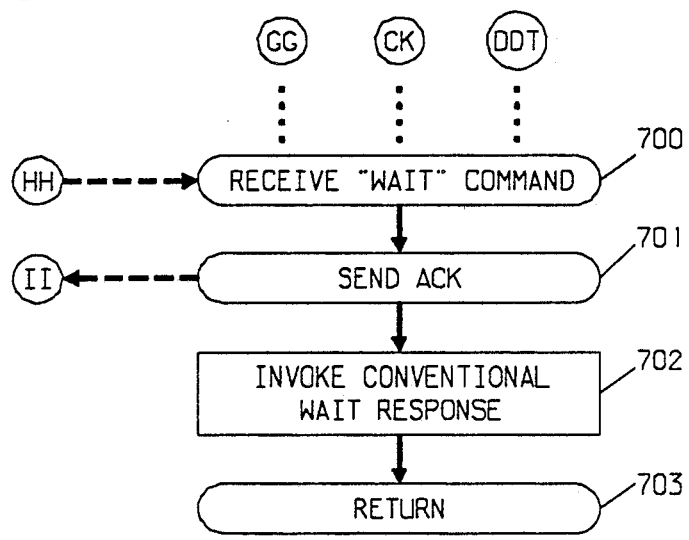

Receipt of the "wait" command, at step 700 of FIG. 28, causes function 31 to acknowledge the command, at step 701, and then to invoke the conventional "wait" response of system 16, at step 702. Function 31 then returns to whatever operational point it was at when it received the "wait" command—step 519 of FIG. 20 in this example—to await a new request from terminal 11, at step 703.

When it receives acknowledgment of the "wait" command, at step 603 of FIG. 27, function 30 returns to whatever operational point it was at when it received the wait command—step 422 of FIG. 19 in this example—to await the user's selection of another option, at step 604.

Selection of the "help" option triggers a response analogous to a conventional help response of system 16, which is to provide helpful information—such as an explanation of the options that are available to the user—over the voice channel. Selection of this option causes functions 30 and 31 to undergo a transition 2041 which does not result in a state change (see FIG. 5). The activities performed by functions 30 and 30 in response to the user's selection of the "help" option are shown in FIGS. 29 and 30, respectively.

Figure 29:
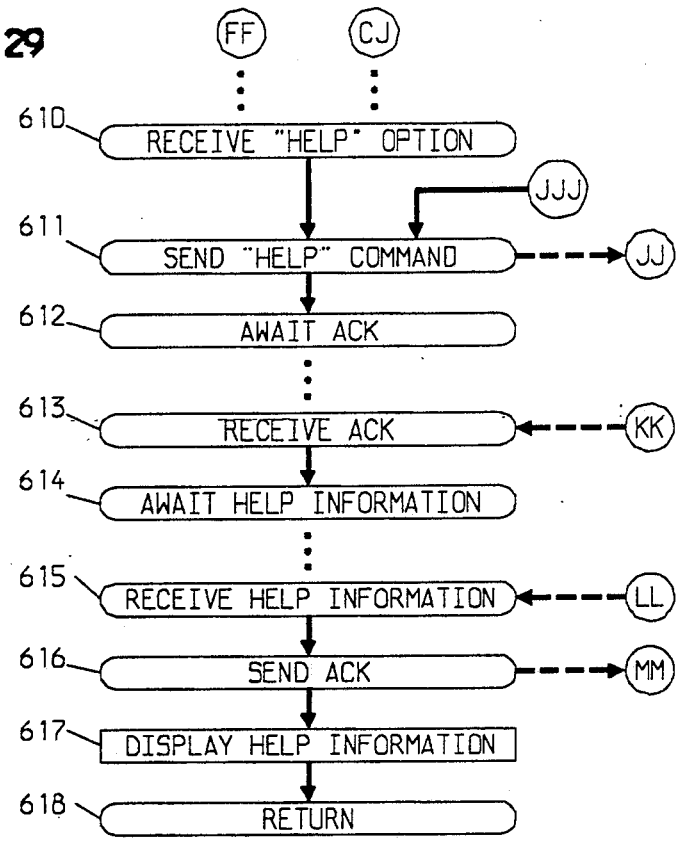

When function 30 receives selection of the "help" option, at step 610 of FIG. 29, it sends a "help" command to system 16 over the data channel, at step 611, and then waits for an acknowledgment, at step 612.

Figure 30:
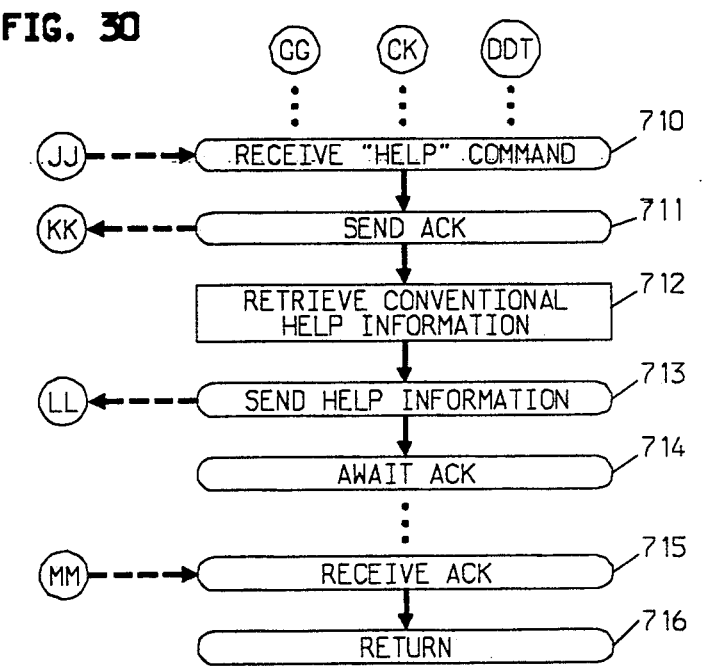

Upon receipt of the "help" command, at step 710 of FIG. 30, function 31 acknowledges the command, at step 711. Function 31 then retrieves the conventional "help" information of system 16, at step 712, and sends the information to terminal 11 over the data channel, at step 713. Function 31 then waits for acknowledgment of the information, at step 714. Upon receipt of the acknowledgment, at step 715, function 31 returns to whatever operational step it was at when it received the "help" command—step 519 of FIG. 20 in this example—to await a new command from terminal 11, at step 716.

When it receives acknowledgment of the "help" command, at step 613 of FIG. 29, function 30 waits for the requested information, at step 614. Upon receipt of that help information, at step 615, it acknowledges the receipt, at step 616, and then displays the help information on the screen of terminal 11, at step 617. Function 30 then returns to whatever operational step it was at when it received the "help" option—step 422 of FIG. 19 in this example—to await the user's selection of another option, at step 618.

Alternatively, selection of the "help" option can merely trigger the conventional help response of system 16. In this alternative, steps 614-617 and 713-715 are eliminated, and step 712 merely involves invocation of the conventional help response, which is presented to the user over the voice channel.

The user's selection of the "delete message" option causes deletion from system 16 of the message with respect to which the option was exercised. That message is identified by the user by typing in on the keyboard of terminal 11 the number of that message's header appearing on the screen of terminal 11. Or, if terminal 11 is equipped with a touch-sensitive screen, the message is identified by the user touching the delete option touchpoint appearing next to the message's header on the screen.

Selection of the "delete message" option causes functions 30 and 31 to undergo a transition 2042 which does not result in a state change (see FIG. 5). The activities performed by functions 30 and 31 in a response to the user's selection of this option are shown in FIGS. 31 and 32, respectively.

Figure 31:
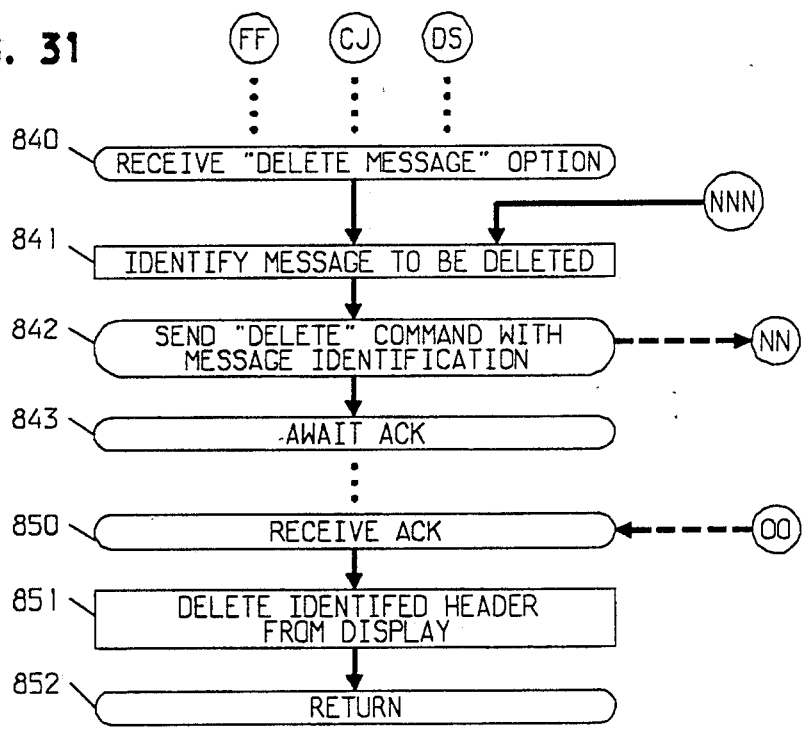

Receipt of the user's selection of this option, at step 840 of FIG. 31, causes function 30 to identify the message to be deleted, at step 841. Function 30 then sends a "delete" command, along with information identifying the message to be deleted, to system 16 over the data channel, at step 842. Function 30 then waits for an acknowledgment, at step 843. Upon receipt of the acknowledgment, at step 850, function 30 deletes the header of the deleted message from the display of terminal 11, at step 851, and returns to whatever operational step it was at when it received the "delete message" option—step 422 of FIG. 19 in this example—to await selection of another option, at step 852.

Figure 32:
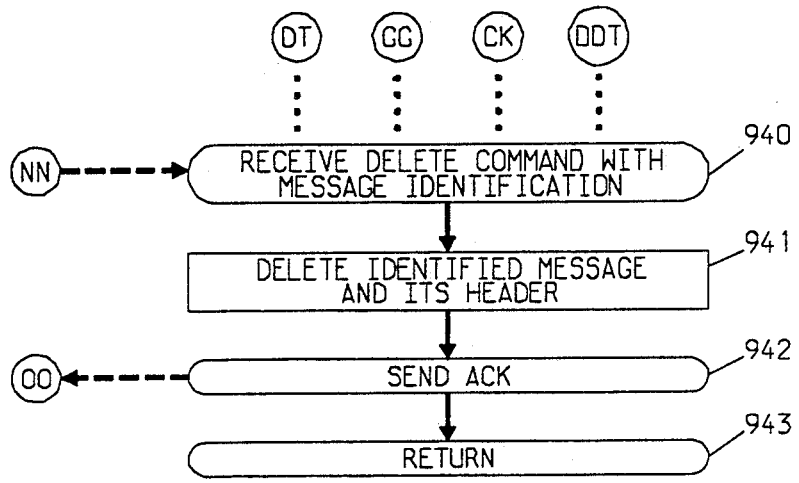

When function 31 receives the "delete" command, at step 940 of FIG. 32, it causes the identified message and its header to be deleted from system 16, at step 941. Function 31 then acknowledges the "delete" command, at step 942, and returns to whatever operational step it was at when it received the "delete" command—step 519 of FIG. 20 in this example—to await receipt of another request, at step 943.

Alternatively, when a message header is deleted from the screen of terminal 11, function 30 may send a request to system 16 to retrieve the next header, if more exist. The display then scrolls up, and the last line of the display is replaced with the next header. If the deleted header was the last entry on a page (see discussion of step 512 of FIG. 20), function 31 sends a message to system 16 asking it to update its page of message headers by retrieving as many next messages as had been deleted from the page. If more than the predetermined number (see discussion of step 410 of FIG. 19) of headers have been deleted, function 30 checks the indicator returned by system 16 at steps 519-521 when the headers were retrieved. If this indicator shows that more headers are available, then function 30 sends a request to system 16 asking it to retrieve the predetermined number of additional headers and to place these new headers at the end of its page. The previously-mentioned indicator is again returned in response to this request, and indicates "more headers" if still more headers exist.

Selection of the "disconnect" option, at step 422 of FIG. 19, causes the user's communication session with system 16 to be terminated and the voice and data calls that make up the session to be disconnected.

Selection of the "disconnect" option causes functions 30 and 31 to undergo a transition 2051 which results in a state change to "stop" state 2000 of FIG. 2 for function 30 and to "idle" state 3000 of FIG. 3 for function 31 (see FIG. 5). The activities performed by functions 30 and 31 in response to selection of this option are shown in FIGS. 33 and 34, respectively.

Figure 33:
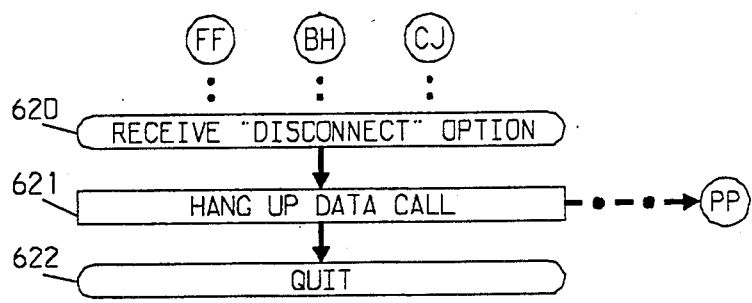

Upon receipt of selection of the "disconnect" option, at step 620 of FIG. 33, function 30 causes terminal 11 to hang up the data call, in a conventional manner, at step 621. Function 30 thus completes its activities and quits, at step 622.

Switch 12 detects the hang-up on data channel 14, and in turn hangs up, disconnects, the corresponding data link 19 to system 16.

Figure 34:
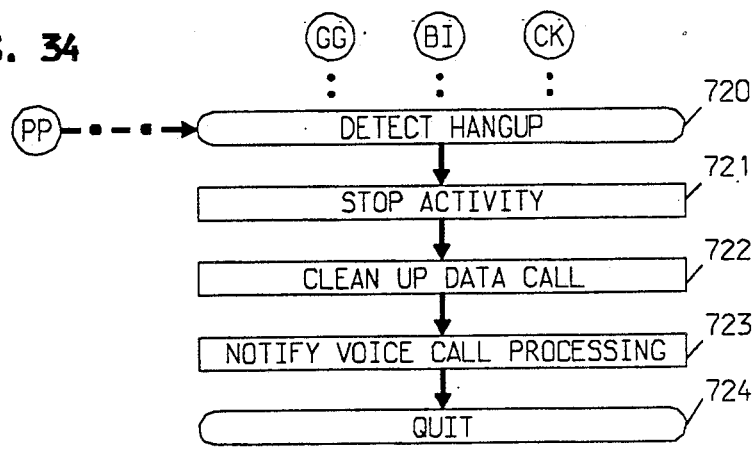

Function 31 of system 16 detects the hang-up conventionally, e.g., by detecting loss of carrier on link 19, at step 720 of FIG. 34. In response, it stops whatever activity it is presently engaged in, at step 721, and "cleans up" the data call, at step 722. Clean-up activities include returning the I.D. that became associated with the data call at step 312 to an unused I.D. pool, and canceling the association that was created between the data call and the voice call at step 334. Function 31 also notifies the voice-call processing function of system 16 of the disconnection, at step 723, so that that function can disconnect and clean up the associated voice call. Function 31 thus completes its activities and quits, at step 724.

Should termination of the user's communication session with system 16 occur as a result of disconnection (by, e.g., the user) of the voice call, system 12 notifies system 16 of the disconnection of the voice call via control link 18. In response, system 16 disconnects and cleans up the voice call, in a conventional manner, and notifies function 31.

Disconnection of the voice call causes functions 30 and 31 to make a transition from whatever state they are in to "stop" state 2000 of FIG. 2 and "idle" state 3000 of FIG. 3, respectively (see FIG. 5). The activities of functions 30 and 31 following the disconnection of the voice call are shown in FIGS. 35 and 36, respectively.

Figure 36:
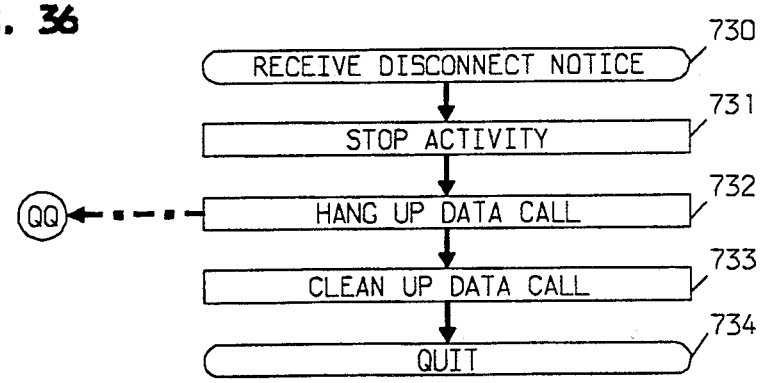

In response to receipt of the disconnect notice from system 12, at step 730 of FIG. 36, function 31 stops whatever activity it is presently engaged in, at step 731. Function 31 then causes the corresponding data call to be disconnected, in a conventional manner, at step 732. Function 31 then performs the activities described for step 722, at step 733, and then quits, at step 734.

Figure 35:
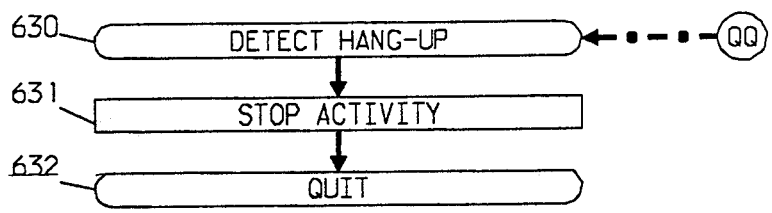

Function 30 of terminal 11 detects the hangup conventionally, e.g., by detecting loss of carrier on link 19, at step 630 of FIG. 35. Function 30 responds by stopping whatever activity it is engaged in, at step 630, and quits, at step 632.

The user's selection of the "directory" option at step 422 of FIG. 19 enables the user to obtain the telephone number of another user in response to the user's name, or vice versa.

Selection of the "directory" option causes functions 30 and 31 to undergo a transition 2043 to a "directory" state 2055 in FIG. 5. The activities performed by functions 30 and 31 in response to selection of the directory option are shown in FIGS. 37 and 38, respectively.

Figure 37:
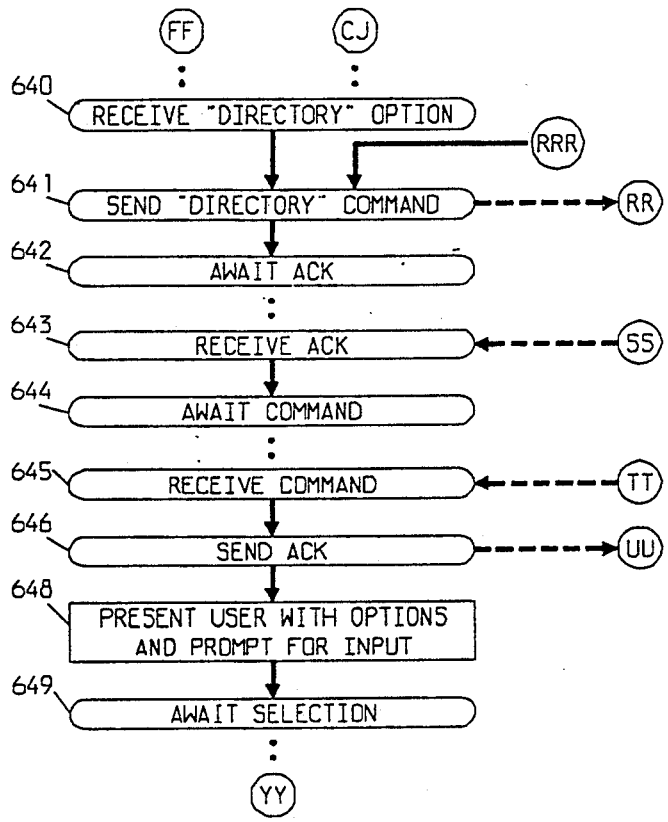

When function 30 receives selection of the directory option, at step 640 of FIG. 37, it sends a "directory" command to system 16 over the data channel, at step 641, and then waits for an acknowledgment, at step 642.

Figure 38:
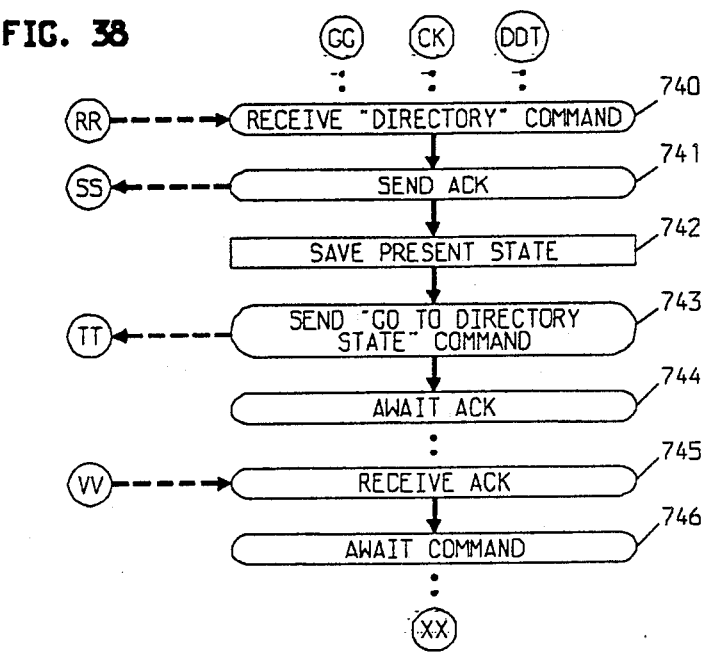

Receipt of the "directory" command at step 740 of FIG. 38, causes function 31 to send an acknowledgment to terminal 11, at step 741. Function 31 then saves the present state that it is in, at step 742. Function 31 saves all information that will be needed to return to the precise point in its operation at which it was when it received the "directory" command. When done, function 31 sends a "go to directory state" command to terminal 11, at step 743, and then awaits acknowledgment of the command, at step 744. When it receives the acknowledgment, at step 745, function 31 proceeds to await receipt of a directory-related command from terminal 11, at step 746.

When function 30 receives acknowledgment of the directory command it sent in step 641, at step 643, it waits for receipt of a command from system 16, at step 644. When it receives the command telling it to go into the "directory" state, at step 645, it acknowledges it, at step 646, and then presents the user with directory-related options and prompts the user for input information related to the options, at step 648. Function 30 then awaits the user's selection, at step 649.

The options presented to the user at step 648 are to find either the "name" or "number" of a user, or a "done" option that signifies the end of directory use. For the "name" option, function 30 prompts the user to key in the phone number for which he or she desires the corresponding name. For the "number" option, function 30 prompts the user to key in the name of the user whose phone number he or she desires. No information is sought by function 30 for the "done" option.

Optionally, an item of information returned by function 31 in the login acknowledgment (see step 335 of FIG. 16) is the addressing type—"name" or "number"'—being administered for the user. Function 30 may then place the cursor of terminal 11 in the corresponding field of the screen when user input of an address is required. This eliminates the need for a directory screen display with options for specifying the type of addressing to be used. To change the addressing type, a user need only tab between the addressing fields, thereby causing function 30 to send the appropriate command to system 16 to cause it to change the administered addressing type. An option available to the user causes function 30 to query function 31 about the addressing type presently being administered, thereby giving the user the capability to obtain this information at any time during the interaction, without having to keep track thereof manually.

The user's selection of the "name" option causes functions 30 and 31 to undergo a transition 2044 which does not result in a state change (see FIG. 5). The activities performed by functions 30 and 31 in response to this option are shown in FIGS. 39 and 40, respectively.

Figure 39:
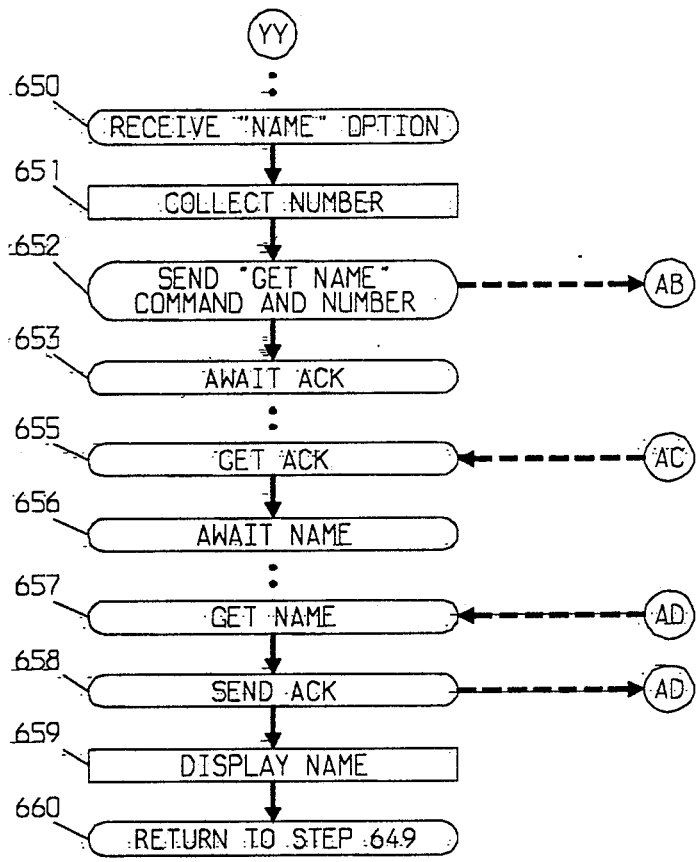

Upon receipt of the user's selection of the "name" option, at step 650 of FIG. 39, function 30 collects the phone number keyed in by the user on the keyboard of terminal 11, at step 651. Function 30 then sends a "get name" command, along with the collected number, to system 16 over the data channel, at step 652, and waits for an acknowledgment, at step 653. Upon receipt of the acknowledgment, at step 655, function 30 waits to receive the desired name from system 16, at step 656.

Figure 40:
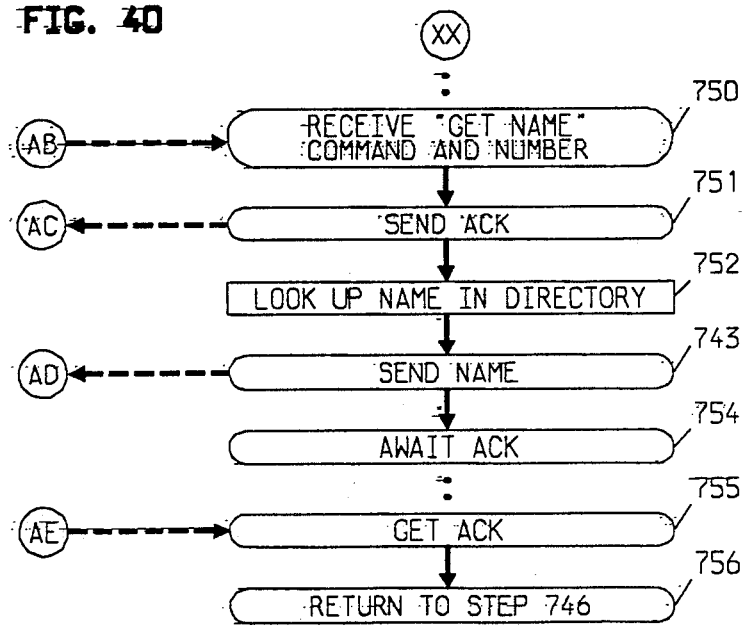

When function 31 receives the "get name" command and the accompanying phone number, at step 750 of FIG. 40, it acknowledges the receipt, at step 751, and then looks up in the directory of system 16 the name that is associated with the received number, at step 752. Function 31 then sends the name over the data channel to terminal 11, at step 753, and waits for an acknowledgment, at step 754. Upon receipt of the acknowledgment, at step 755, function 31 returns to step 746 of FIG. 38 to await another directory-related command, at step 756.

Function 30 receives the name that was sent by system 16, at step 657, acknowledges it, at step 658, and displays it to the user on terminal 11, at step 459. Function 30 then returns to step 649 of FIG. 37 to await the user's next directory-related selection, at step 660.

The user's selection of the "number" option at step 649 of FIG. 37 causes functions 30 and 31 to undergo a transition 2045 which also does not result in a state change (see FIG. 5). The activities performed by functions 30 and 31 in response to this option are shown in FIGS. 41 and 42, respectively.

Figure 41:
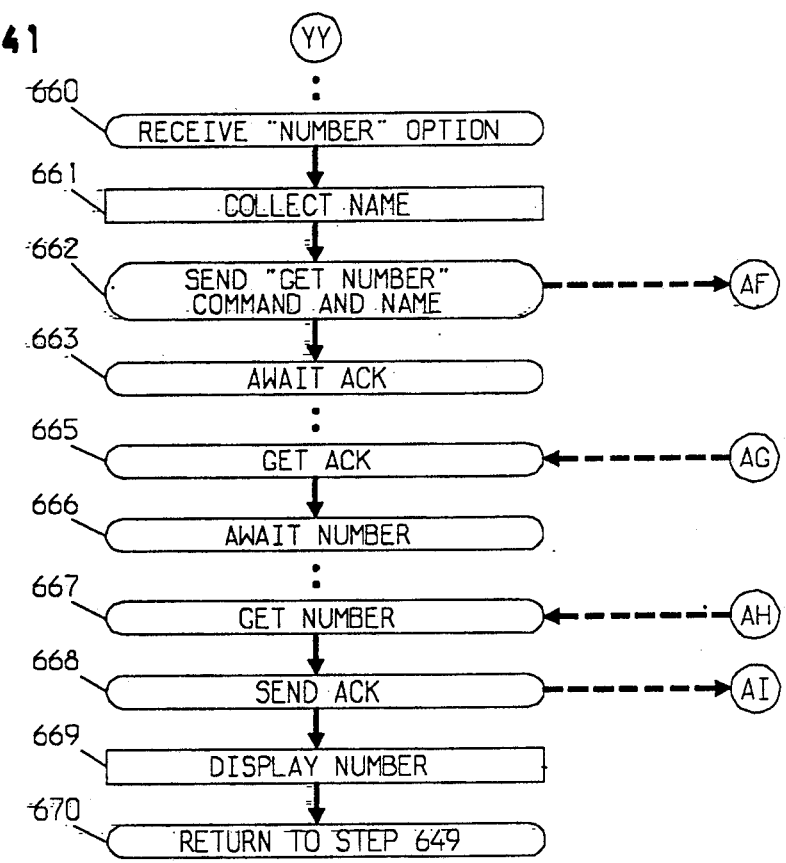
Figure 42:
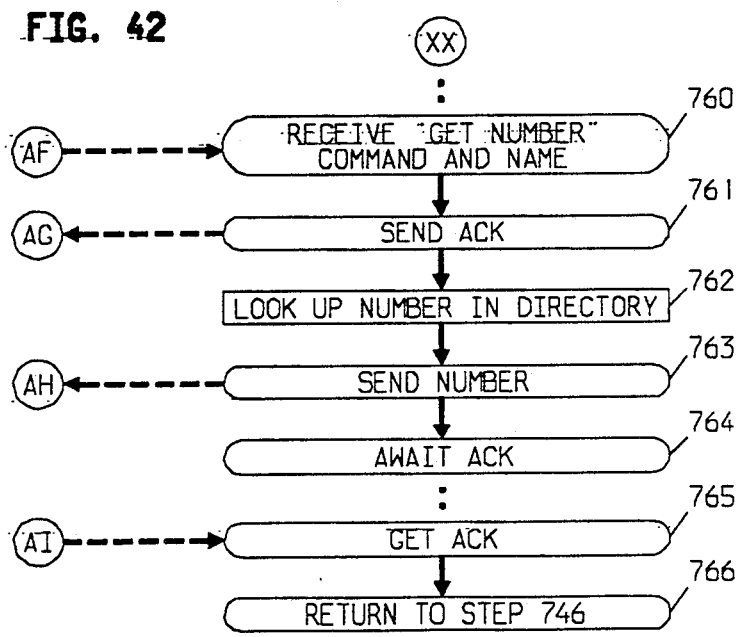

Upon receipt of the user's selection of the "number" option, at step 660 of FIG. 41, the procedures followed by functions 30 and 31 in response thereto parallel exactly the procedures followed for the "name" option, with "name" substituted therein for "number", and vice versa. These procedures are shown in steps 660–670 of FIG. 41 and 760–766 of FIG. 42, respectively.

The user's selection of the "done" option at step 649 of FIG. 37 causes functions 30 and 31 to undergo a transition 2046 which returns them from "directory" state 2055 to whatever state they were in before entering "directory" state 2055—one of the scan incoming message headers states 2030-2032 in this example (see FIG. 5). The activities performed by functions 30 and 31 in response to the "done" option are shown in FIGS. 41 and 44, respectively.

Figure 43:
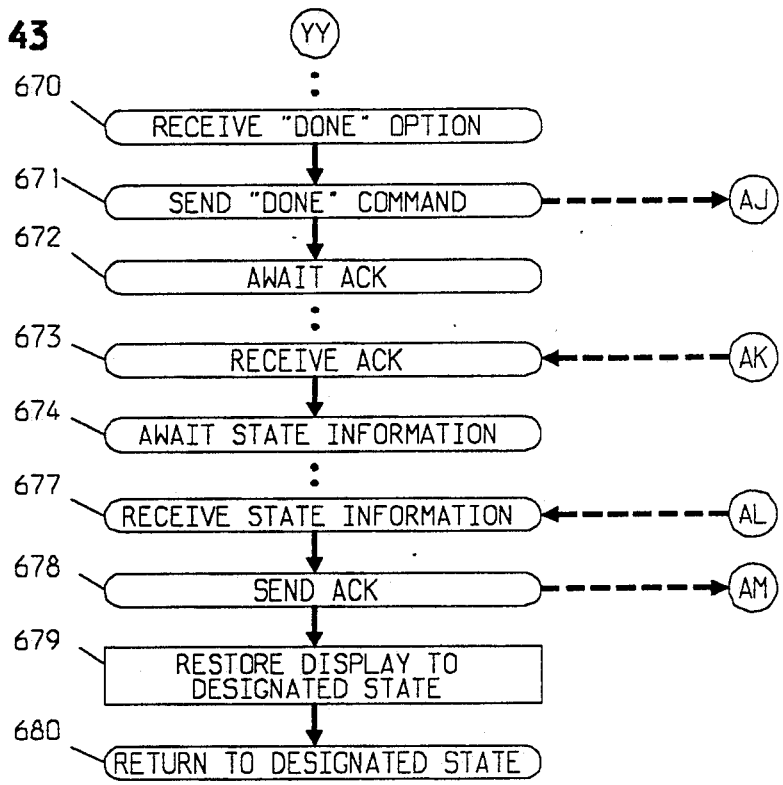

Upon receipt of the user's selection of the "done" option, at step 670 of FIG. 43, function 30 sends a "done" command to system 16 over the data channel, at step 671. Function 30 then waits for an acknowledgment, at step 672.

Figure 44:
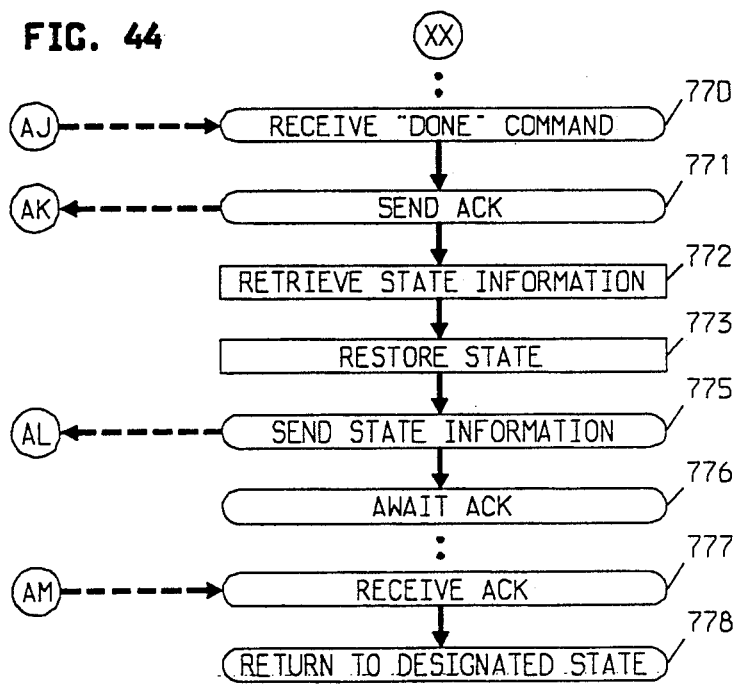

Function 31 receives the "done" command at step 770 of FIG. 44, and acknowledges it, at step 771. Function 31 then retrieves the state information that it saved at step 742, at step 772, and restores that state in system 16 in order to return to the precise point of operation that existed at step 740, at step 773. Function 31 also sends the requisite state information to terminal 11, at step 775, to enable function 30 to resume the point in its operation from which it was sent to directory state 2055. Function 31 then waits for an acknowledgment, at step 776, and upon receipt thereof, at step 777, returns to whatever point the restored state represents, at step 778—in this example, to step 519 of FIG. 20 to await a new request from terminal 11.

Upon receipt of the acknowledgment of the "done" command, at step 673, function 30 waits for receipt from system 16 of the information that it needs to restore the state it was in at step 640, at step 674. Upon receipt of the state information, at step 677, function 30 acknowledges its receipt, at step 678, and then uses the information to return to the designated state, at step 680, restoring the display on the screen of terminal 11 to its previous state in the above process, at step 679. In this example, function 30 restores the display to what it was at step 419 or 421 of FIG. 19, and returns to step 422.

Returning to step 422 of FIG. 19, the use's selection of the "transfer" option causes the voice call to be transferred from system 16 to a number specified by the user and—if the transfer succeeds—the data call to be disconnected.

The selection of the "transfer" option causes functions 30 and 31 to undergo a transition 2047 to a "transfer" state 2056 (see FIG. 5). Depending on whether or not the transfer of the voice call succeeds in this state, functions 30 and 31 then automatically make either a transition 2048 to "stop" state 2000 of FIG. 2 and "idle" state 3000 of FIG. 3, respectively, or a transition 2049 back to whatever state they were in before entering transfer state 2056—one of the scan incoming message headers 2030-2032 in this example. The activities performed by functions 30 and 31 in response to the "transfer" option and to its success or failure are shown in FIGS. 45-50.

Figure 45:
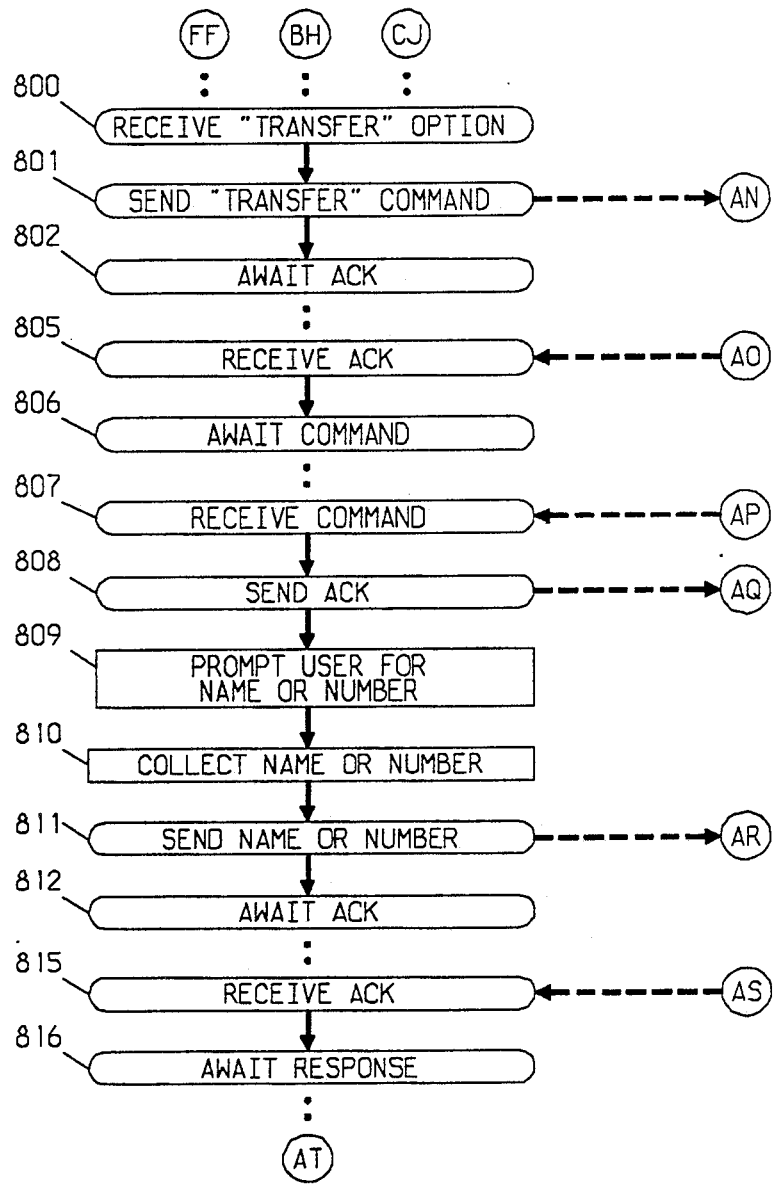

Upon receipt of the user's selection of the "transfer" option, at step 800 of FIG. 45, function 30 sends a "transfer" command to system 16 over the data channel. It then waits for an acknowledgment, at step 802.

Figure 46:
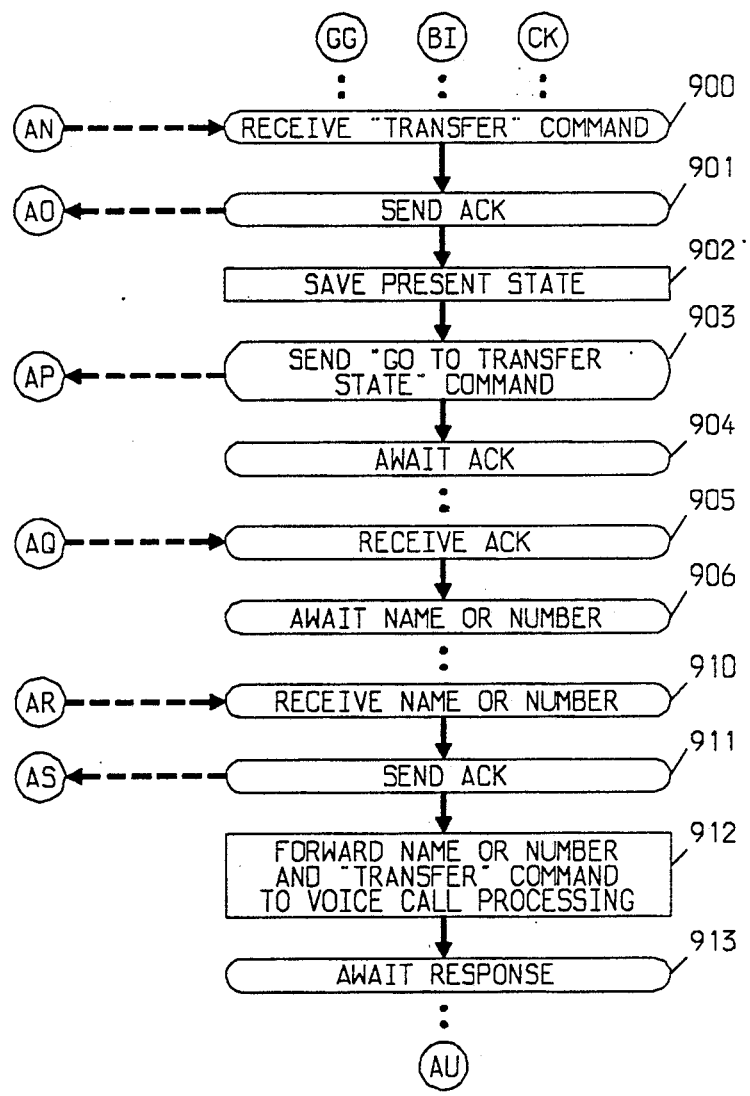

Receipt of the "transfer" command, at step 900 of FIG. 46, causes function 31 to send an acknowledgment to terminal 11, at step 901. Function 31 then saves the present state that it is in, at step 902. This step is the same as step 742, described previously. Function 31 then sends a "go to transfer state" command to terminal 11, at step 903, and then awaits acknowledgment of the command, at step 904. When it receives the acknowledgment, at step 905, function 31 proceeds to await receipt of the name or number to which the voice call should be transferred, at step 906.

When function 30 receives acknowledgment of the transfer command that it sent at step 801, at step 805 of FIG. 45, it waits for receipt of a command from system 16, at step 806. When it receives the command telling it to go into the transfer state, at step 807, it acknowledges it, at step 808, and then prompts the user for input of either the name or number to which he or she wishes to transfer the voice call, at step 809.

When the user keys in the requested name or number on the keyboard of terminal 11, function 30 collects the keyed-in information, at step 810, and sends it over the data call to system 16, at step 811. Function 30 then waits for an acknowledgment, at step 812, and when it receives the acknowledgment, at step 815, it waits for a response from system 16 indicating whether the transfer was successful, at step 816.

Upon receiving the name or number to which the voice call is to be transferred, at step 910 of FIG. 46, function 31 acknowledges it, at step 911, and then forwards the received name or number along with a transfer command to voice call processing of system 16. The voice call processing responds thereto by attempting to transfer the call in a conventional manner, and function 31 waits for a response from voice call processing indicative of whether or not the transfer attempt was successful, at step 913.

Figure 48:
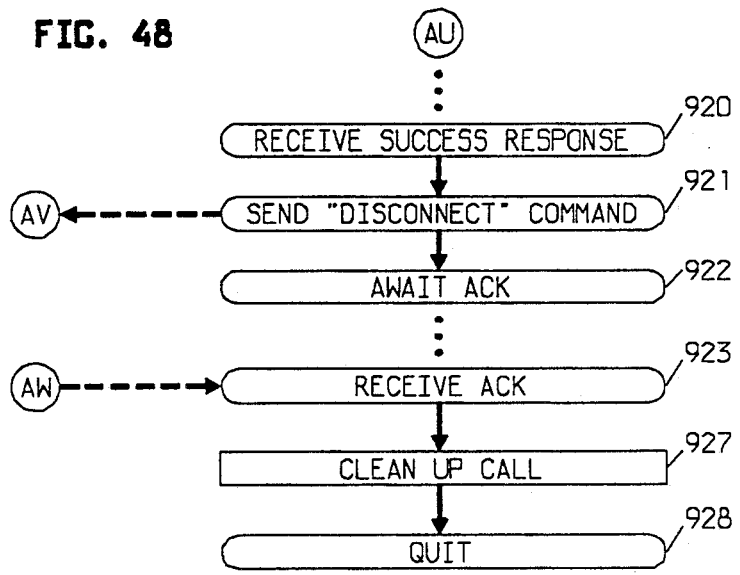

If the transfer was successful, function 31 performs the activities of FIG. 48 and returns to "idle" state 3000 of FIG. 3. Function 31 receives indication that the transfer was successful from the voice call processing of system 16, at step 920. The communication session between the user of terminal 11 and system 16 has been ended by the transfer, so function 31 sends a "disconnect" command to terminal 11, at step 921, and then waits for an acknowledgment, at step 922. When it receives the acknowledgment, function 31 cleans up the data call, at step 927, in the manner described for step 722, and then quits, at step 928.

Figure 47:
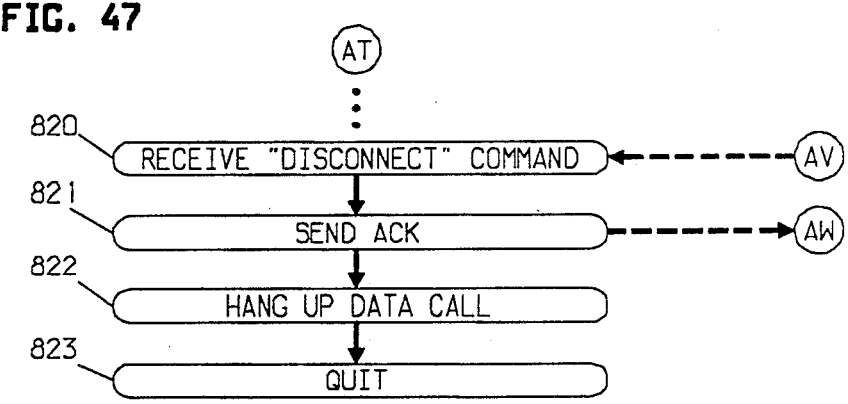

If the transfer was successful, function 30 performs the activities of FIG. 47 and returns to "stop" state 2000 of FIG. 2. Receipt of the "disconnect" command, at step 920, indicates to function 30 that the transfer was successful. Function 30 acknowledges the command, at step 821, and then hangs up the data call, at step 822, in the manner described for step 621. Function 30 then quits, at step 823.

Figure 50:
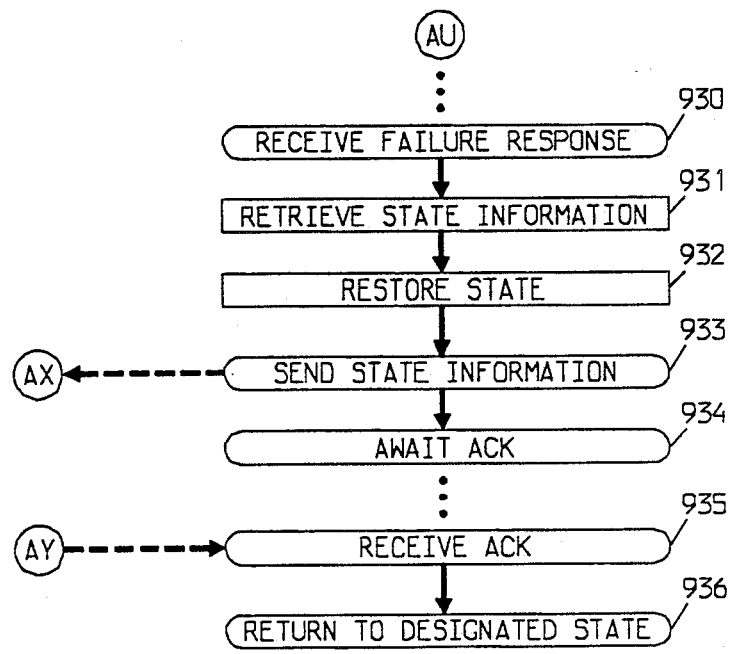

If the transfer was unsuccessful, function 31 performs the activities of FIG. 50 and returns to whatever state it had been in at step 900 of FIG. 46. Function 31 receives indication that the transfer was unsuccessful from the voice call processing of system 16, at step 930. The failure signifies that the communication session between the user of terminal 11 and system 16 will continue. Function 31 therefore retrieves the state information that it stored at step 902, at step 931, and restores the state represented by that retrieved information, at step 932, in the manner described for step 773. Function 31 also sends the requisite state information to terminal 11, at step 933, to enable function 30 to resume the point in its operation from which it was sent to transfer state 2056. Function 31 then waits for an acknowledgment, at step 934. Upon receipt of the acknowledgment, at step 935, function 31 returns to whatever point the restored state represents, at step 936—in this example, to step 519 of FIG. 20—to wait for a new command from terminal 11.

Figure 49:
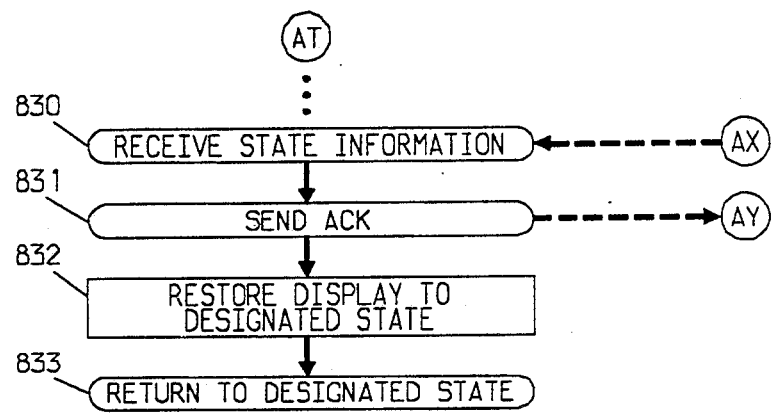

If the transfer was unsuccessful, function 30 performs the activities of FIG. 49 and returns to whatever state it had been in at step 800 of FIG. 45. Receipt of the state information, at step 830, indicates to function 30 that the transfer failed. Function 30 acknowledges the information, at step 831, uses it to restore the display of terminal 11, at step 832, in the manner described for step 679, and then returns to the designated state, at step 833. In this example, function 30 returns to step 422 of FIG. 19.

Returning to step 422 of FIG. 19, the user's selection of the "play message" option causes the message with respect to which the option was exercised to be aurally provided to the user via the voice channel. Selection of this option causes functions 30 and 31 to undergo transition 2050 from FIG. 5 to "disposition-play" state of FIG. 6. The activities performed by functions 30 and 31 in response to selection of this option are shown in FIGS. 51 and 52, respectively.

Figure 51:
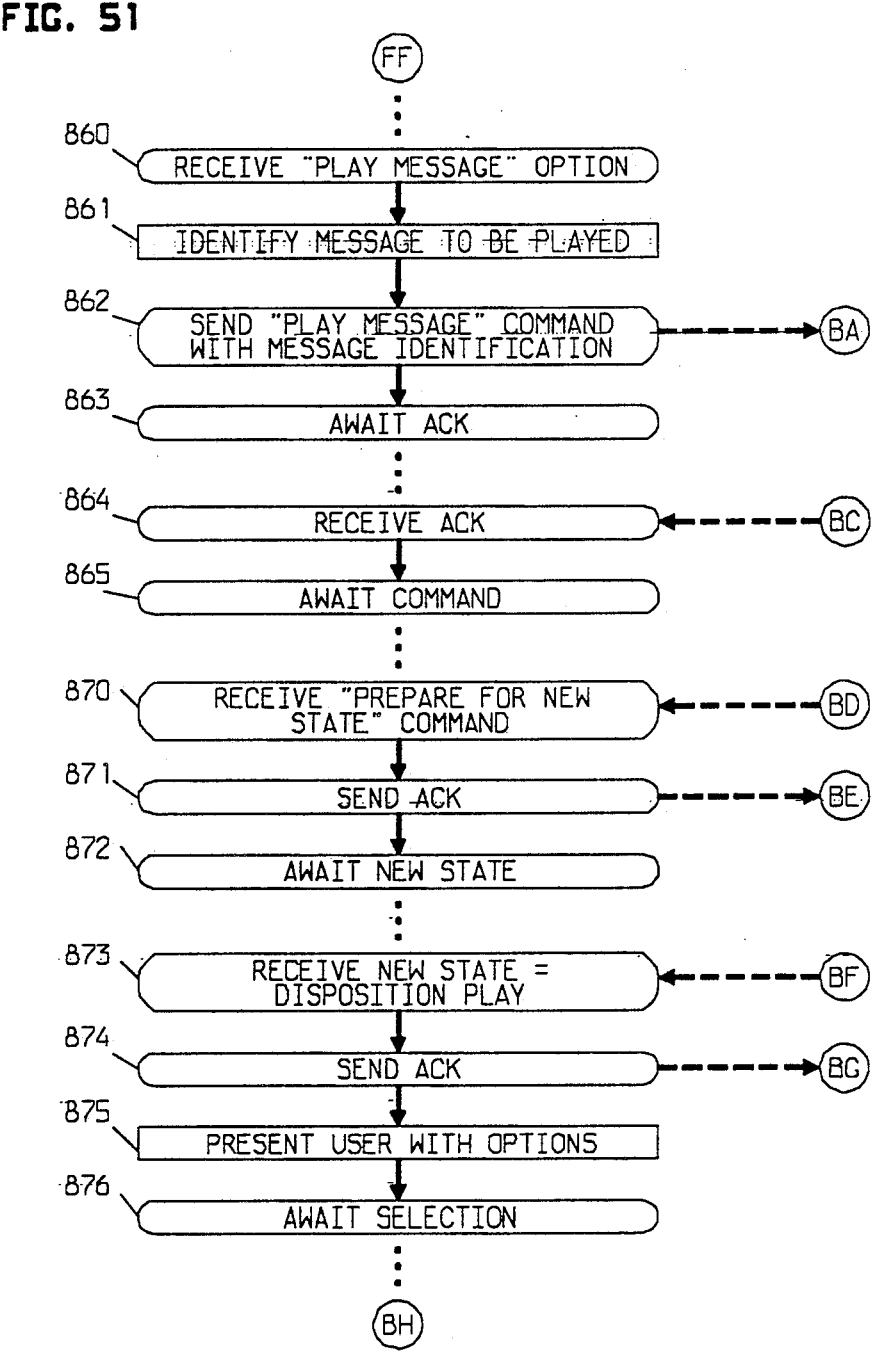

In response to receiving the user's selection of the "play message" option, at step 860 of FIG. 51, function 30 identifies the message which the user wants played, at step 861. Illustratively, function 30 identifies the message to be played by determining next to which message header did the user touch the play option touchpoint on a touch-sensitive screen of terminal 11, or by receiving from the keyboard the user's input of a number that corresponds to a message header displayed on the screen (e.g., the number 3 to represent the third message header). Optionally, function 30 may cause terminal 11 to place—to display—a symbol, such as an asterisk, by the selected message, to give the user a quick indication of the messages that he or she has already listened to. Function 30 then sends a "play message" command with a message identifier to system 16 over the data call, at step 862, and waits for an acknowledgement thereof at step 863. Upon receipt of the acknowledgement, at step 864, function 30 awaits receipt of a command from system 16, at step 865.

Figure 52:
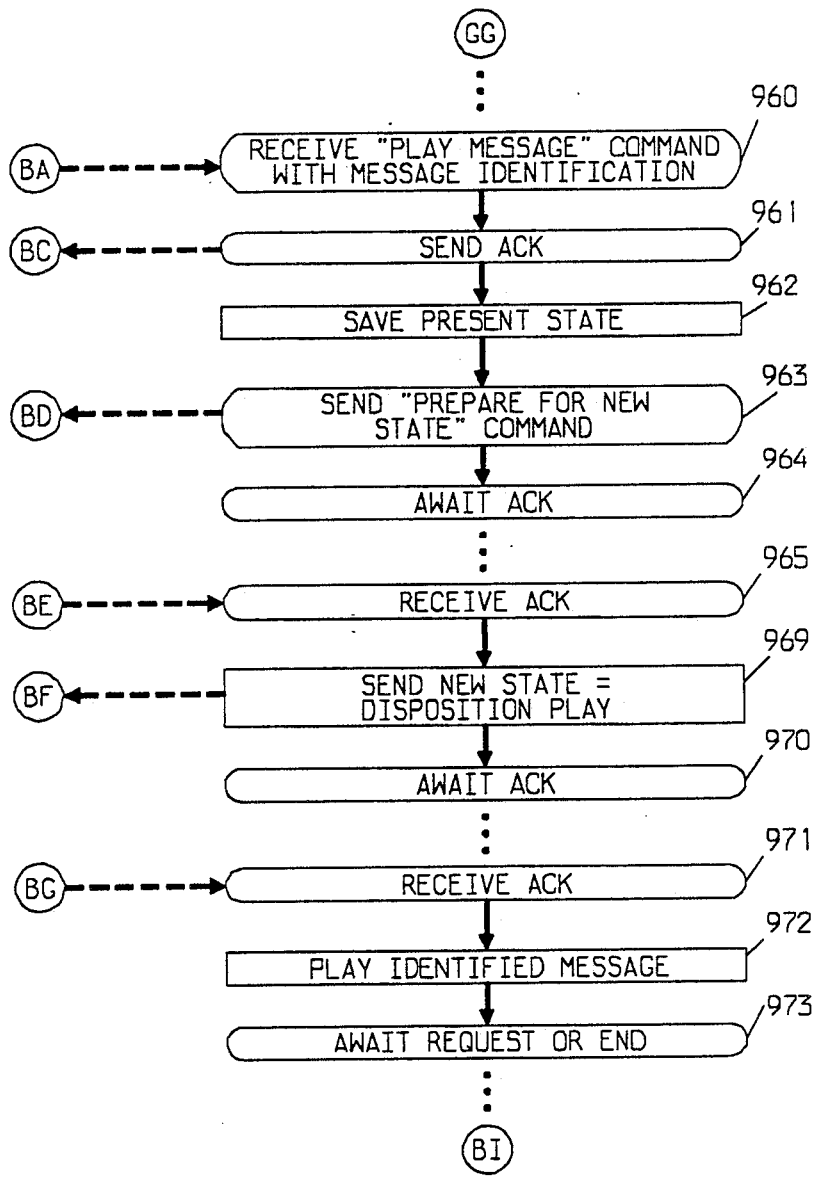
Figure 53:
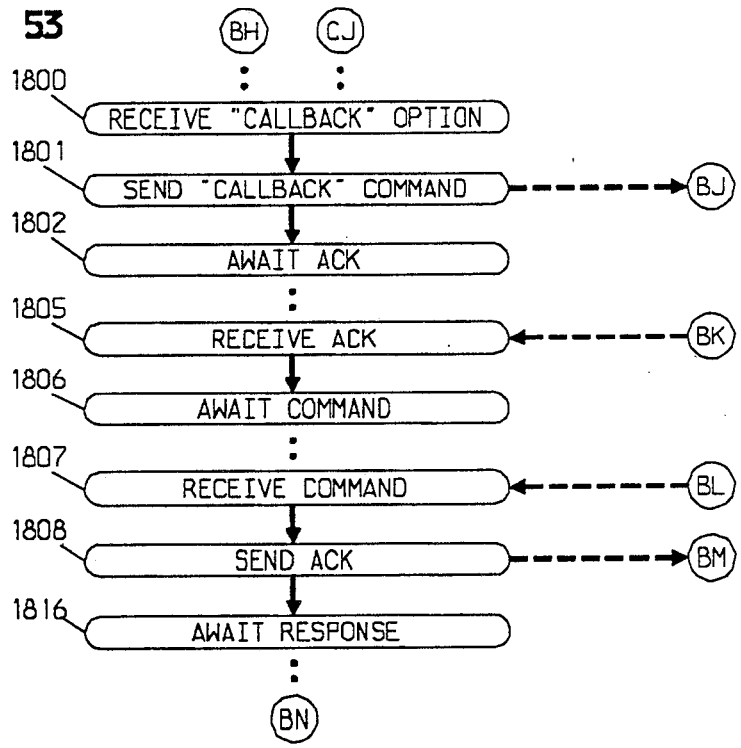
Figure 54:
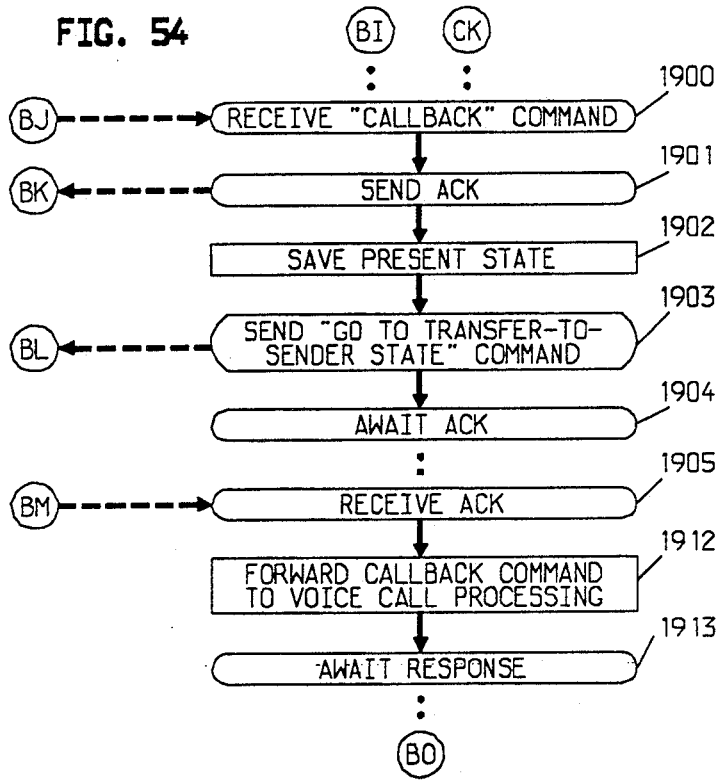
Figure 55:
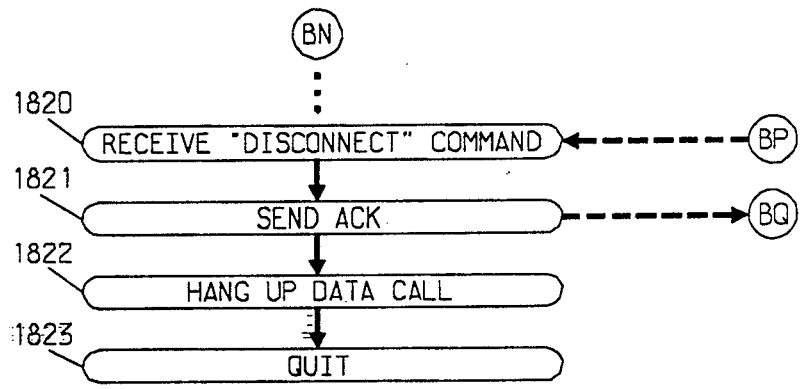
Figure 56:
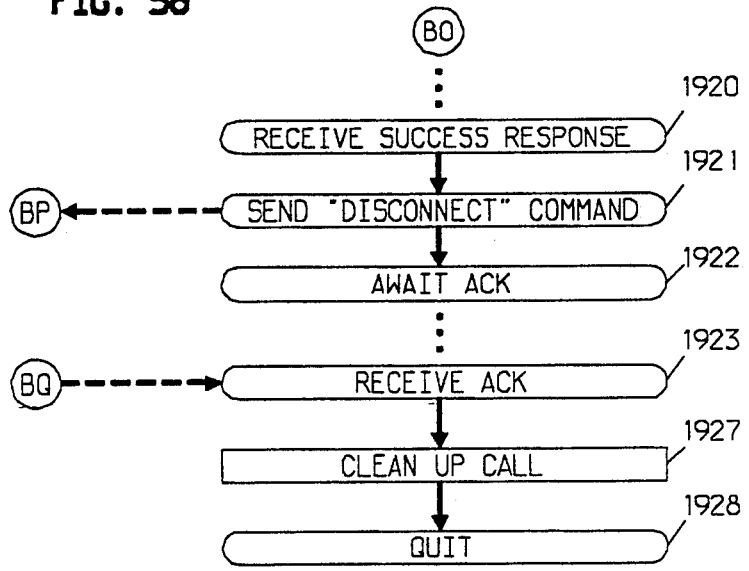
Figure 57:
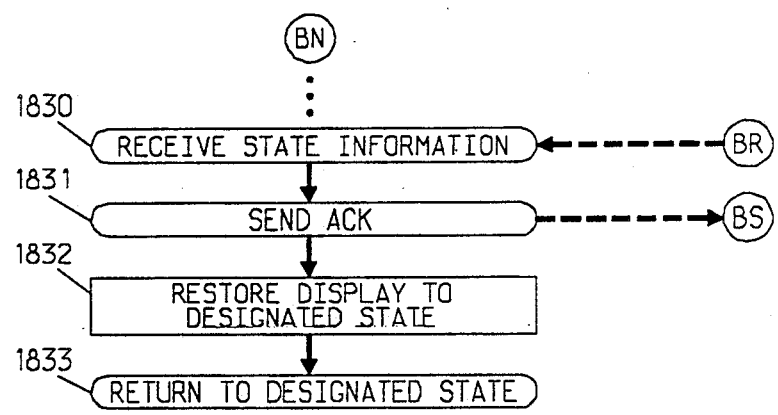
Figure 58:
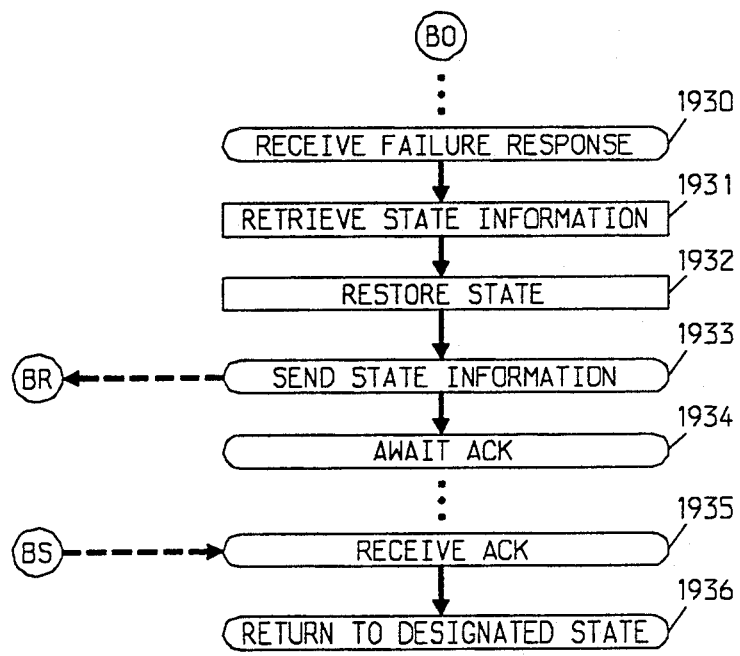

Function 31 receives the "play message" command and associated message identifier, at step 960 of FIG. 52, and acknowledges it, at step 961. Function 31 then saves the present state of system 16, at step 962, to enable the system 16 to return to this point in its operation later on, if need be. Function 31 also responds by sending a "prepare for new state" command over the data call to terminal 11, at step 963. Function 31 then waits for an acknowledgment, at step 964. Upon receipt thereof, at step 965, function 31 sends a message over the data call to terminal 11 notifying it that the new state is "disposition-play" state 2060, at step 969. Function then waits for an acknowledgment of the message, at step 970.

When function 30 receives the "prepare for new state" command, at step 870 of FIG. 51, it acknowledges the command, at step 871, and then waits for receipt of the new state message, at step 872. When it receives the message indicating that the new state is "disposition-play" state 2060, at step 873, function 30 acknowledges the message, at step 874, and then presents a menu of message disposition options to the user of terminal 11 on the screen of terminal 11, at step 875. Function 30 then awaits the user's selection of one of the options, at step 876.

When function 31 receives the acknowledgment of the new state-indicating message, at step 871 of FIG. 52, it causes system 16 to play the identified message over the voice call, in a conventional manner, at step 972. Function 31 then waits to receive the user's new option selection from terminal 11, or notification from voice call processing of system 16 that the identified message has been played to its end, at step 973.

The options which are presented to the user by the message disposition menu at step 875 of FIG. 51 are the conventional options: the options "wait", "help", "directory", "disconnect", "transfer", and "return to activity menu" which were discussed above; a "callback" option to transfer the voice call to the originator of the playing message, if the originator's number is known; a "delete message" option to delete the playing message; a "stop" option to stop play of the playing message; a "scan" option to return to the preceding message header scanning state; and a set of message reply and message response options. An illustrative message disposition screen displayed by terminal 11 is shown in FIG. 113.

Figure 6:
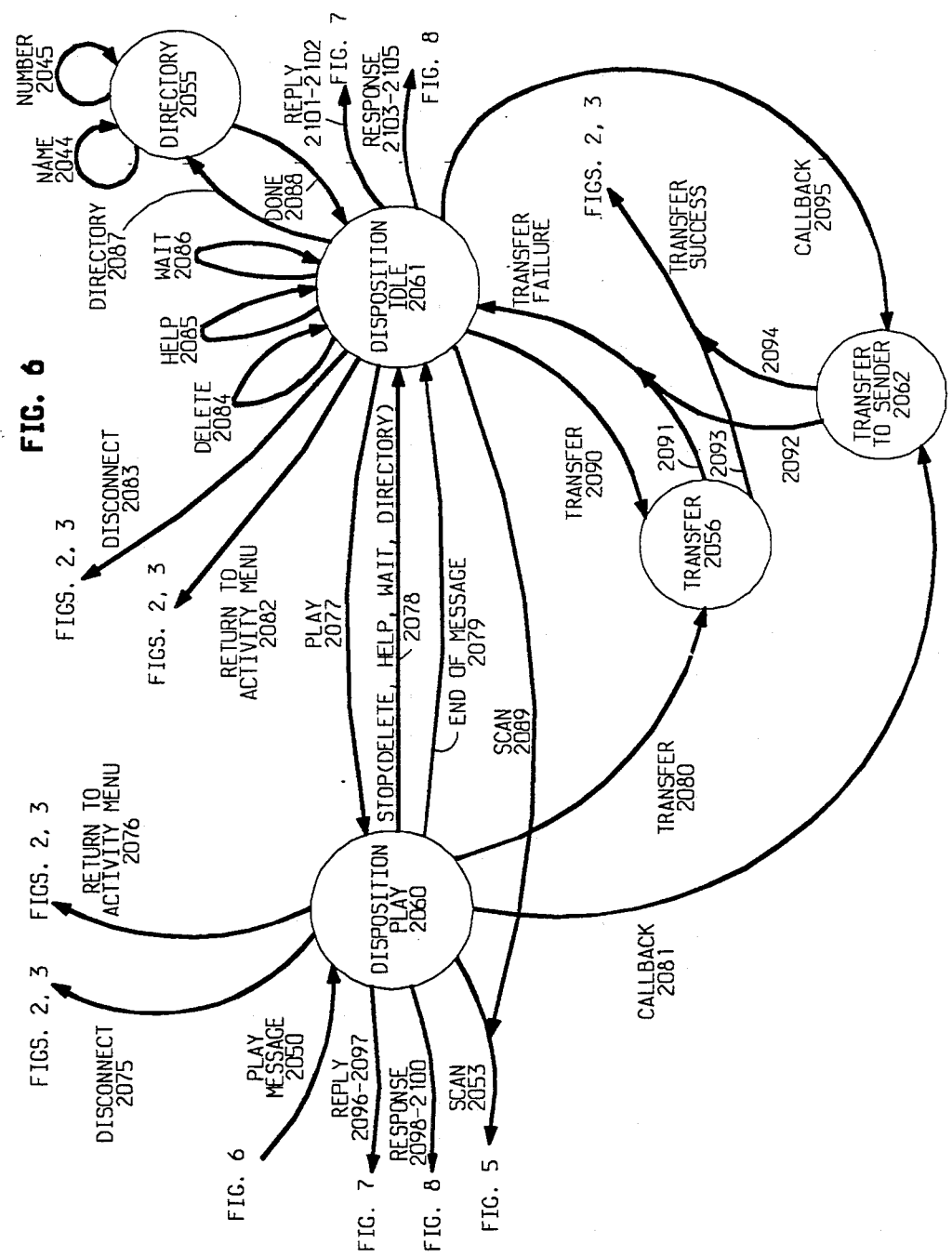

Selection of the "return to activity menu" option causes functions 30 and 31 to make transition 2076 from FIG. 6 to "activity menu" state 2006 of FIGS. 2 and 3. The activities performed by functions 30 and 31 in response to this selection are shown in FIGS. 23 and 24, respectively.

Selection of the "disconnect" option causes functions 30 and 31 to make a state transition 2075 from FIG. 6 to "stop" state 2000 of FIG. 2 and "idle" state 3000 of FIG. 3, respectively. The activities performed in response to this selection are shown in FIGS. 33 and 34.

Selection of the "transfer" option causes functions 30 and 31 to make a state transition 2080 to "transfer" state 2056 and, depending upon whether or not the transfer is successful, either a transition 2093 to states 2000 of FIG. 2 and 3000 of FIG. 3 or a transition 2091 to "disposition-idle" state 2061, respectively (see FIG. 6). The activities associated with the "transfer" option are shown in FIGS. 45-50.

Selection of the "callback" option causes functions 30 and 31 to make a state transition 2081 to "transfer to sender" state 2062 and, depending upon whether or not the transfer is successful, either a transition 2094 to states 2000 and 3000 or a transition 2092 to "disposition-idle" state 2061, respectively (see FIG. 6). These transitions and state 2062 parallel closely the transitions to "transfer" state 2056, and the state 2056 itself. The activities associated with the "callback" option are shown in FIGS. 53-58. A comparison of FIGS. 53-58 with FIGS. 45-50 shows that they are substantially identical. Because the "callback" option is a transfer of the voice call to the originator of the playing message, the destination of the transfer, i.e., the transferee, is known to system 16, and hence his or her name or number need not be collected from the user of terminal 11. Consequently, FIG. 53 lacks steps equivalent to steps 809-815 of FIG. 45, and FIG. 54 lacks steps equivalent to steps 906-911 of FIG. 46.

Selection of the "scan" option at step 876 of FIG. 51 causes functions 30 and 31 to make a transition 2053 from "disposition-play" state of FIG. 6 to the immediately-preceding message header scanning state—one of the states 2030-2032 of FIG. 5 in this example. The activities performed by functions 30 and 31 in response to this selection are shown in FIGS. 59 and 60, respectively.

In response to receipt of the selection of the "scan" option, at step 880 of FIG. 59, function 30 sends a "return to scanning" command to system 16 over the data channel, at step 881, and awaits an acknowledgment thereof, at step 882. Upon receipt of the acknowledgment, at step 883, function 30 waits to receive the state information from system 16 that will enable it to return to the proceding scan state, at step 884.

When function 31 receives the "return to scanning" command, at step 980 of FIG. 60, it acknowledges it, at step 981, and the retrieves the state information that it saved at step 962, at step 982. Using this information, function 30 restores the saved state on system 16, at step 983, and then sends the requisite state information over the data channel to terminal 11 to enable terminal 11 to restore that state as well, at step 984. Function 31 then waits for an acknowledgment of the state information, at step 985, and upon receipt thereof, at step 986, returns to the designated, i.e., the restored, state, at step 987.

When function 30 receives the state information from system 16, at step 885 of FIG. 59, it acknowledges it, at step 886. Function 30 then uses that information to restore the display of terminal 11 to what it had been in the state which is now being restored, at step 887, and returns to that state, at step 888.

Selection of the "stop" option at step 876 of FIG. 51 causes functions 30 and 31 to make transition 2078 from "disposition-play" state 2060 to "disposition-idle" state 2061 (see FIG. 6). Furthermore, selection of the "delete", "help", "wait", and "directory" options at step 876 includes the activities involved in selection of the "stop" option; hence, these options are also shown as precipitating transition 2078. Substantially the only difference between states 2060 and 2061 is that, whereas in state 2060 a selected message is playing and the user has the option of stopping its play, in state 2061 the selected message is not playing—either because its play was stopped or because the play completed—and the user has an option of starting its play from the beginning. The activities performed by functions 30 and 31 in response to selection of the abovementioned options in state 2060 are shown in FIGS. 61 and 62 respectively.

Figure 61:
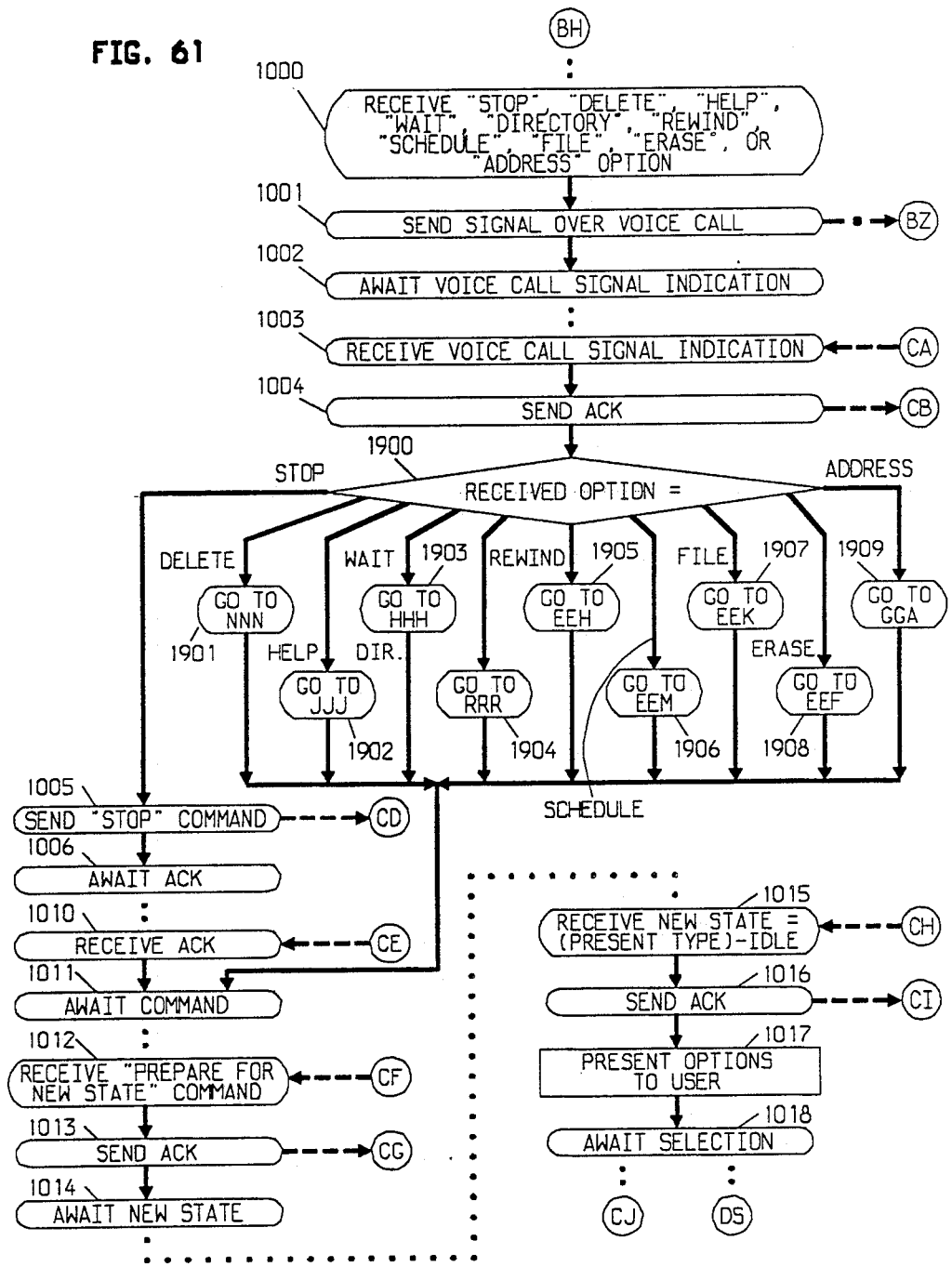
Figure 62:
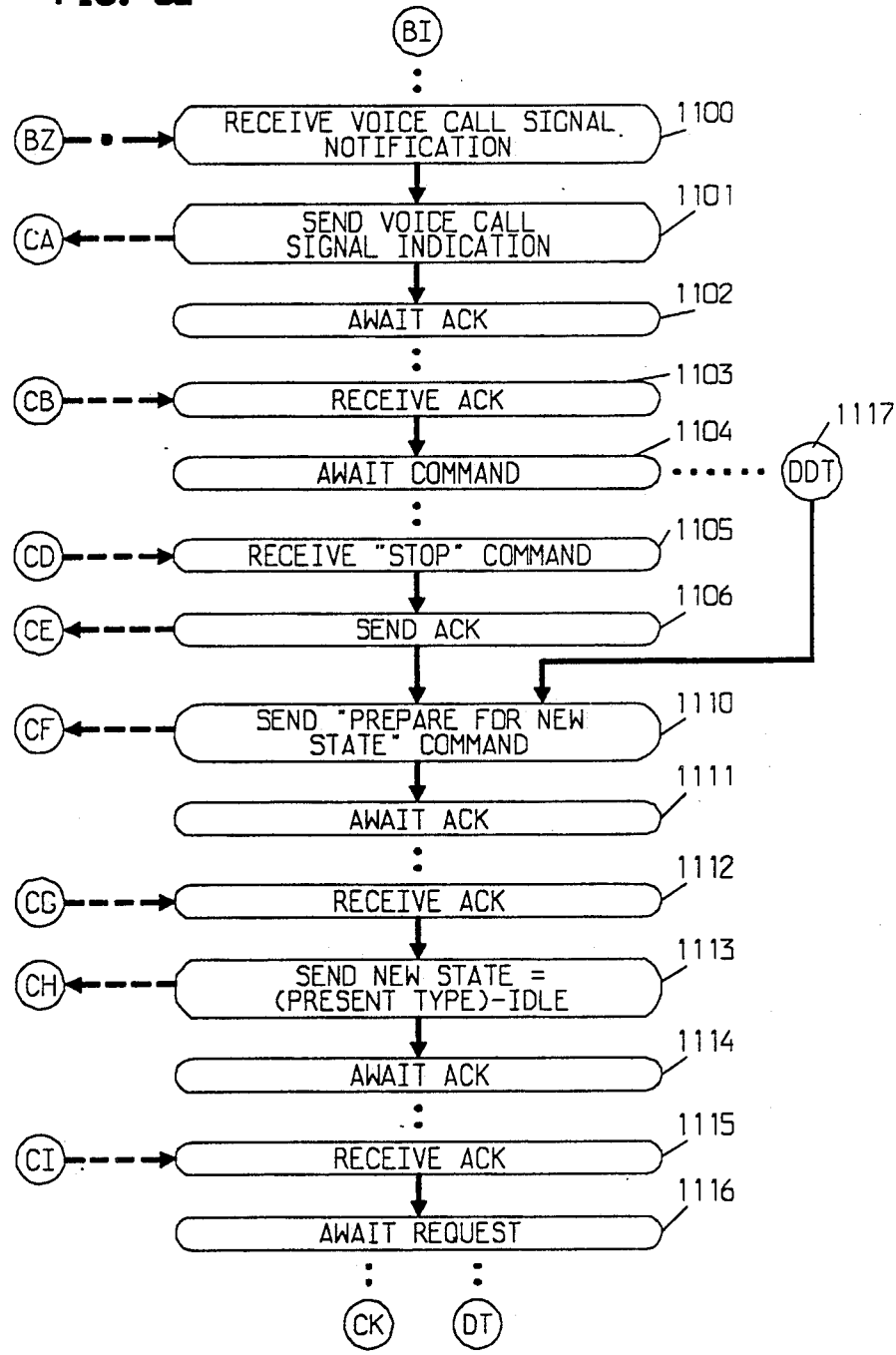

In response to receipt of one of the abovementioned options, at step 1000 of FIG. 61 function 30 causes terminal 11 to send a signal, such as a Touch-Tone signal, to system 16 over the voice channel, at step 1001. Function 30 then awaits receipt of a voice call signal indication from system 16 over the data channel, at step 1002. Alternatively, if terminal 11 does not have access to the voice channel, function 30 either causes voice terminal 10 to perform step 1001 or depends upon the user to cause voice terminal 10 to perform step 1001.

The voice channel signal is received by voice call processing of system 16, which stops play of the message and notifies function 31. The meaning of the signal is not clearly defined to system 16 at this point, as the signal may represent any one of a number of different requests. Hence, upon receiving the notice from voice call processing, at step 1100 of FIG. 62, function 31 sends a voice call signal indication to terminal 11 over the data channel, at step 1101, which indication serves as a request for clarification of the signal's meaning. Function 31 then awaits acknowledgment of the indication, at step 1102, and upon receipt thereof, at step 1103, awaits receipt of the command which represents the voice call signal's intended meaning, at step 1104.

Upon receipt of the voice-call signal indication from system 16, at step 1003 of FIG. 61, function 30 acknowledges it, at step 1004, and then proceeds to select and send to system 16 over the data channel a command that corresponds to the option that had been selected, as shown by steps 1900–1905, to inform function 31 of the precise meaning of the voice-call signal. The activities performed by function 30 at this point in response to the "delete", "help", "wait", and "directory" options are shown in FIGS. 31, 27, 29, and 37, respectively. Thereafter, function 30 proceeds to step 1011 of FIG. 61.

If the "stop" option has been received at step 1000, function 30 proceeds from step 1900 to step 1005 to send the "stop" command to system 16. Function 30 then awaits acknowledgment of the "stop" command, at step 1006, and upon receipt thereof, at step 1010, waits for receipt of a command from system 16, at step 1011.

The activities performed by function 31 at step 1117 in response to the "delete", "help", "await", and "directory" commands are shown in FIGS. 32, 28, 30, and 38, respectively. Thereafter, function 31 proceeds to step 1110 of FIG. 62.

When function 31 receives the "stop" command, at step 1105 of FIG. 62 it merely acknowledges it, at step 1106; since the playing of the message has already been stopped, nothing more need be done in response to that command. Function 31 then proceeds to step 1110.

At step 1110, function 31 sends a "prepare for new state" command to terminal 11, and then waits for an acknowledgment, at step 1111. When it receives the acknowledgment, at step 1112, function 31 sends a command to terminal 11 advising it that the new state is the idle state of the present state type—"disposition-idle" state 2061 in this example—at step 1113. Function 31 then waits for an acknowledgment, at step 1114, and upon receipt thereof, at step 1115, function 31 waits for receipt of a new request from terminal 11, at step 1116.

Function 30 receives the "prepare for new state" command, at step 1012 of FIG. 61, acknowledges it, at step 1013, and then waits for receipt of the new state, at step 1014. When it receives the command indicating the new idle state—"disposition-idle" state 2061 in this example—at step 1015, function 30 acknowledges it, at step 1016, presents the menu of user options associated with this state to the user on the display of terminal 11, at step 1017, and then awaits the user's option selection, at step 1018.

Figure 63:
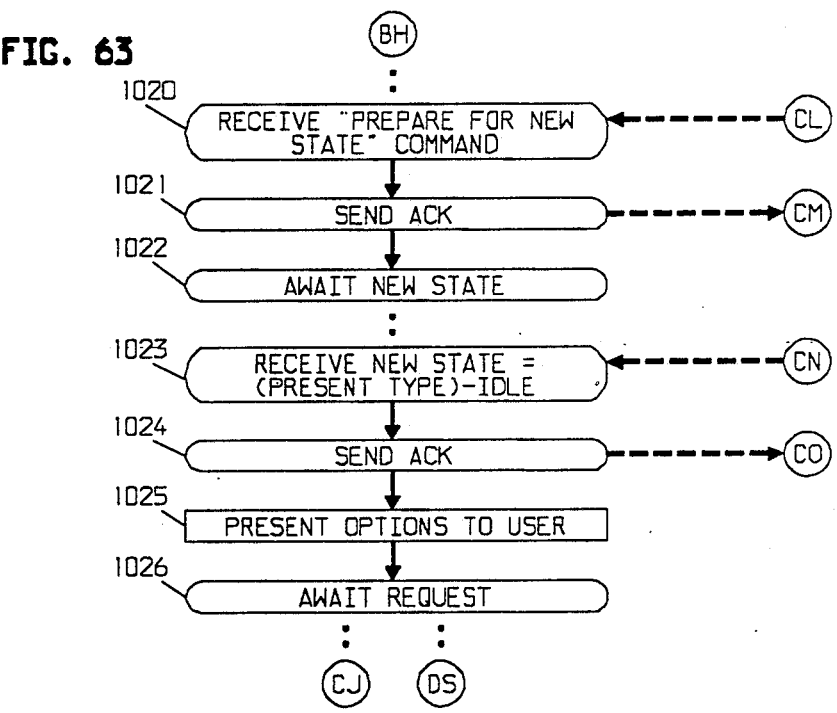
Figure 64:
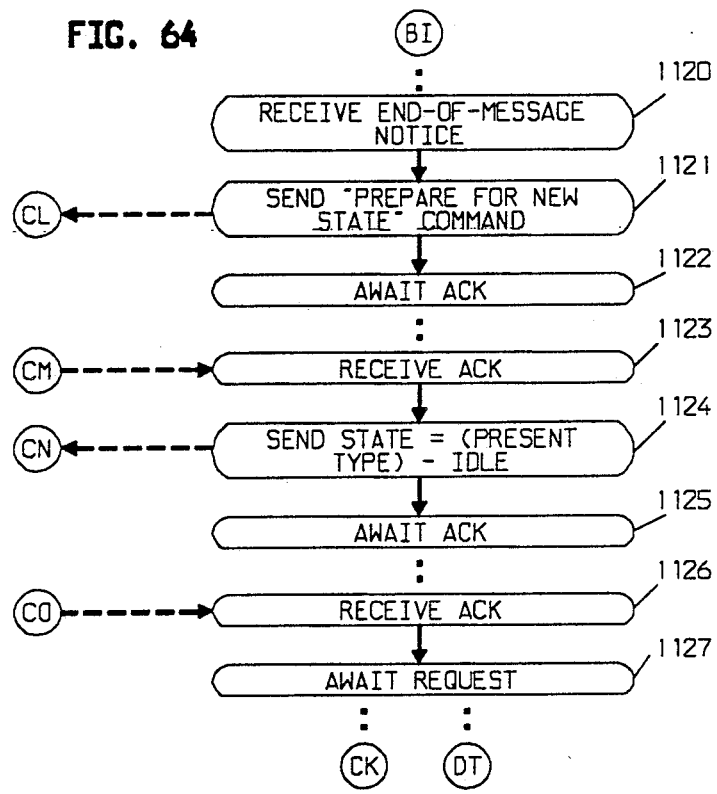

The completion of the play of a message being played in "disposition-play" state 2060 of FIG. 6 has a similar effect to selection of the "stop" option in step 876 of FIG. 51: it causes functions 30 and 31 to make a transition 2079 from state 2060 to "disposition-idle" state 2061 of FIG. 6. The activities performed by functions 30 and 31 in response to the end of a message are shown in FIGS. 63 and 64, respectively.

When the playing of a message completes, voice call processing of system 16 sends an end-of-message notice to function 31. When function 31 receives this notice, at step 1120 of FIG. 64, it performs the activities of steps 1120–1127, which duplicate the activities of steps 1110–1116 of FIG. 62. Comparably, function 30 performs the activities of steps 1020–1026 of FIG. 63, which duplicate the activities of steps 1012–1018 of FIG. 61.

The options which are available to the user in "disposition-idle" state 2061 of FIG. 6 are the same as the options available in "disposition-play" state 2060—with one exception. The exception is that, in state 2061, the "stop" option of state 2060 is replaced with the "play" option. The activities performed with respect to these common options are likewise the same, but for the activities performed in response to the "delete", "help", "wait", and "directory" options, which case to include the steps that in state 2060 they had in common with the "stop" option.

Selection of the "delete" option causes functions 30 and 31 to make a transition 2084 without changing state. The activities performed in response to this selection are shown in FIGS. 31 and 32.

Selection of the "help" or "wait" option causes functions 30 and 31 to make transition 2085 or 2086, respectively, without undergoing a state change. The activities performed in response to these selection are shown in FIGS. 27–28 and 29–30, respectively.

Selection of the "directory" option causes functions 30 and 31 to make a transition 2087 to directory state 2055, and eventually a transition 2088 back to state 2061. The activities associated with the directory option are shown in FIGS. 37–44.

Selection of the "play" option in "disposition-idle" state 2061 causes functions 30 and 31 to make a transition 2077 from "disposition-idle" state 2061 to "disposition-play" state 2060 to replay the last-played message (see FIG. 6). The activities performed by functions 30 and 31 in response to selection of this option are shown in FIGS. 65 and 66, respectively.

Figure 65:
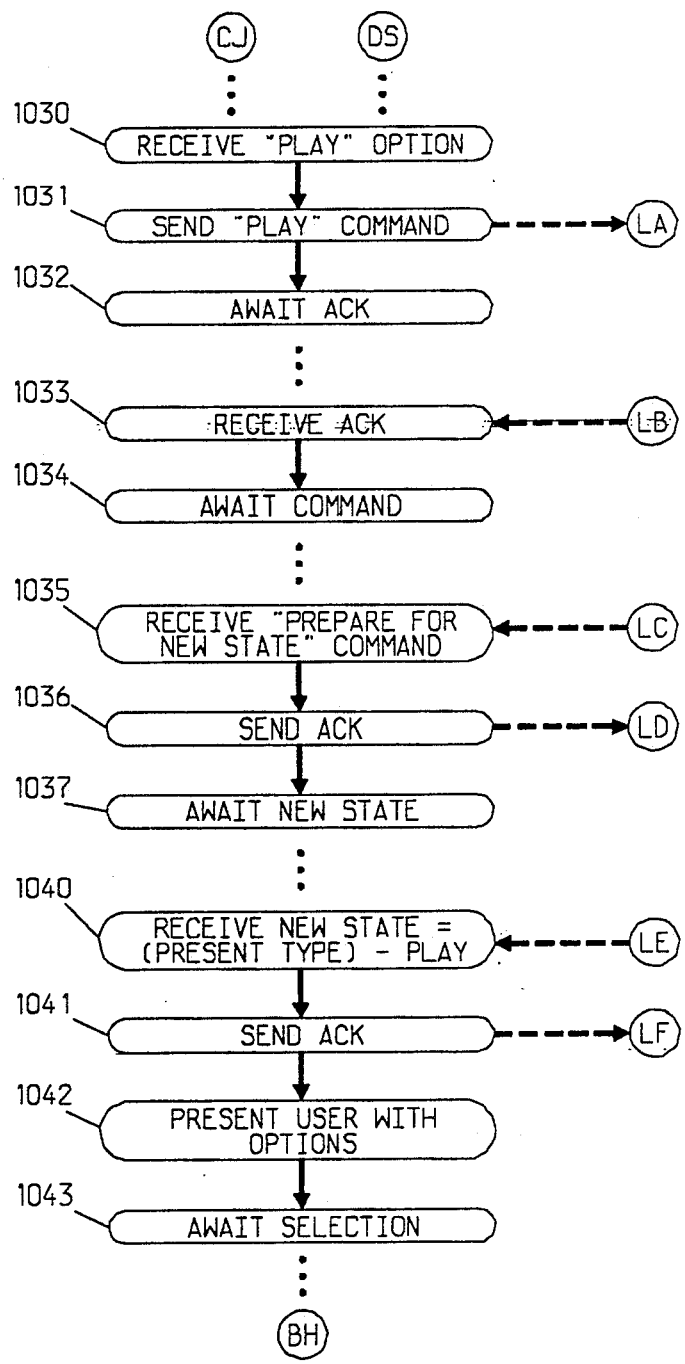

Function 30 receives the user's selection of the "play" option, at step 1030 of FIG. 65, and responds by sending a "play" command to system 16 over the data link, at step 1031. The command implicitly identifies the present message under consideration as the message to be played. Function 30 then waits for an acknowledgment, at step 1032.

Figure 66:
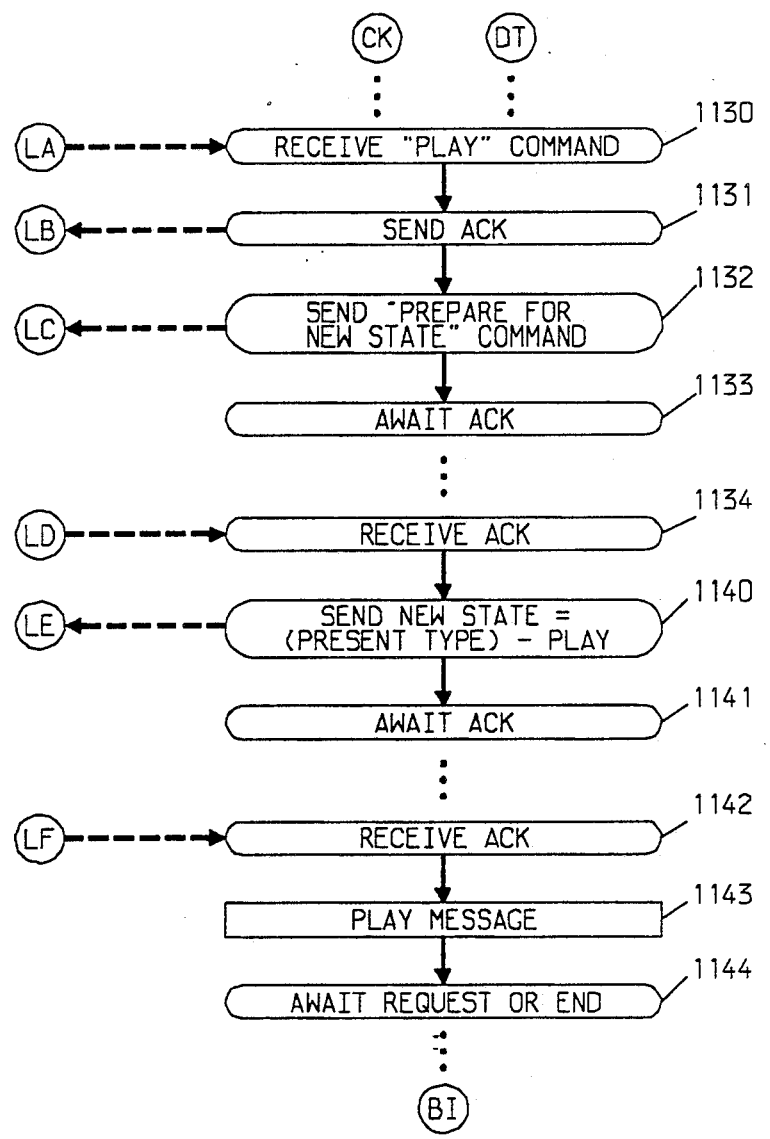

Upon receipt of the "play" command, at step 1130 of FIG. 66, function 31 acknowledges it, at step 1131, sends to terminal 11 a "prepare for new state" command, at step 1132, and then waits for an acknowledgment, at step 1133. Upon receipt thereof, at step 1134, function 31 sends an indication to terminal 11 that the new state is the play state of the present state type—"disposition-play" state 2060 in this example—at step 1140, and waits for an acknowledgment, at step 1141.

Function 30 receives acknowledgment of the "play" command, at step 1033 of FIG. 65, and then waits for receipt of a command from function 31, at step 1034. Upon receipt of the "prepare for new state" command, at step 1035, function 30 acknowledges it, at step 1036, and awaits receipt of the new state, at step 1037. When it receives the new state indication, at step 1040, function 30 acknowledges it, at step 1041, presents the user with the options appropriate for this new state, at step 1042, and then awaits the user's next selection, at step 1043.

Upon receipt of acknowledgment of the new state, at step 1142 of FIG. 66, function 31 causes voice-call processing to play the desired message to the user over the voice channel, at step 1143. In this example, the previously-played incoming message is replayed as a consequence. Function 31 then waits for a new request from terminal 11, or an indication from voice-call processing of system 16 that playing of the message has completed, at step 1144.

As was mentioned previously, a plurality of reply and response options are also available at state 2060, and hence also at state 2061 of FIG. 6. The reply options are: "reply with the original message attached", and "reply without the original message attached". The response options are: "create a message", "forward the original message with a comment appended at the beginning", and "forward the original message with a comment appended at the end".

Figure 7:
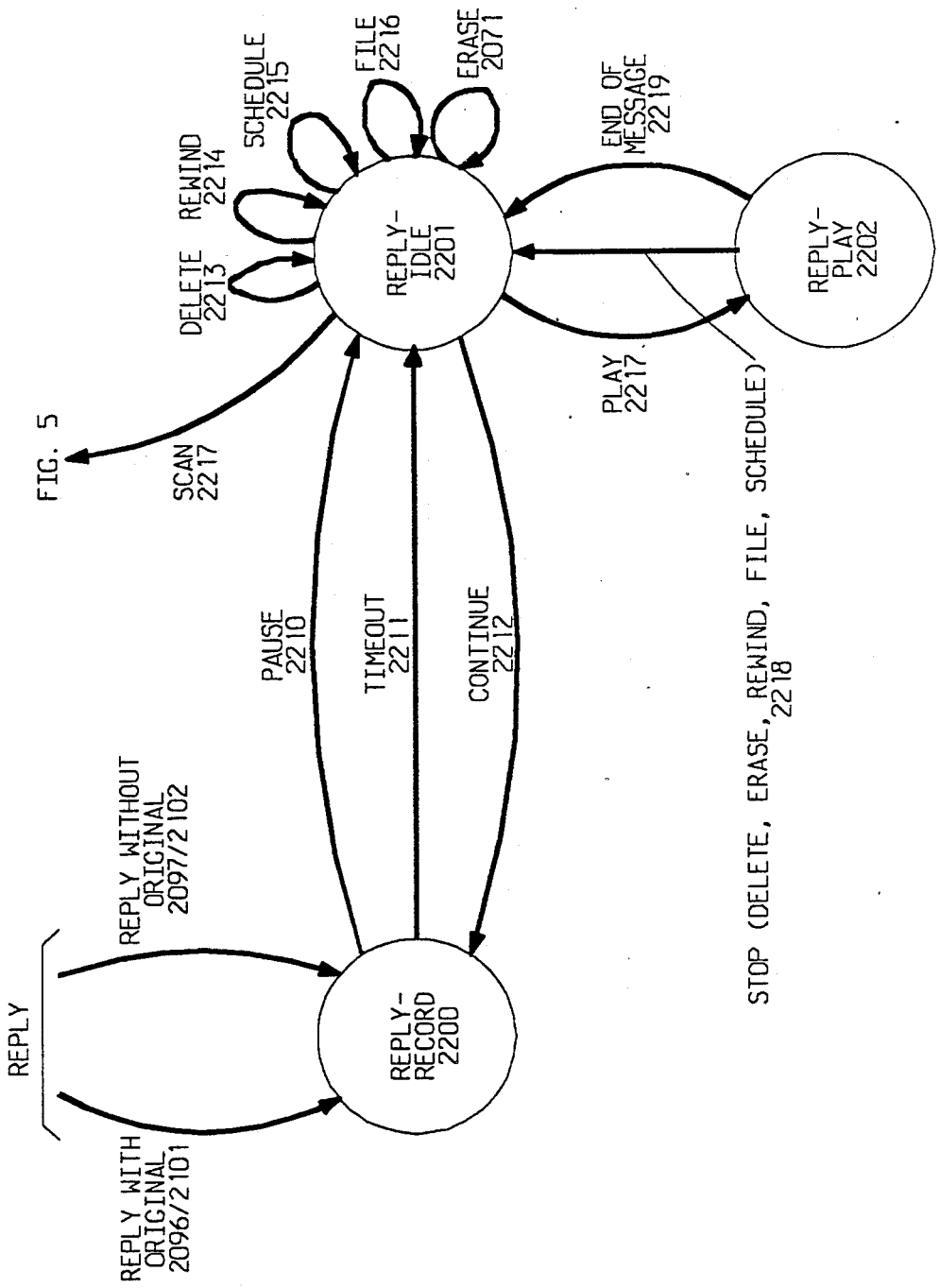

The reply options respectively cause functions 30 and 31 to make transitions 2096 and 2097 from "disposition-play" state 2060 of FIG. 6 to "reply-record" state 2200 of FIG. 7. Likewise, the reply options respectively cause functions 30 and 31 to make transitions 2101–2102 from "disposition-idle" state 2061 of FIG. 6 to "reply-record" state 2200. The activities performed by functions 30 and 31 for both reply options are substantially identical, and are shown in FIGS. 67 and 68, respectively.

Figure 67:
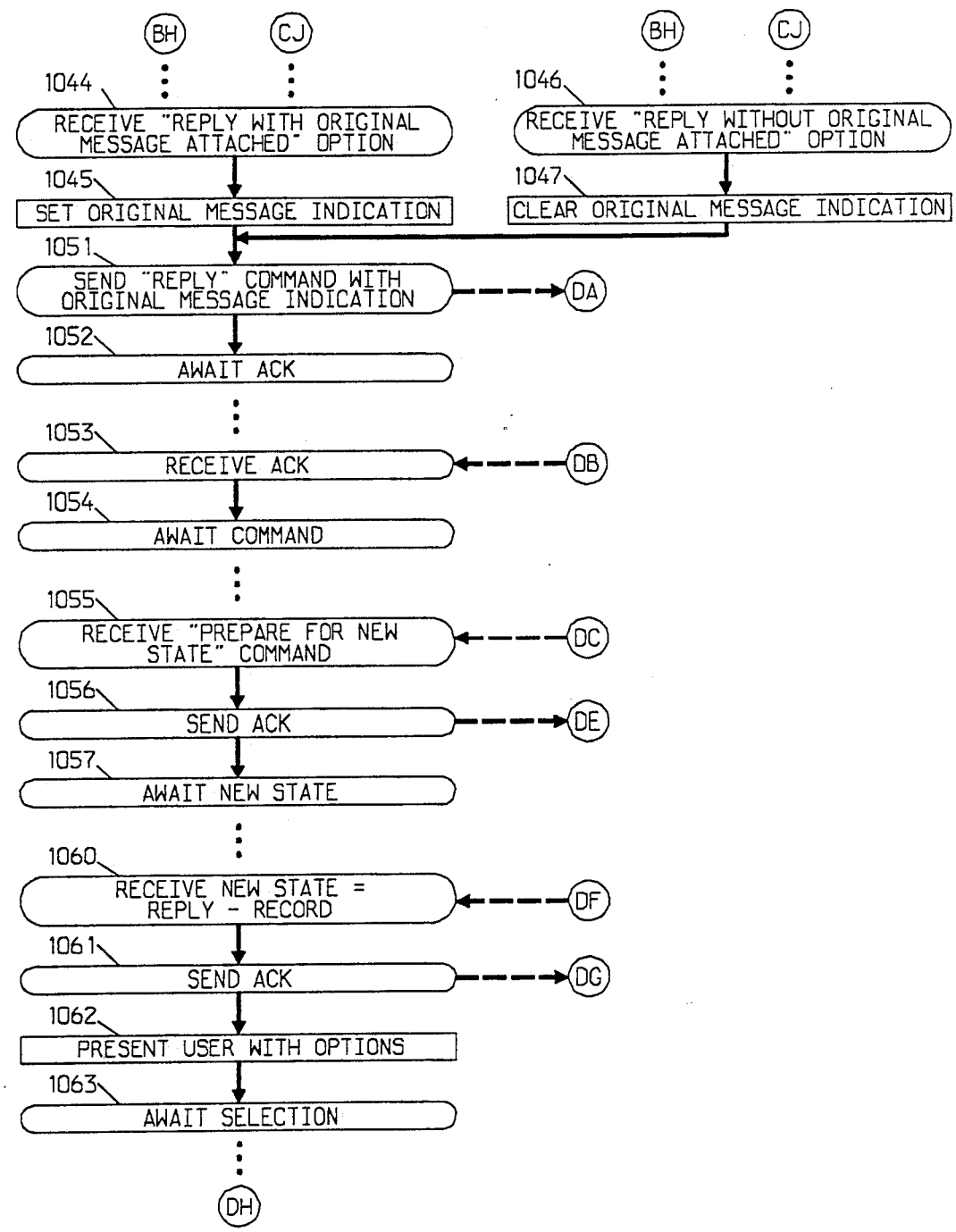

In response to receiving the user's selection of the "reply with original message attached" option, at step 1044 of FIG. 67, function 30 sets an "original message" indicator in a "reply" command, at step 1045, and then sends the "reply" command to system 16 over the data channel, at step 1051. In response to receiving the user's selection of the "reply without original message attached" option, at step 1046, function 30 clears the "original message" indicator in the "reply" command, at step 1047, and then proceeds to step 1051. Following step 1051, function 30 waits for an acknowledgment, at step 1052, and upon receipt thereof, at step 1053, waits for a command from system 16, at step 1054.

Figure 68:
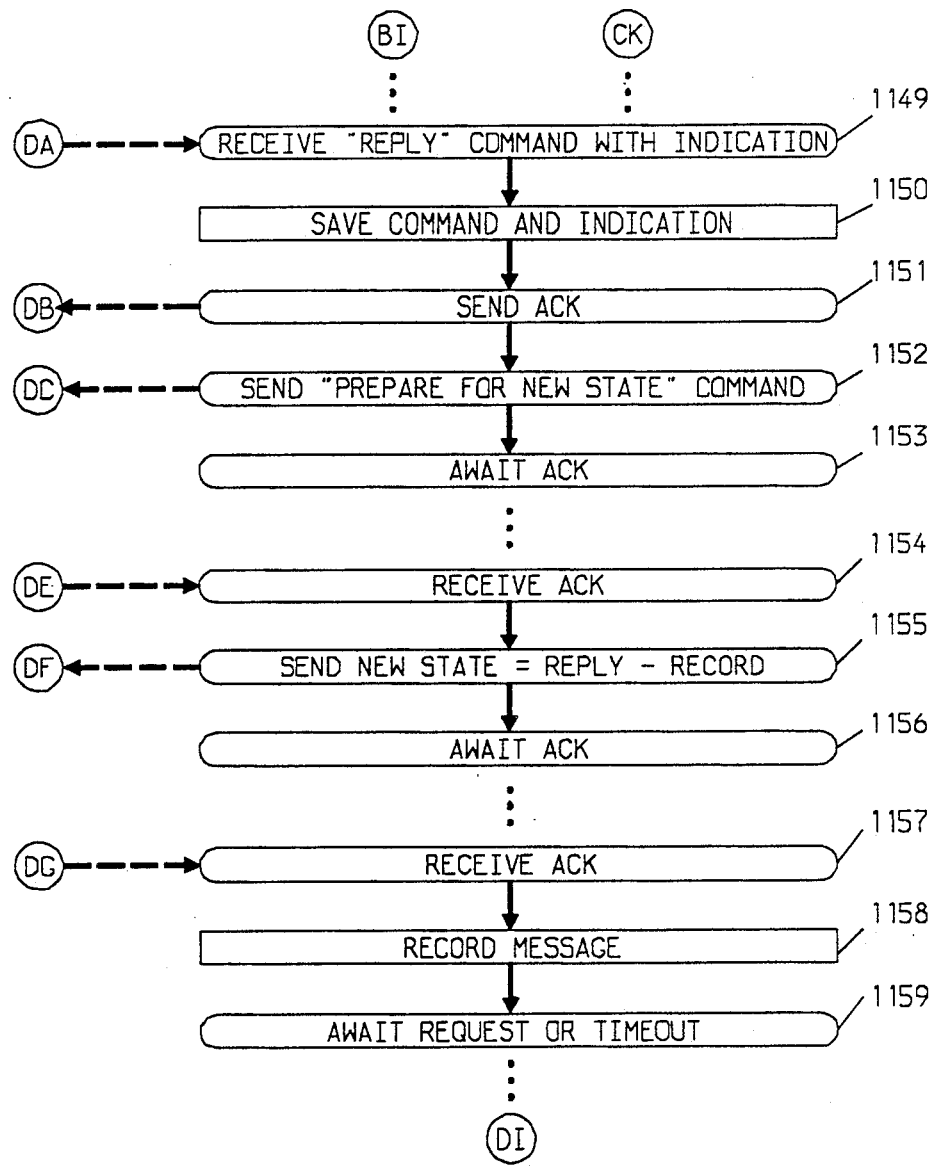

In response to receiving the "reply" command, at step 1149 of FIG. 68, function 31 saves the command and its associated indication, at step 1150. Function 31 then acknowledges it, at step 1151, sends to terminal 11 a "prepare for new state" command, at step 1152, and waits for an acknowledgment, at step 1153. Upon receiving the acknowledgment, at step 1154, function 31 sends a command advising terminal 11 that the new state is "reply-record" state 2200, at step 1155. Function 31 then waits for an acknowledgment, at step 1156.

Function 30 receives the "prepare for new state" command, at step 1055 of FIG. 67 acknowledges it, at step 1056, and then waits for arrival of the new state command, at step 1057. Upon receipt of the new state command specifying the "reply-record" state, at step 1060, function 30 acknowledges it, at step 1061, presents the user with options available to him or her in "reply-record" state 2200, at step 1062, and then awaits the user's selection of one of the options, at step 1063.

Upon receiving acknowledgment of the new state, at step 1157 of FIG. 68, function 31 causes system 16 to conventionally record a message over the voice call, at step 1158. Function 31 then awaits a new request from terminal 11 or notification from call processing of system 16 that the time available for recording of a message has expired, at step 1159.

Figure 69:
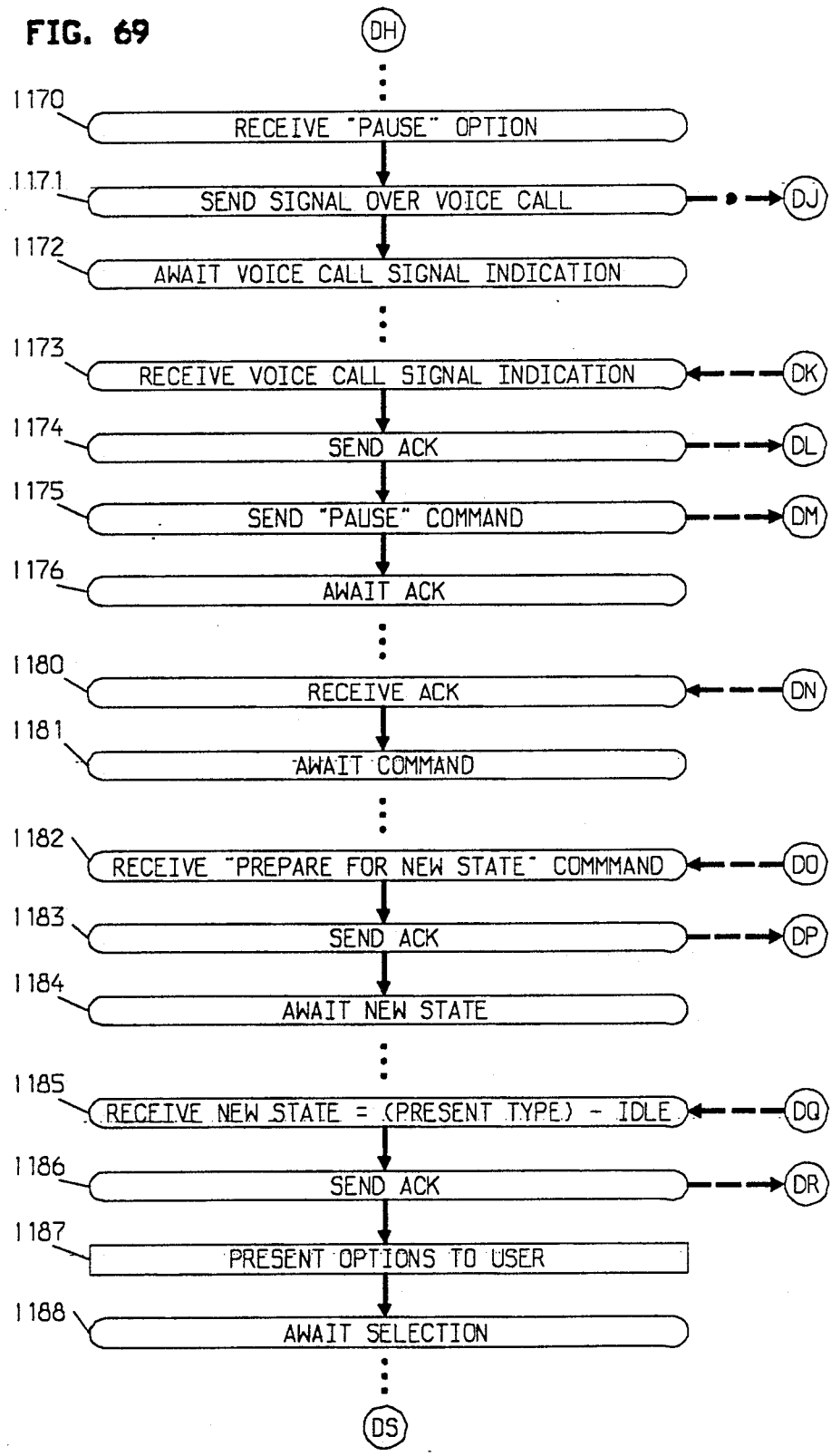
Figure 70:
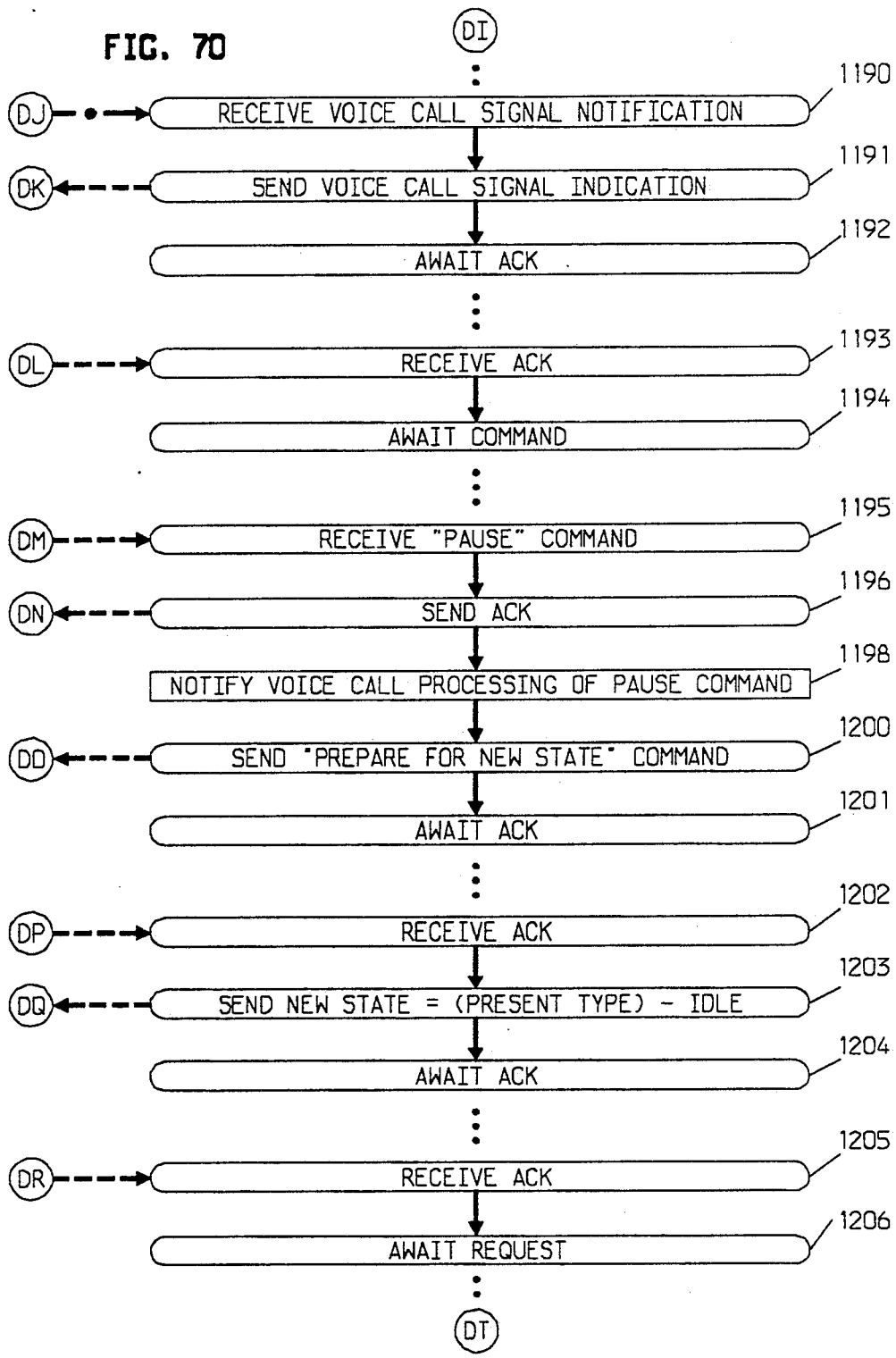

One option is available to the user in "reply-record" state 2200 of FIG. 7: to "pause" recording of the message. Selection of this option in this example causes functions 30 and 31 to make a transition 2210 to "reply-idle" state 2201. The activities performed by functions 30 and 31 in response to selection of this option are shown in FIGS. 69 and 70, respectively. A comparison of FIGS. 69 and 70 with FIGS. 61 and 62, respectively, shows that the activities performed by functions 30 and 31 in response to the "pause" option parallel those performed with respect to the "stop" option, the exceptions being that function 30 sends the "pause" and not the "stop" command to function 31, at step 1175 of FIG. 69, function 31 sends notice of the "pause" and not the "stop" command to voice call processing of system 16, at step 1197 of FIG. 70, and function 31 sends a different new state to function 30, based on a different present state—the "reply-idle" state 2201 in this example—at step 1203.

Figure 71:
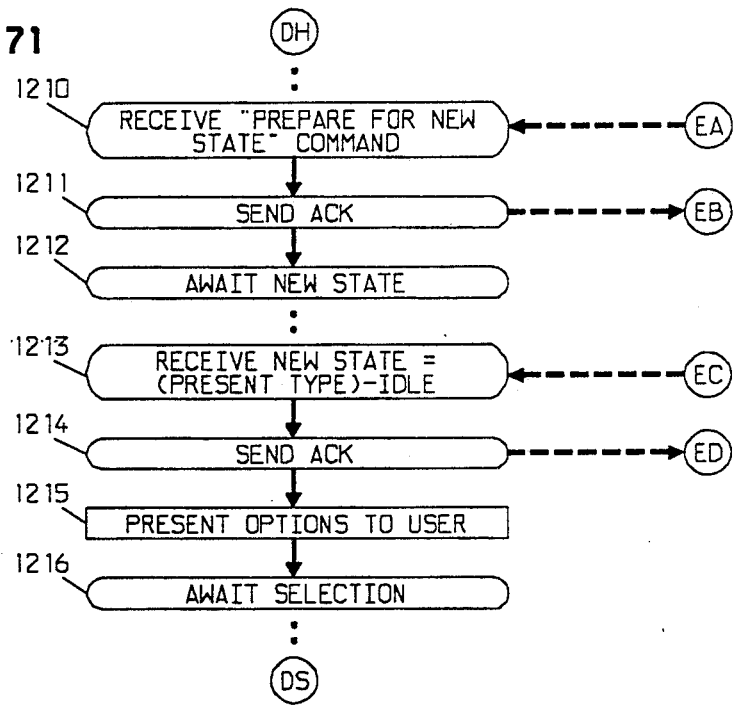
Figure 72:
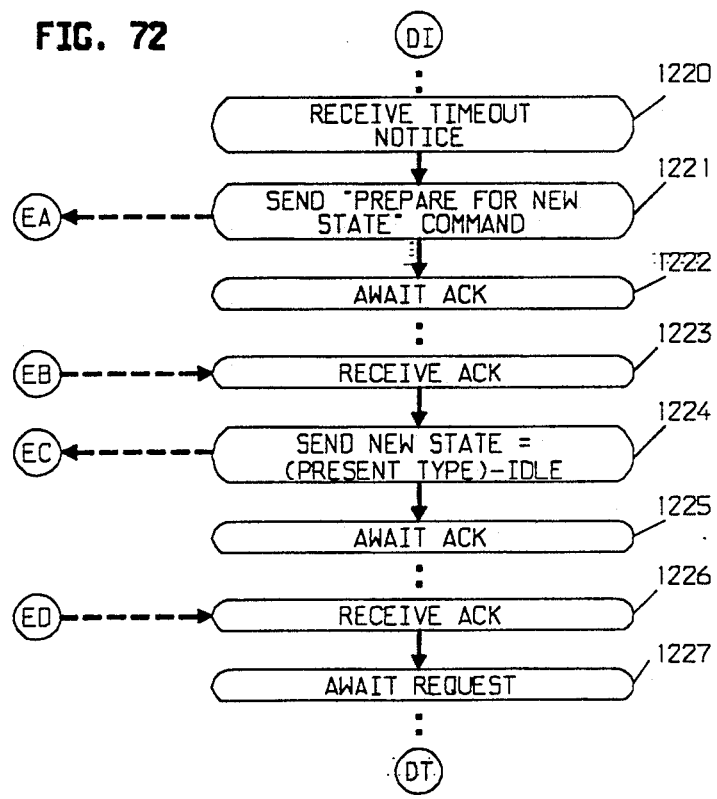

The timeout of the period allotted by system 16 for recording of a message in state 2200 of FIG. 7 has a similar effect to selection of the "pause" option at step 1063 of FIG. 67: it causes functions 30 and 31 to make a transition 2211 from "reply-record" state 2200 to "reply-idle" state 2201 of FIG. 7 in this example. The activities performed by functions 30 and 31 in response to timeout are shown in FIGS. 71 and 72, respectively. A comparison of FIGS. 71 and 72 with FIGS. 61 and 62, respectively, shows that the activities performed by functions 30 and 31 in response to the timeout notice received by function 31 from voice call processing of system 16 are the same as performed with respect to the end-of-message notice.

The options presented to the user in "reply-idle" state 2201 of FIG. 7 are to return to "scan"ning of message headers, to "delete" the original incoming message, to "erase" the record message, to "rewind" the recorded message, to "schedule" the recorded message for delivery, to "file" the recorded message in a file of outgoing messages, to "play" the recorded message, and to "continue" recording of the message.

Selection of the "scan" option in "reply-idle" state 2201 of FIG. 7 has the same effect as that selection has in disposition states 2060 and 2061 of FIG. 6: it causes functions 30 and 31 to make a transition 2213 from state 2201 to the immediately-preceding message header scanning state—one of the states 2030-2032 of FIG. 5 in this example. The activities performed by functions 30 and 31 in response to this selection are shown in FIGS. 59 and 60, respectively.

Selection of the "delete" option causes functions 30 and 31 to make a transition 2113 without undergoing a state change (see FIG. 7). The activities performed by functions 30 and 31 in response to this selection are shown in FIGS. 31 and 32, respectively.

Selection of the "erase" option causes functions 30 and 31 to make a transition 2071 without undergoing a state change (see FIG. 7). The activities performed by functions 30 and 31 in response to this selection are shown in FIGS. 73 and 74, respectively.

Figure 73:
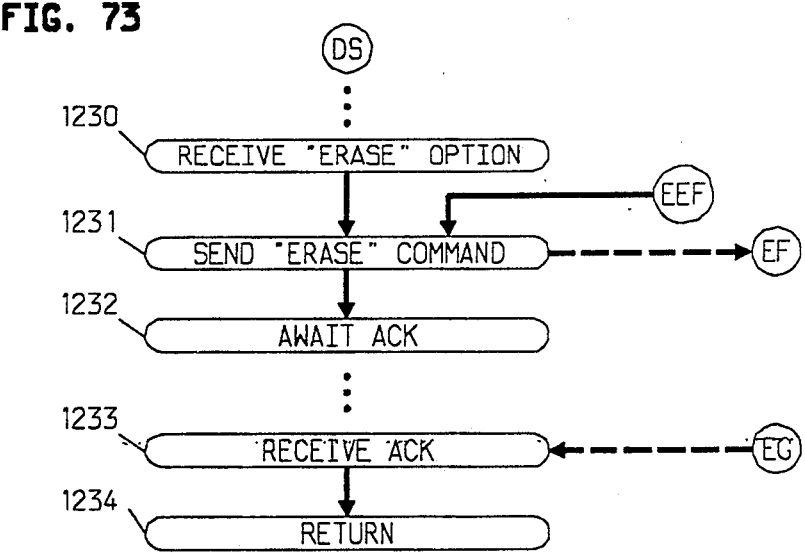

In response to receipt of the "erase" option, at step 1230 of FIG. 73, function 30 sends an "erase" command to system 16 over the data channel, at step 1231, and then waits for an acknowledgment, at step 1232.

Figure 74:
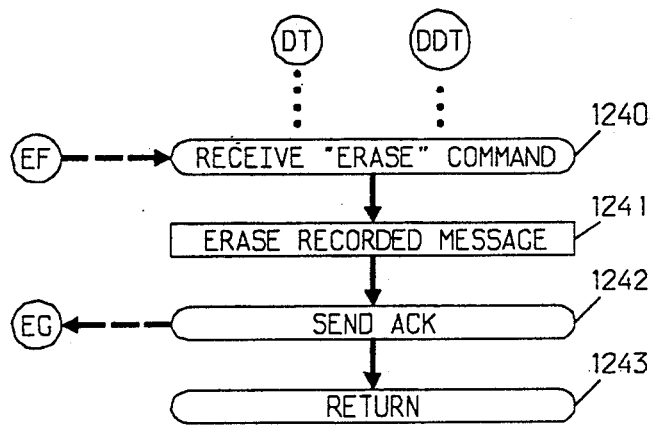

Upon receipt of the "erase" command, at step 1240 of FIG. 74, function 31 causes call processing of system 16 to erase the just-recorded voice message, at step 1241. Function 31 then sends an acknowledgment to terminal 11, at step 1242, and returns to the point at which it was when it received the "erase" command at step 1240, at step 1243.

Upon receipt of the acknowledgment from function 31, at step 1233 of FIG. 73, function 30 also returns, to the point at which it was when it received the "erase" option at step 1230, at step 1234.

Figure 75:
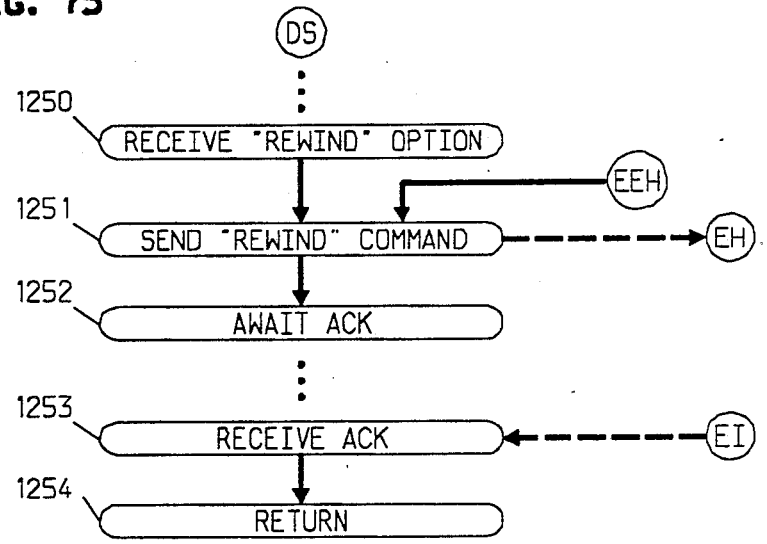
Figure 76:
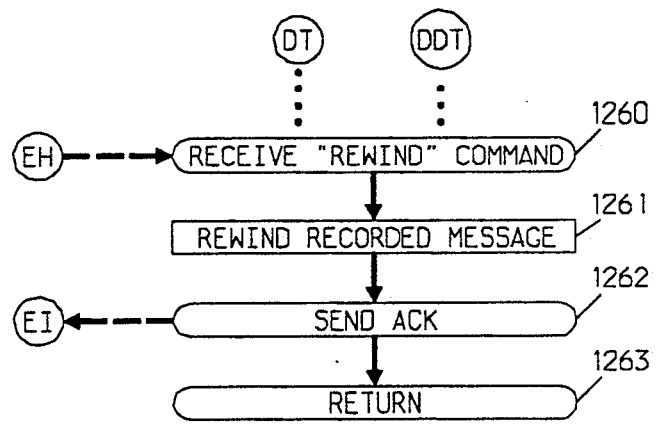

Selection of the "rewind" option causes functions 30 and 31 to make a transition 2214 in FIG. 7 without undergoing a state change, rewinding the just-recorded message in the process. The activities performed by functions 30 and 31 in response to this selection are shown in FIGS. 75-76. A comparison of FIGS. 75 and 76 with FIGS. 73 and 74, respectively, shows that the activities performed by functions 30 and 31 in response to the "rewind" option are the same as performed in response to the "delete" option, the exception being that function 31 causes voice-call processing of system 16 to perform the rewind function, at step 1261 of FIG. 76, as opposed to deletion of the recorded message.

Selection of the "file" option causes functions 30 and 31 to make a transition 2216 in FIG. 7 without undergoing a state change, filing the reply in the user's "file cabinet" on system 16 in the process. The activities performed by functions 30 and 31 in response to this option are shown in FIGS. 77-78.

Figure 77:
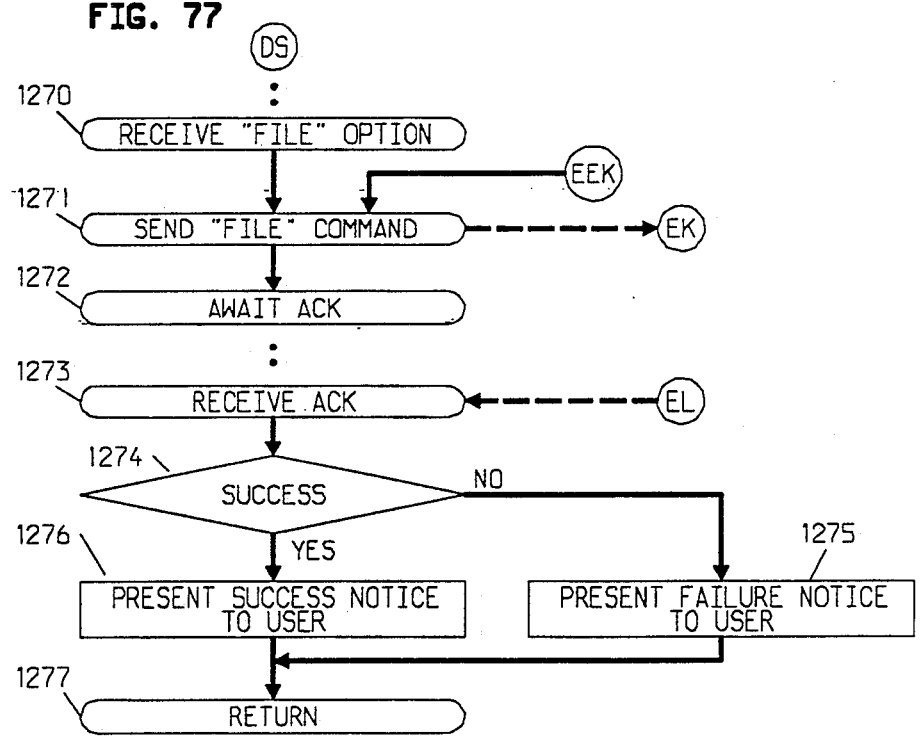

Upon receipt of selection of the "file" option, at step 1270 of FIG. 77, function 30 sends a "file" command to system 16 over the data link, at step 1271, and then waits for an acknowledgment, at step 1272.

Figure 78:
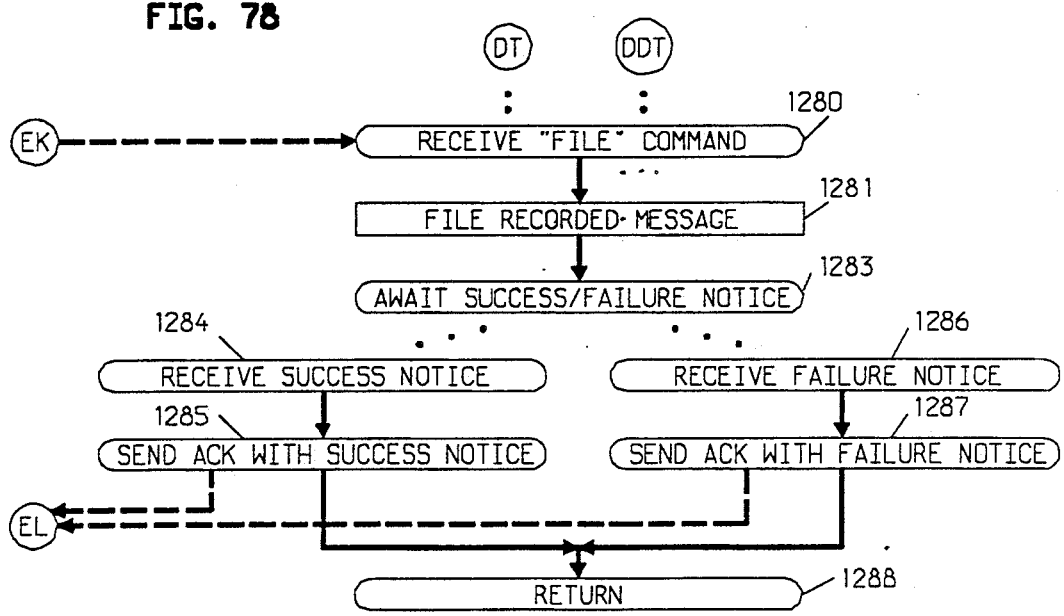

When it receives the "file" command, at step 1280 of FIG. 78, function 31 forwards it to voice-call processing of system 16 to cause the user's reply to be filed in the user's electronic file cabinet on system 16, at step 1281. Function 31 then waits for a response from voice-call processing indicative of whether the filing attempt succeeded or failed, at step 1283.

If the filing attempt failed—for example, because the user's filing cabinet is full—function 31 receives a failure notice from voice-call processing, at step 1286, and in response it sends an acknowledgment along with the failure notice to terminal 11, at step 1287. If the filing attempt succeeded, function 31 receives a success notice from voice-call processing, at step 1284, and sends an acknowledgment along with the success notice to terminal 11, at step 1285. Following step 1285 or 1287, function 31 returns to the point of operation it was at when it received the "file" command at step 1280, at step 1288.

In response to receiving the acknowledgment, at step 1273 of FIG. 77, function 30 checks whether it is accompanied by a notice of success or failure, at step 1274. Function 30 then presents the success or failure notice to the user, at step 1276 or 1275, respectively, and returns to the point of operation it was at when it received the "file" option at step 1270, at step 1277.

Selection of the "schedule" option in "reply-idle" state 2201 of FIG. 7 causes functions 30 and 31 to make a transition 2215 that does not involve a state change. The activities performed by functions 30 and 31 in response to selection of the "schedule" option are shown in FIGS. 79 and 80, respectively.

Figure 79:
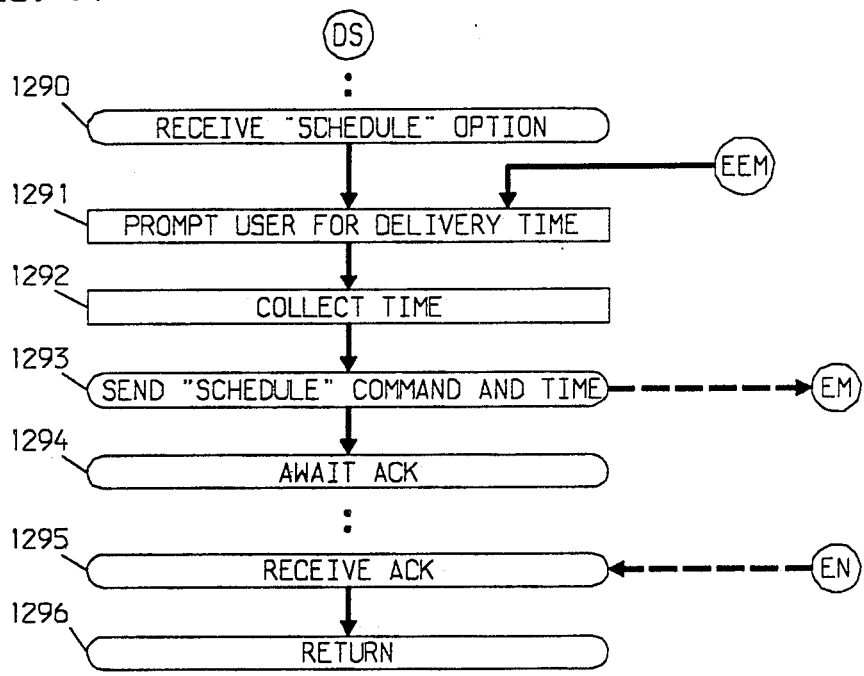

In response to receiving the user's selection of the "schedule" option, at step 1290 of FIG. 79, function 30 causes the user to be prompted for the time when he or she wishes to have the reply delivered, at step 1291. Function 30 then causes the user's response to the prompt to be collected, at step 1292, and sends that response along with a "schedule" command to system 16 over the data channel, at step 1293. Function 30 then awaits a response, at step 1294.

Figure 80:
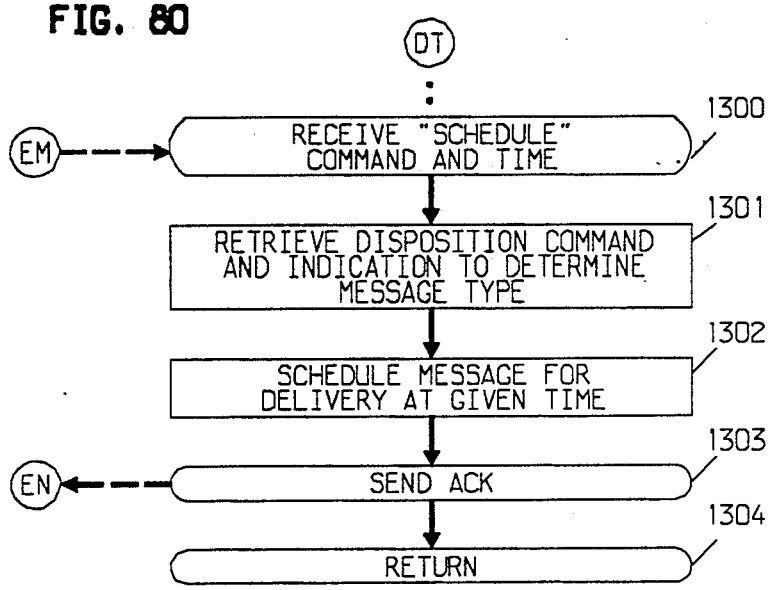

Upon receiving the "schedule" command and delivery time, at step 1300 of FIG. 80, function 31 forwards the received information to voice-call processing of system 16 in order to cause the reply to be scheduled for delivery at the indicated time, at step 1301. Function 31 then sends an acknowledgment to terminal 11, at step 1302, and returns to the point of operation it was at when it received the "schedule" command at step 1300, at step 1303.

Upon receipt of the acknowledgment from function 31, at step 1295 of FIG. 79, function 30 likewise returns to the point of operation it was at when it received the "schedule" option at step 1290, at step 1296.

Figure 81:
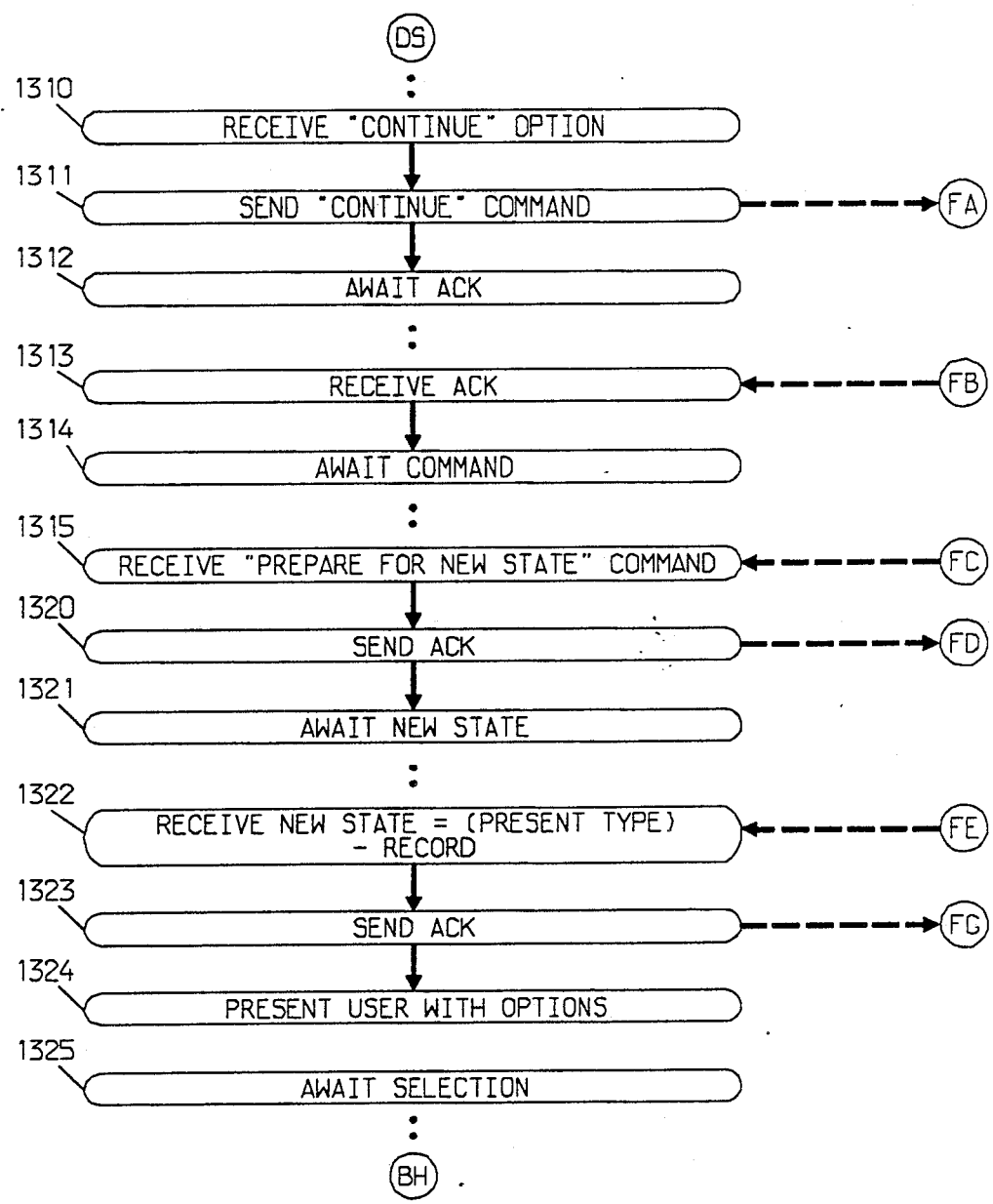
Figure 82:
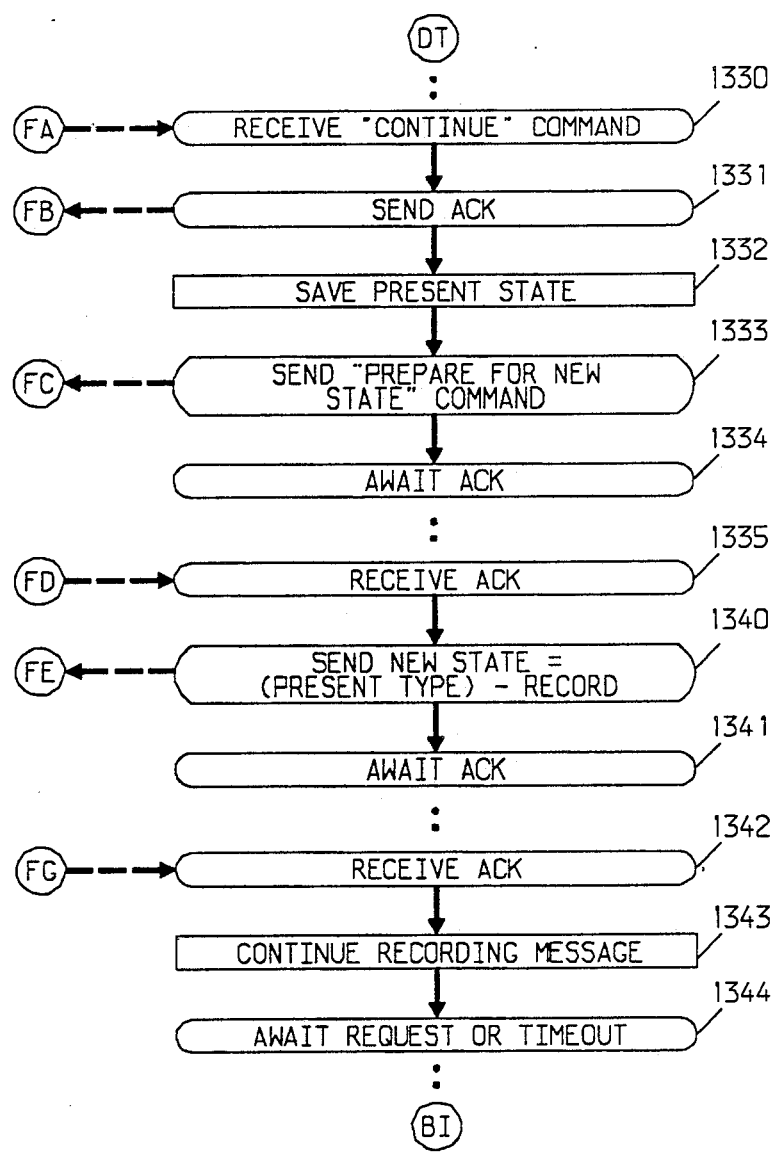

Selection of the "continue" option in "reply-idle" state 2201 of FIG. 7 causes functions 30 and 31 to make a transition 2212 back to "record" state 2200 and the recording of the message to continue. The activities performed by functions 30 and 31 in response to selection of the "continue" option are shown in FIGS. 81 and 82, respectively. A comparison of FIGS. 81 and 82 with FIGS. 65 and 66, respectively, shows that the activities performed by functions 30 and 31 in response to the "continue" option parallel those performed in response to the "play" option in "disposition-idle" state 2061 of FIG. 6, the exception being that function 30 sends the "continue" and not the "play" command to function 31, at step 1311 of FIG. 81, function 31 sends a different new state to function 30, based on a different present state—the "reply-record" state 2200 of FIG. 7 in this example—at step 1340 of FIG. 82, and function 31 sends notice of the "continue" and not the "play" command to voice-call processing of system 16, at step 1343.

Selection of the "play" option in "reply-idle" state 2201 of FIG. 7 causes functions 30 and 31 to make a transition 2217 to "reply-play" state 2202 and the just-recorded message to be played back over the voice channel to the user. The activities performed by functions 30 and 31 in response to selection of the "play" option are shown in FIGS. 65 and 66, respectively. In this example, at step 1140 of FIG. 66, function 31 sends indication to terminal 11 that the new state is "reply-play" state 2202 of FIG. 7.

Options available to the user in "reply-play" state 2202 are to "stop" play of the recorded message, plus the "file", "schedule", "delete", and "rewind" options that were discussed in conjunction with reply-idle state 2201. Selection of the "stop" option causes functions 30 and 31 to make a transition 2218 from "reply-play" state 2202 back to "reply-idle" state 2201 (see FIG. 7). Furthermore, selection of the "file", "schedule", "delete", and "rewind" options in state 2202 includes the activities involved in selection of the "stop" option; hence, these options are also shown as precipitating transition 2218. The activities performed by functions 30 and 31 in response to the abovementioned options are shown in FIGS. 61 and 62.

As in the case of "disposition-play" state 2060 of FIG. 6, completion of playing of the desired message in "reply-play" state 2202 of FIG. 7 causes a transition back to an idle state. In this example, receipt of notice that the playing of the message has ended causes functions 30 and 31 to make a transition 2219 from "reply-play" state 2202 "reply-idle" state 2201. The activities performed by functions 30 and 31 in response to the notice are shown in FIGS. 63 and 64, respectively.

Figure 8:
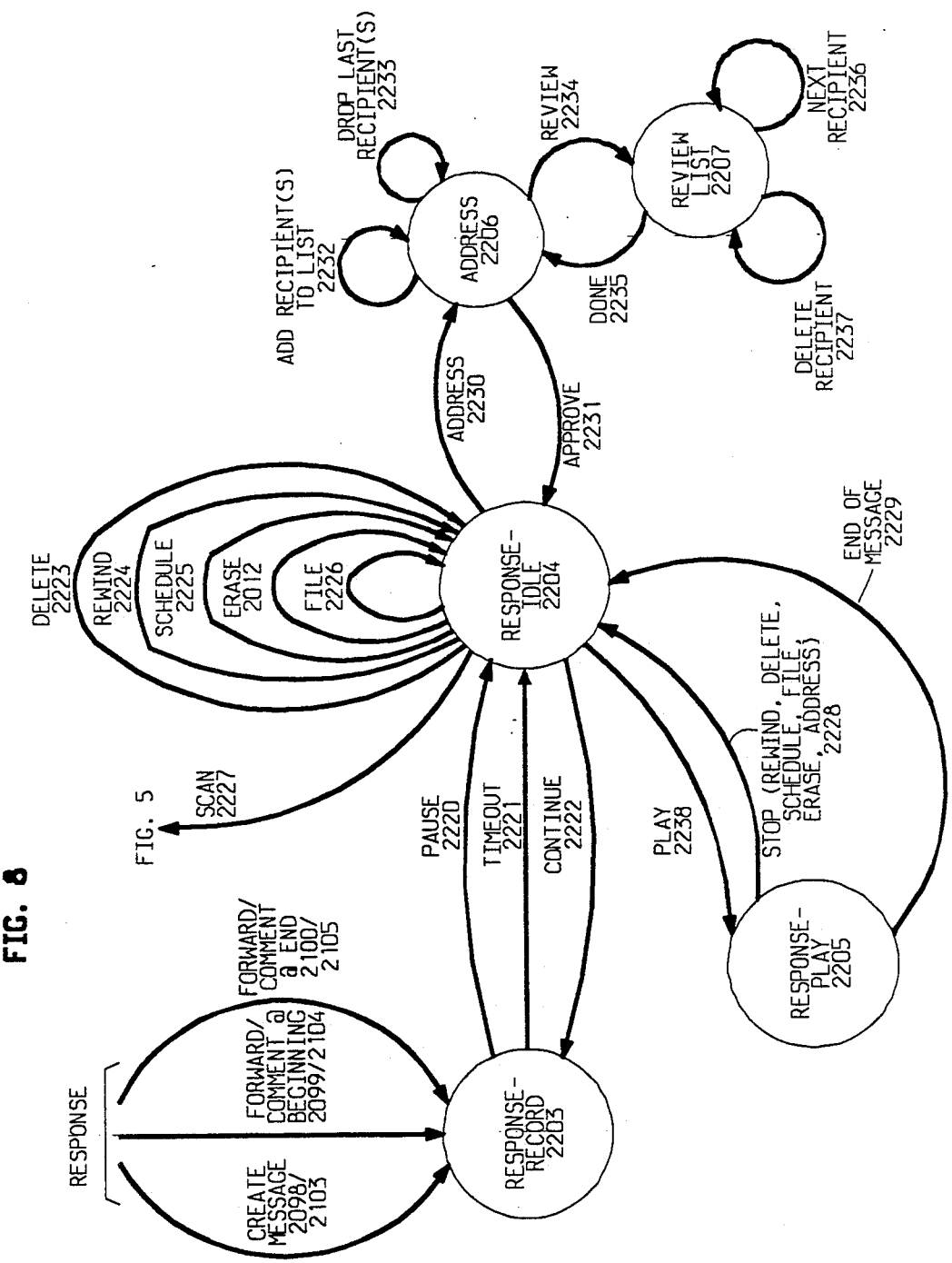

Returning to disposition states 2060 and 2061 of FIG. 6, the response options respectively cause functions 30 and 31 to make transitions 2098-2100 from "disposition-play" state 2060 to "response-record" state 2203 of FIG. 8. Likewise, the response options respectively cause functions 30 and 31 to make transitions 2103-2105 from "disposition-idle" state 2061 to "response-record" state 2203. The activities performed by functions 30 and 31, respectively, for all three response options are substantially identical, and are shown in FIGS. 83 and 84.

Figure 83:
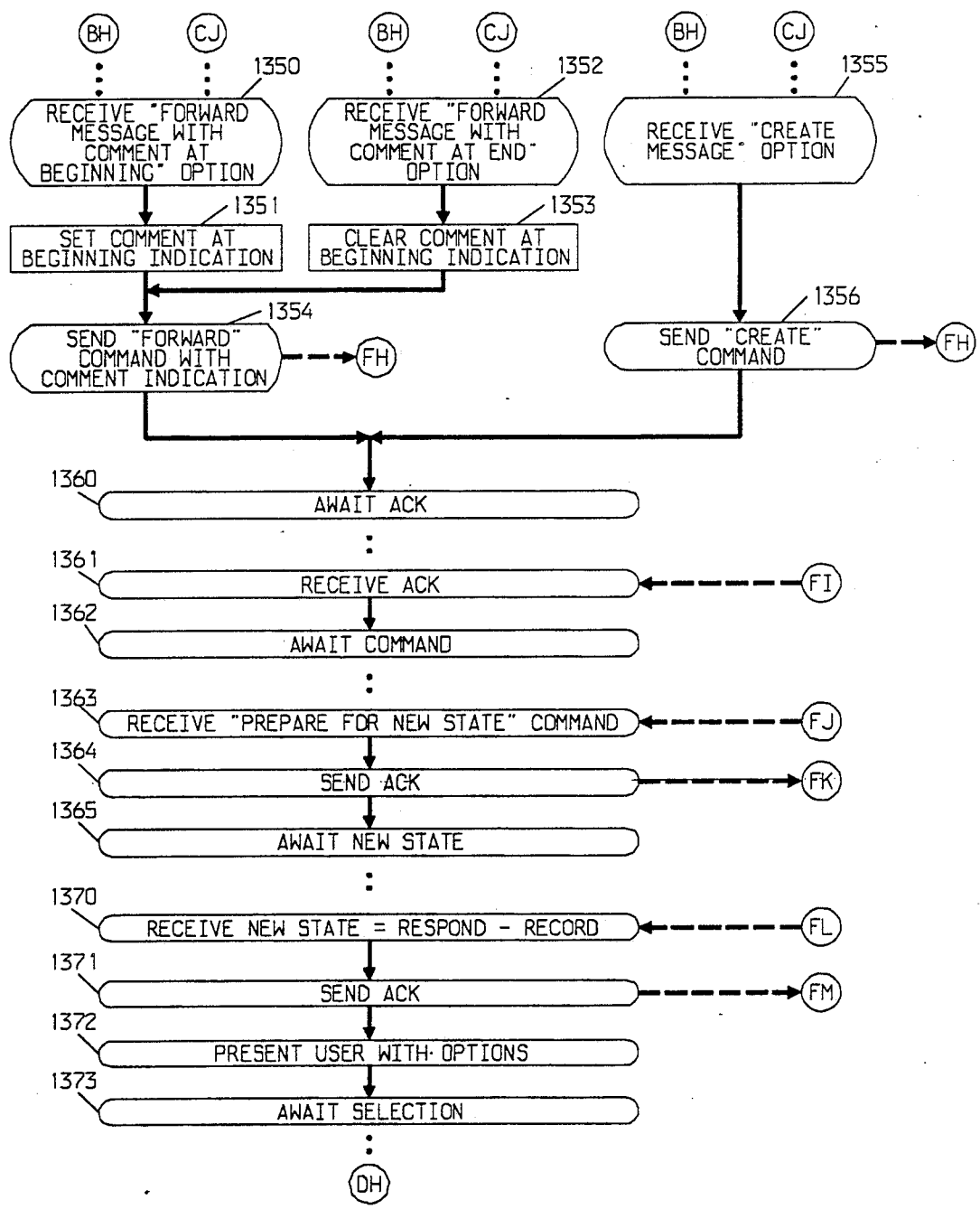
Figure 84:
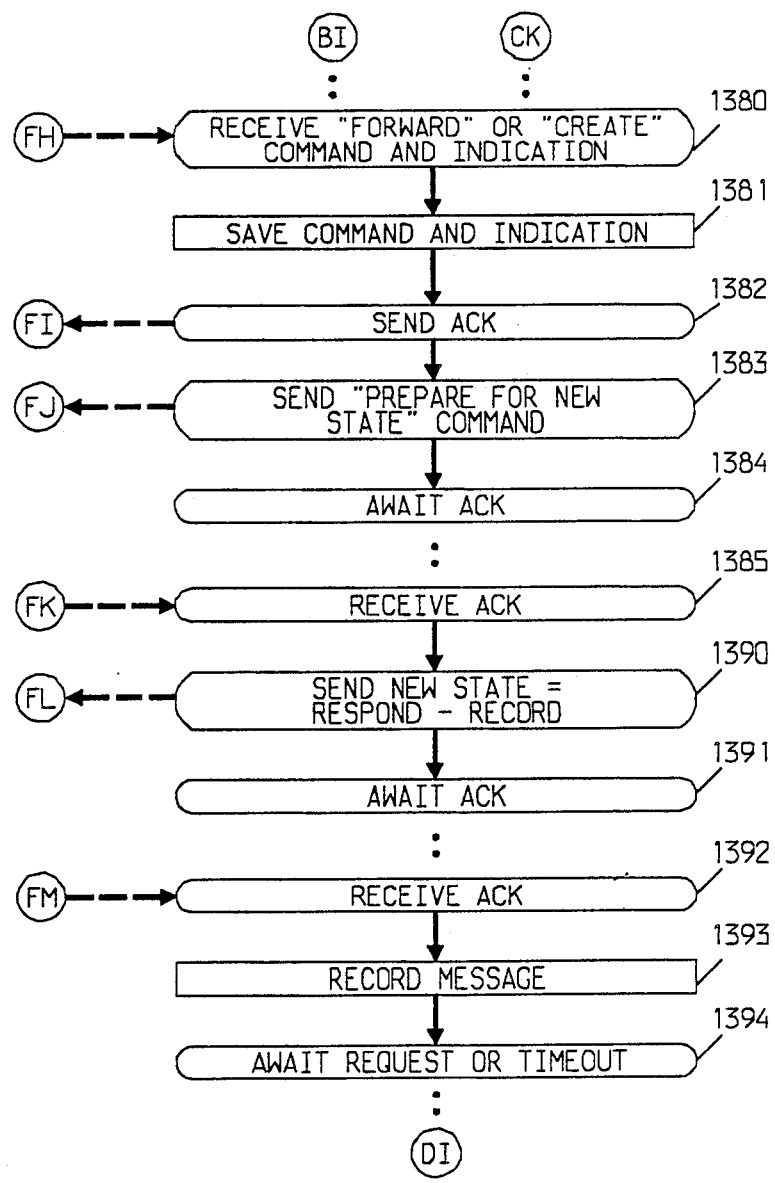

In response to receiving the user's selection of the "forward message with comments at beginning" option, at step 1350 of FIG. 83, function 30 sets a "comment at beginning" indicator in a "forward" command, at step 1351, and then sends the "forward" command to system 16 over the data channel, at step 1354.

In response to receiving the user's selection of the "forward message with comment at end" option, at step 1352, function 30 clears the "comment at beginning" indicator of the "forward" command, at step 1353, and then sends the "forward" command to system 16 over the data channel, at step 1354.

In response to receiving the user's selection of the "create message" option, at step 1355, function 30 sends a "create" command to system 16 over the data channel, at step 1356.

Following either of the steps 1354 or 1356, function 30 continues its operation at step 1360. A comparison of FIG. 83 with FIG. 67 reveals that the activities performed by function 30 at step 1360-1373 for the response options are the same as those performed at steps 1052-1063 for the reply options, the exception being that function 30 receives "response-idle" state 2204 and not "reply-idle" state 2201 as the new state at step 1370.

As mentioned above, the activities performed by function 31 in response to the user's selection of a response option are shown in FIG. 84. A comparison of FIG. 84 with FIG. 68 reveals that the activities performed by function 31 at steps 1380-1394 of FIG. 84 for the response options are the same as the activities performed by function 31 at steps 1149-1159 of FIG. 68 in response to the reply options, the exception being that "response-record" state 2203 is selected and sent as the new state at step 1390—not "reply-record" state 2200 as at step 1155.

The user has the "pause" option available to him or her in "response-record" state 2203, and the activities undertaken by functions 30 and 31 in response to its selection, or to time-out of the recording period, are the same as for "reply-record" state 2200 and are shown in FIGS. 69-72, except that this time functions 30 and 31 make transitions 2220-2221 to "response-idle" state 2204 (see FIG. 8).

In the "response-idle" state 2204, the user has the same options available to him or her as in "reply-idle" state 2201 of FIG. 7, and the activities undertaken by functions 30 and 31 in response to those options are likewise the same, and shown in FIGS. 59-68, 65-66, and 73-82. (An additional option—address—is also available in "response-idle" state 2204, as discussed below.)

By the user's selection of the "play" option in "response-idle" state 2204, functions 30 and 31 make a transition 2227 to "response-play" state 2205 of FIG. 8. Herein, the user again has the "stop", "rewind", "schedule", "delete", "file", "erase", and "address" options available to him or her. The activities undertaken by functions 30 and 31 in response to selection of one of these options, or to end of play of the recorded message, are the same as for "reply-play" state 2202 of FIG. 7 and are shown in FIGS. 61-64, except that this time functions 30 and 31 make transitions 2228-2229 to "response-idle" state 2204 (see FIG. 8).

Unlike a reply message, a response message may be sent to anyone and not just the originator of the message being responded to. Therefore, the user is presented with an "address" option in response states 2204 and 2205 which allows him or her to specify the address of the intended recipient of the response.

Selection of the "address" option in state 2204 causes functions 30 and 31 to make a transition 2230 to "address" state 2206 of FIG. 8. The activities performed by functions 30 and 31 in response to this selection are shown in FIGS. 85 and 86, respectively.

Figure 85:
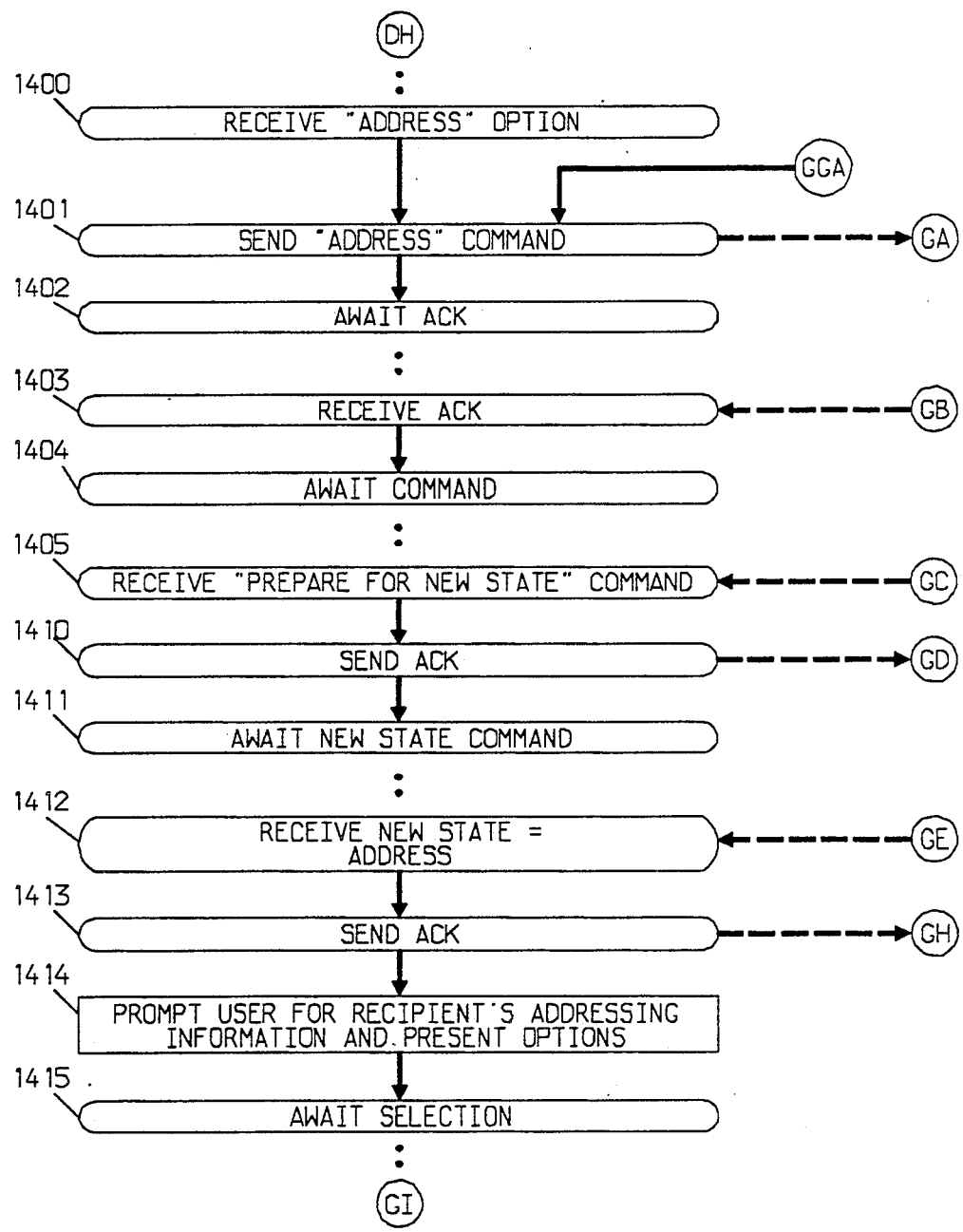

Upon receipt of the user's selection of the address option, at step 1400 of FIG. 85, function 30 sends an "address" command to system 16 over the data channel, at step 1401, and then waits for an acknowledgment, at step 1402.

Figure 86:
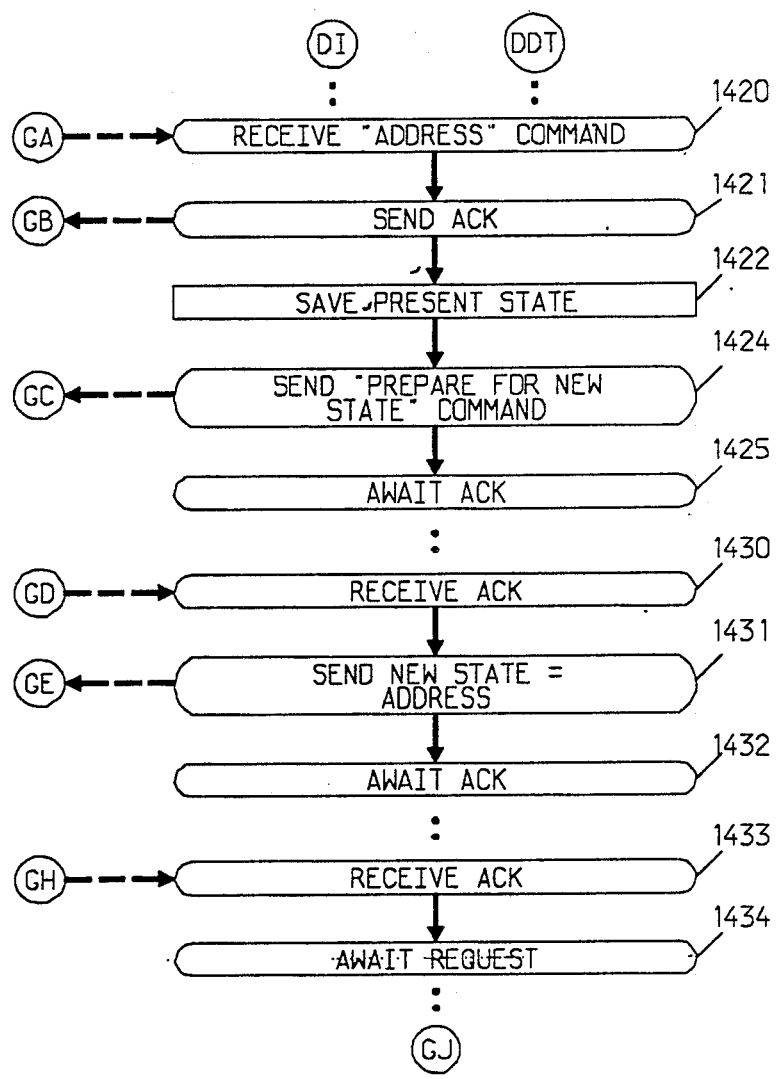

Function 31 receives the "address" command, at step 1420 of FIG. 86, and acknowledges it, at step 1421. Function 31 then saves the present state of system 16 to enable eventual return thereto, at step 1422, sends a "prepare for new state" command to terminal 11, at step 1424, and waits for an acknowledgment, at step 1425. Upon receipt thereof, at step 1430, function 31 sends an indication to function 30 that the new state is "address" state 2206, at step 1431, and again awaits acknowledgment, at step 1432. When function 31 receives the acknowledgment of the new state command, at step 1433, it waits to receive a new request from terminal 11, at step 1434.

Function 30 receives the acknowledgment of the "address" command, at step 1403 of FIG. 85, waits for a command from system 16, at step 1404, and upon receipt of the "prepare for new state" command, at step 1405, acknowledges it, at step 1410, and then waits for a command specifying the new state, at step 1411. Upon receipt of indication that the new state is "address" state 2206, at step 1412, function 30 acknowledges it. Function 30 then prompts the user for addressing information of the response's intended recipient or recipients, at step 1414. The addressing information may be the addressee's name or phone number, or a name of a list of names stored in system 16. At step 1414, function 30 also presents the user with the options of "add"ing the addressee to the list of recipients of the response, "delet[e]"ing the addressee from the recipient list, "review'-'ing the recipient list, and "approv[e]"ing the recipient list. Function 30 then awaits the user's input, at step 1415.

The user's selection of the "add" option causes functions 30 and 31 to make a transition 2232 without changing state (see FIG. 8). The activities performed by functions 30 and 31 in response to the "add" option are shown in FIGS. 87 and 88, respectively.

Figure 87:
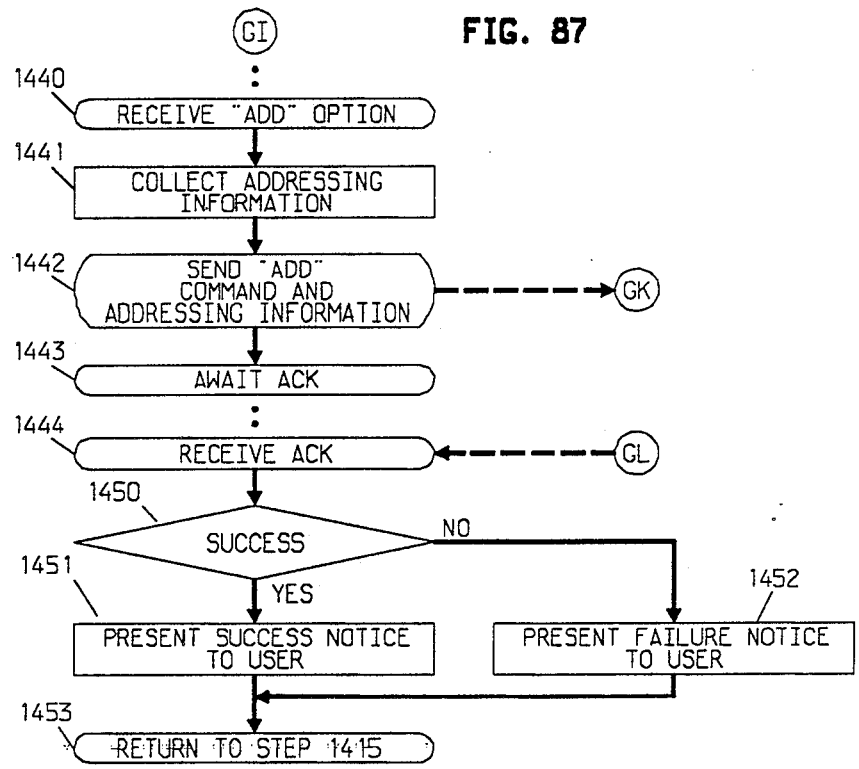

Upon receipt of selection of the "add" option, at step 1440 of FIG. 87, function 30 collects from the keyboard of terminal 11 the addressing information—name, number, or list name—of the recipient or recipients of the response, at step 1441. Function 30 then sends an "add" command and the addressing information to system 16 over the data channel, at step 1442, and awaits an acknowledgment, at step 1443.

Figure 88:
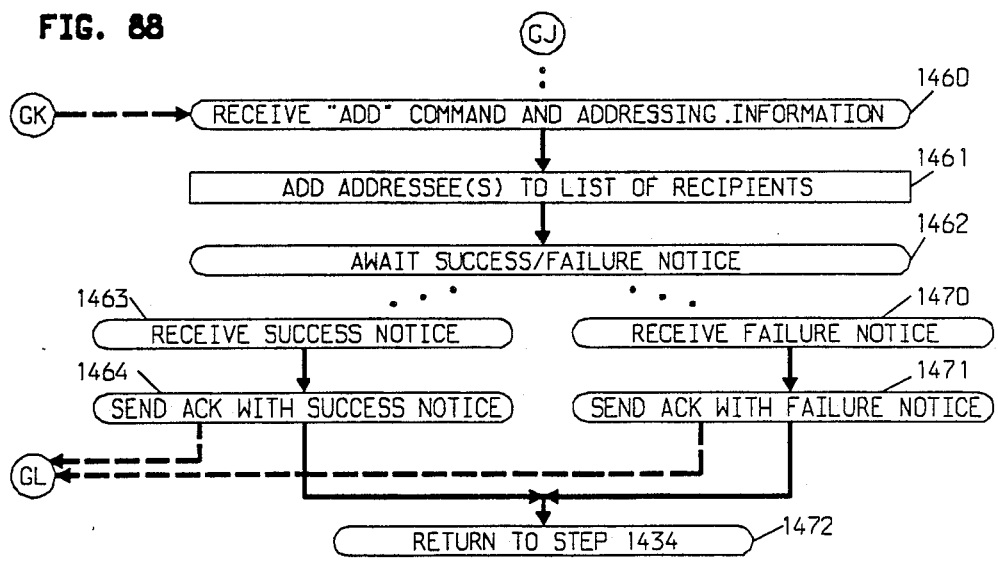

Function 31 receives the "add" command and accompanying addressing information, at step 1460 of FIG. 88, and passes both on to voice call processing of system 16 to cause the addressee or addresses to be added to a list of recipients of the response, at step 1461. Function 31 then waits for arrival of a notice from the voice-call processing regarding whether the add operation succeeded, at step 1462.

If function 31 receives a success notice from voice-call processing, at step 1463, it sends an acknowledgment plus the success notice to terminal 11, at step 1464. Conversely, receipt of a failure notice from voice-call processing, at step 1470, results in function 31 sending an acknowledgment with a failure notice to terminal 11, at step 1471. Function 31 then returns to step 1434 to await receipt of further requests, at step 1472.

Function 30 receives the acknowledgment, at step 1444 of FIG. 87, and checks the accompanying notice to determine whether the add operation succeeded or failed, at step 1450. Function 30 then presents the success or failure notice to the user, at steps 1451 or 1452, respectively, and then returns to step 1415 to await the user's next selection, at step 1453.

The user's selection of the "drop" option at step 1415 of FIG. 85 causes functions 30 and 31 to make a transition 2233 without changing state (see FIG. 8). The activities performed by functions 30 and 31 in response to the "drop" option are shown in FIGS. 89 and 90, respectively.

Figure 89:
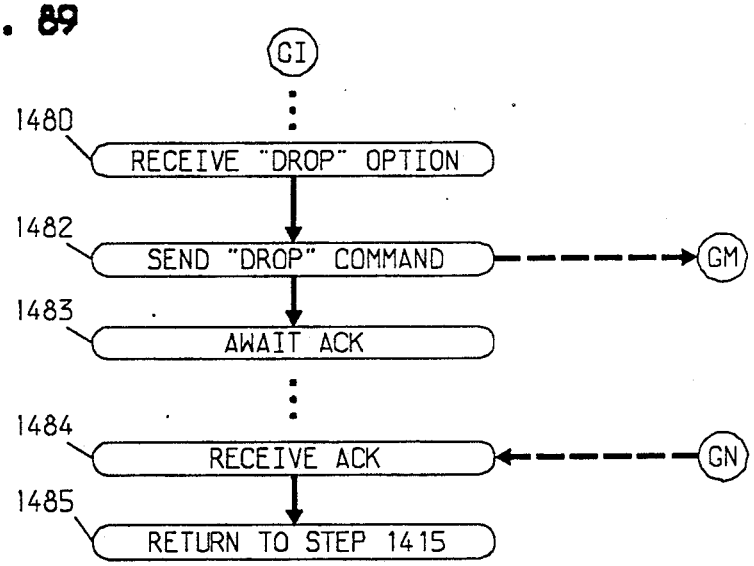

Receipt of the user's selection of the "drop" option, at step 1480 of FIG. 89, causes function 30 to send a "drop" command to system 16 over the data channel, at step 1482. Addressing information need not accompany the command, because the "drop" command implicitly refers to the addressee or list of addressees last added to the list of response recipients. Function 30 then awaits acknowledgment of the command, at step 1483, and upon receipt thereof, at step 1484, returns to step 1415 to wait for the user's next selection, at step 1485.

Figure 90:
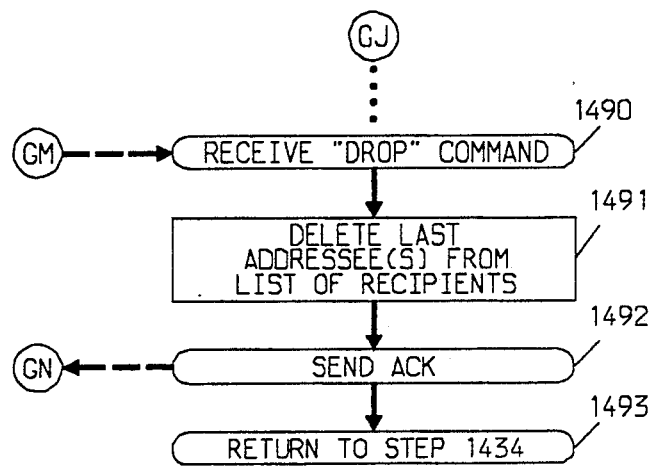

Upon receiving the "drop" command, at step 1490 of FIG. 90, function 31 forwards the command to voice-call processing of system 16 to effect deletion of the last-added addressee or addressees from the response recipient list, at step 1491. Function 31 then acknowledges the command, at step 1492, and returns to step 1434 to await receipt of the next request from terminal 11, at step 1493.

The user's selection of the "review" option at step 1415 of FIG. 85 causes functions 30 and 31 to make a state transition 2234 to "review list" state 2207 (see FIG. 8). The activities performed by functions 30 and 31 in response to selection of the "review" option are shown in FIGS. 91 and 92, respectively.

Function 30 receives the user's selection of the "review" option, at step 1500 of FIG. 91, and responds by sending a "review" command to system 16 over the data channel, at step 1501. Function 30 then waits for an acknowledgment, at step 1502, and upon receipt thereof, at step 1503, waits for a command from system 16, at step 1504.

Upon receipt of the "review" command, at step 1530 of FIG. 92 function 31 acknowledges it, at step 1531, and then sends a "prepare for new state" command to terminal 11 over the data channel, at step 1532. Function 31 then waits for an acknowledgment, at step 1533, and upon receiving it, at step 1534, sends an indication to terminal 11 that the new state is "review list" state 2207, at step 1535, and waits for an acknowledgment, at step 1536. Upon receipt thereof, at step 1540, function 31 waits for a new request from terminal 11, at step 1541.

Function 30 receives the "prepare for new state" command, at step 1505 of FIG. 91, acknowledges it, at step 1506, and waits for indication of the new state, at step 1507. Upon receiving indication that the new state is "review list" state 2207, at step 1510, function 30 acknowledges the new state, at step 1511, and presents a menu of options for this state to the user, at step 1512. Function 30 also sends a request to system 16 for a list of a predetermined number—10, for example—of addressees from the list of response recipients, at step 1513, and waits for an acknowledgment of the request, at step 1514.

When function 31 receives the request, at step 1542 of FIG. 92, it acknowledges it, at step 1543, and then accesses the list of recipients, at step 1544, to determine whether there are more addressees on that list than were requested, at step 1550. If there are no more addresses than requested, function 31 retrieves the whole recipient list and sends it to terminal 11 with an indication that there are no more, at step 1551. If there are more addresses than requested, function 31 retrieves the requested number of them and sends them to terminal 11 with an indication that there are more, at step 1552. Following step 1551 or 1552, function 31 waits for an acknowledgment of the sent addressees, at step 1553, and upon receipt thereof, at step 1554, waits for a new request from terminal 11, at step 1555.

When function 30 receives acknowledgment of its request for a list of recipients, at step 1515 of FIG. 91, it waits for receipt of the list, at step 1516, and upon receiving it, at step 1520, acknowledges it, at step 1521.

Function 30 then displays the list of received recipients on the screen of terminal 11, at step 1522. Function 30 also checks the indication accompanying the received list to determine if there are more recipients, at step 1523, and if so, presents an additional "next" option to the user to allow retrieval and display of those additional recipients, at step 524. Function 30 then awaits the user's selection of an option, at step 1525.

The user's selection of the "next" option causes functions 30 and 31 to undergo a transition 2236 that does not result in a state change (see FIG. 8). The activities performed by functions 30 and 31 in response to the "next" option are shown in FIGS. 93 and 94, respectively.

Alternatively, the user may not be provided with the "add" and "review" options. Rather, the user either enters the phone number or the name of a subscriber of system 16, or a list name followed by the owner's list i.d., by tabbing between input fields on the screen and entering values from terminal 11 keyboard. As names are added to a mailing list, they are displayed on the screen in a fixed region. This region may scroll as names are added. To delete a name, the user selects the "drop" option and then selects the touchpoint next to the name in this region. When the name is selected, function 31 sends a "drop" command to the switch. Included in the command is the number of the name in the list. This eliminates the need for the "review" state. The user also has options to scroll between the names in the list. Retrieval of members in the list may be performed by means of the same mechanism as is used for scanning messages.

Receipt of the user's selection of the "next" option, at step 1560 of FIG. 93, causes function 30 to return to step 1513 of FIG. 91 to request a new list of further recipients, at step 1561. Receipt by function 31 of this new request, at step 1570 of FIG. 94, causes it to return to step 1543 of FIG. 92 to satisfy the request, at step 1571.

In addition to the just-described "next" option, in "review list" state 2207 of FIG. 8, the user is given the option to "delete a recipient" from the recipient list, and an option to "return" to "address" state 2206.

Selection of the "delete recipient" option causes functions 30 and 31 to undergo a transition 2237 without changing state. The activities performed by functions 30 and 31 in response to this option are shown in FIGS. 95 and 96. They resemble closely the activities performed for the "delete message" option shown in FIGS. 31 and 32.

Upon receiving the user's selection of the "delete recipient" option, at step 1580 of FIG. 95, function 30 identifies the recipient to be deleted, at step 1581. Identification is again performed, for example, by determining next to which recipient displayed on a touch-sensitive screen of terminal 11 did the user press the "delete recipient" touchpoint, or the display number of which displayed recipient did the user key in on a keyboard of terminal 11. Function 30 then deletes that recipient from the display of terminal 11, at step 1582, and sends a "delete" command to system 16 along with an identifier of the recipient that is to be deleted, at step 1583. Function 30 then waits for an acknowledgment of the command, at step 1584, and upon receiving it, at step 1585, returns to step 1525 to await the user's next option selection, at step 1586.

Upon receiving the "delete" command and identifier, at step 1590 of FIG. 96, function 31 forwards both to voice-call processing of system 16 to cause the identified recipient to be deleted from the response recipient list, at step 1591. Function 31 then acknowledges the command, at step 1592, and returns to step 1555 to await the next request, at step 1593.

Figure 97:
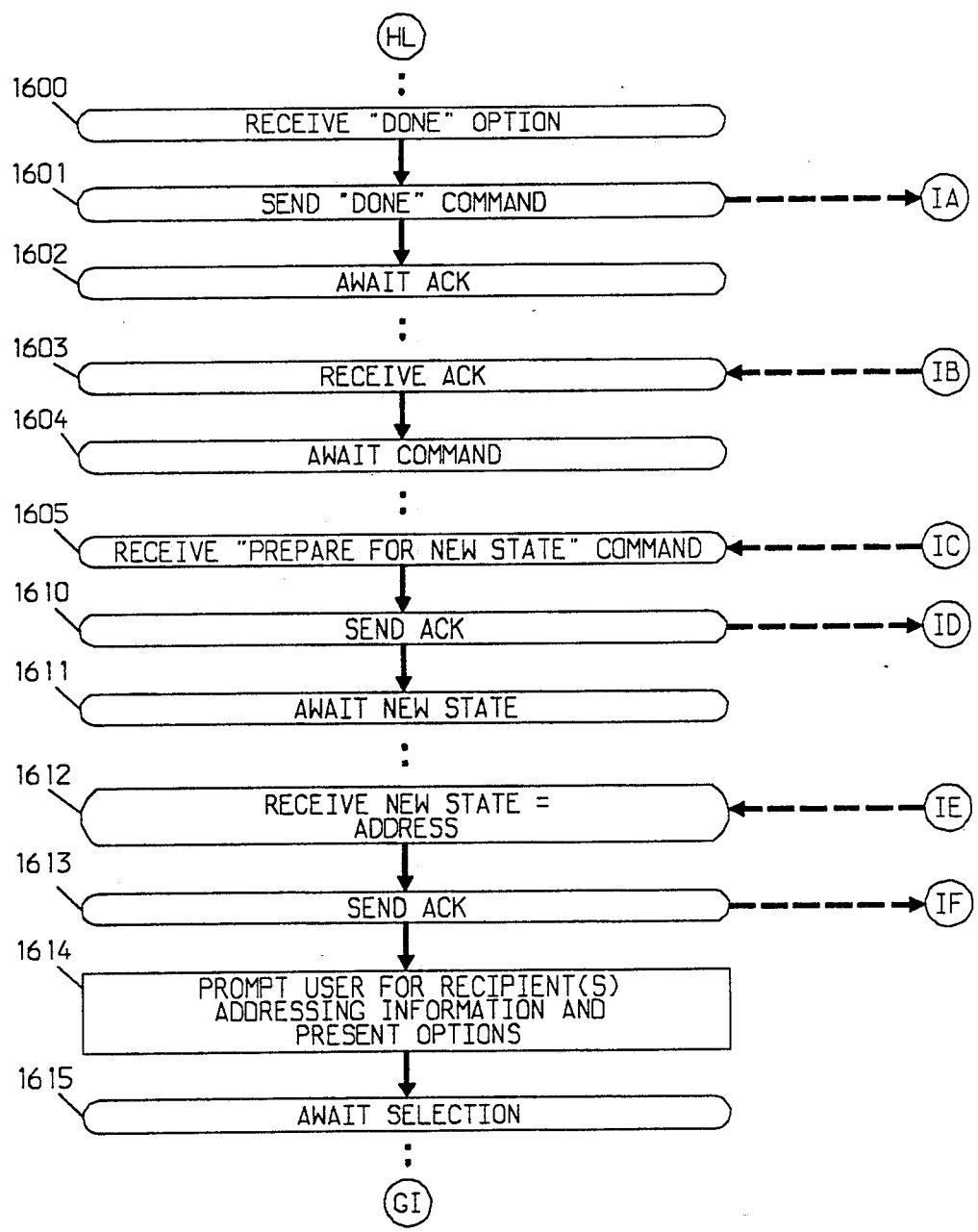
Figure 9B:
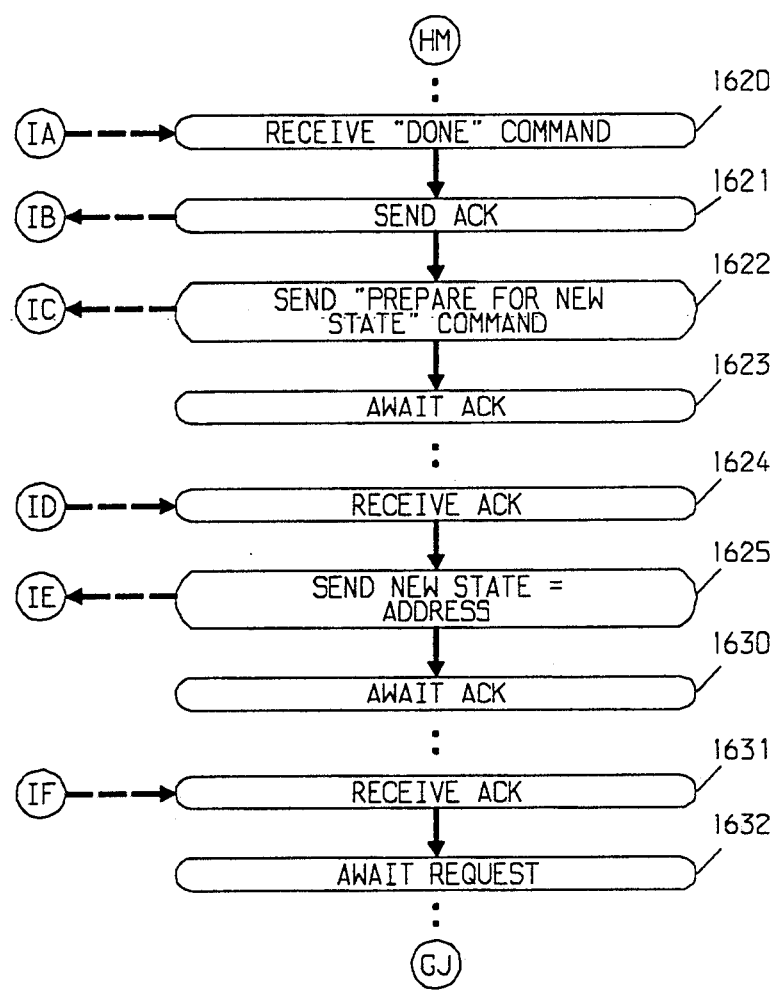

The user's selection of the "done" option at step 1525 of FIG. 91 causes functions 30 and 31 to undergo a state transition from "review list" state 2207 back to "address" state 2206 (see FIG. 8). The activities performed by functions 30 and 31 in response to this selection are shown in FIGS. 97 and 98. A comparison of FIGS. 97 and 98 with FIGS. 85 and 86 reveals that activities performed by functions 30 and 31 in response to the "done" option are the same as performed in response to the "address" option—only function 31 eliminates step 1422 of FIG. 86.

Figure 100:
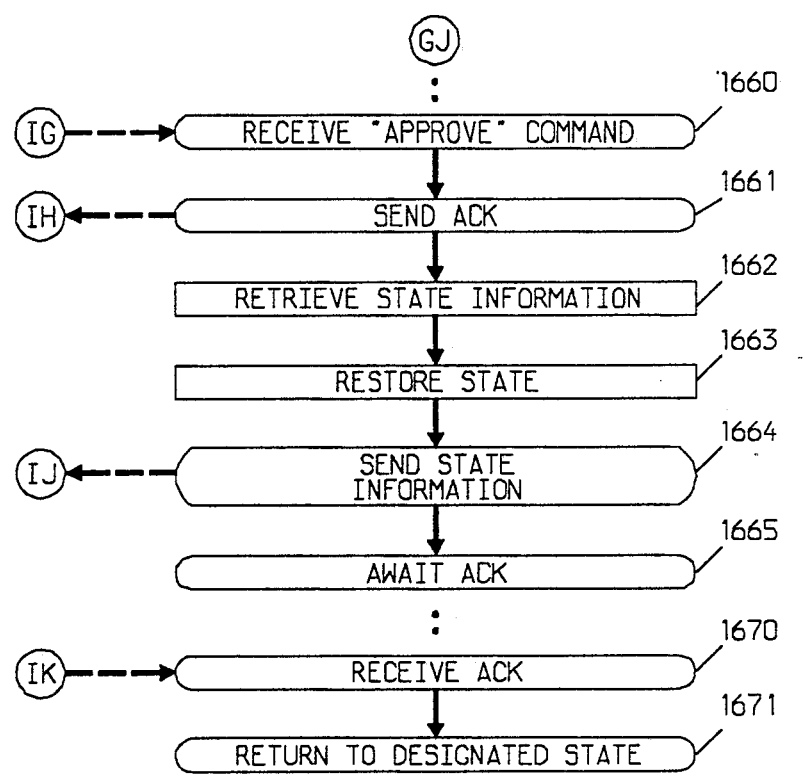

Returning to step 1415 of FIG. 85 when functions 30 and 31 are in "address" state 2206 of FIG. 8, the user's selection of the "approve" option causes functions 30 and 31 to make a transition 2231 back to whatever type of idle state they were in before entering "address" state 2206—"response-idle" state 2204 in this example. The activities undertaken by functions 30 and 31 in response to the "approve" option are shown in FIGS. 99 and 100. A comparison of FIGS. 99 and 100 with FIGS. 43 and 44, respectively, shows that the activities performed in response to selection of the "approve" option in "address" state 2206 are the same as activities performed in response to the selection of the "done" option in "directory" state 2055 of FIG. 6. Of course, the state retrieved by function 31 in step 1662 of FIG. 100 is the state that was saved by function 31 in step 1422 of FIG. 86.

Figure 9:
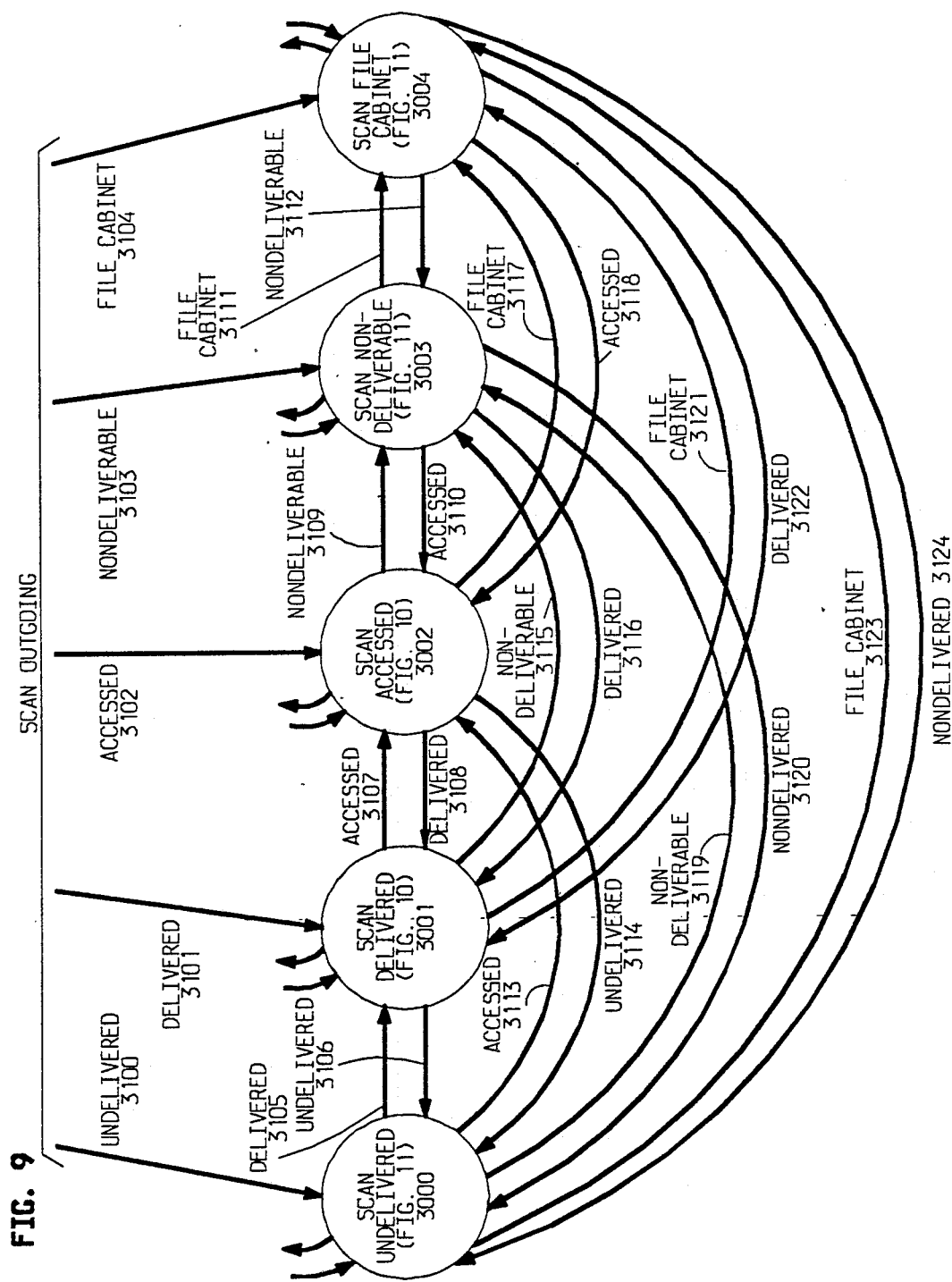

Returning to the options available to a user in "activity menu" state 2006 of FIGS. 2 and 3, and considering next the outgoing message options, as shown in FIG. 9: selection of the "scan undelivered message headers" option causes functions 30 and 31 to make a transition 3100 to "scan undelivered" state 3000; selection of the "scan delivered message headers" option causes functions 30 and 31 to make a transition 3101 to "scan delivered" state 3001; selection of the "scan accessed message headers" causes functions 30 and 31 to make a transition 3102 to "scan accessed" state 3002; selection of the "scan nondeliverable message headers" option causes functions 30 and 31 to make a transition 3103 to "scan nondeliverable" state 3003; and selection of the "scan file cabinet message headers" causes functions 30 and 31 to make a transition 3104 to "scan file cabinet" state 3004. Activities of functions 30 and 31 are the same for each of these transitions 3100-3104 and states 3000-3004, albeit with respect to a different message type. They are also the same activities as performed for the scan-incoming options; they are shown in FIG. 19 for function 30 and FIG. 20 for function 31. The commands corresponding to the options and sent by function 30 to function 31 at step 401 of FIG. 19 are SCAN-UNDELIVERED, SCAN-DELIVERED, SCAN-ACCESSED, SCAN-NONDELIVERABLE, and SCAN-FILE CABINET.

The options available to the user at step 422 of FIG. 19 for any one of the scan-outgoing states 3000-3004 are very similar to options for the scan-incoming states 2030-2032 of FIG. 5. One difference is that in each scan-outgoing state the user has an option to scan one or another of the other types of outgoing, as opposed to incoming, messages. FIG. 9 shows these latter options and the associated transitions 3105-3124, which are unique to each of the scan states 3000-3032. These options are the same ones as are available on the activity menu presented to the user at step 239 of FIG. 17. Activities performed by functions 30 and 31 in response to their selection are shown in FIGS. 19 and 20, respectively.

Figure 10:
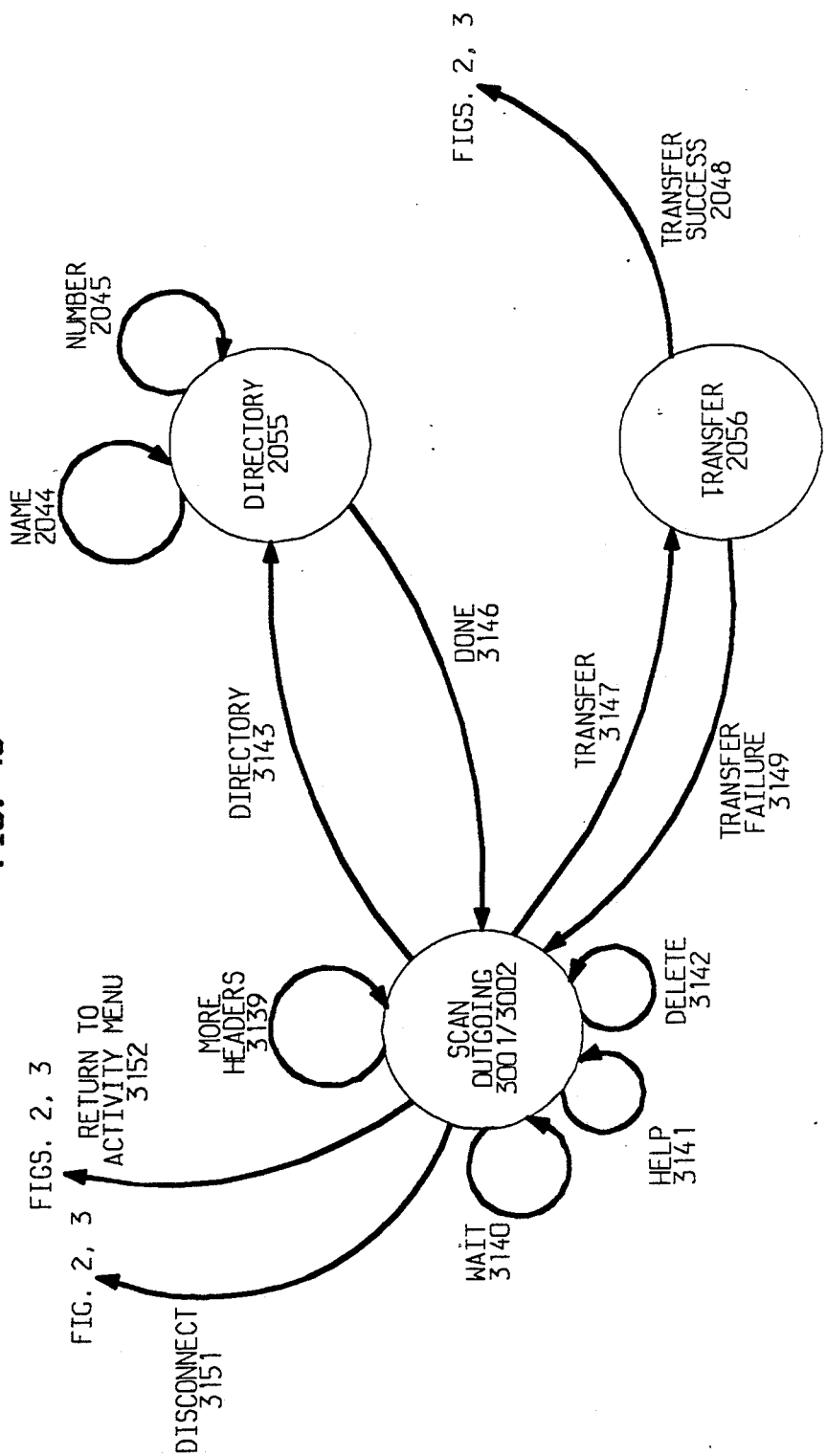

Another difference in options available in the scan-incoming versus certain scan-outgoing states arises from the fact that, for delivered and accessed outgoing messages, system 16 has saved the message headers only and not the messages themselves. Hence, the option to play the messages is not available (and, thus, neither is the "scan" option return from the message-playing states). With respect to these messages, selection of the "delete" option expresses the desire to delete the message header. FIG. 10 shows the options and associated transitions that are available in each of the "scan-delivered" and "scan-accessed" states 3001–3002. A comparison of FIG. 5 and FIG. 10 shows that, except for the state and transition numbers and the "play message" options, they are identical. To the extent that they are identical, the discussion and flow diagrams applicable to FIG. 5 apply to FIG. 10 as well.

Figure 11:
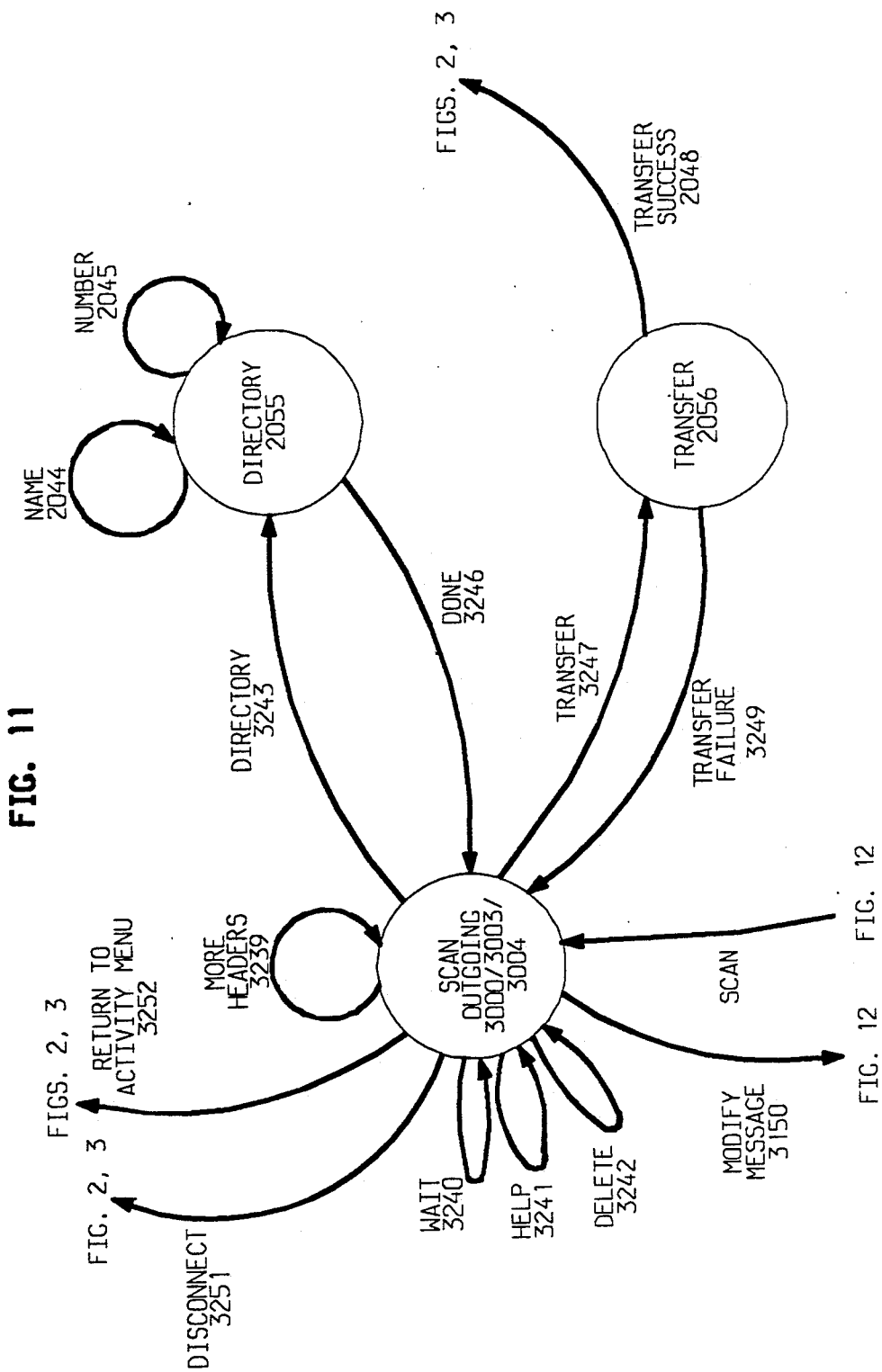

Another difference exists in options available in the scan-incoming versus the "scan-undelivered", "scan-nondeliverable", and "scan-file cabinet" states 3000 and 3003–3004. For these types of outgoing messages, system 16 has saved the messages themselves. However, unlike responses and replies to incoming messages which have both the incoming message and an outgoing message to contend with, the outgoing message types do not have corresponding incoming messages to contend with. Hence, in the case of outgoing messages, there is no need for the message-disposition states of FIG. 6 or the "play message" option that results in a transition to those states. FIG. 11 shows the options and associated transitions that are available in each of the "scan-undelivered", "scan-nondeliverable", and "scan-file cabinet" states 3000 and 3003–3004. A comparison of FIG. 5 and FIG. 11 shows that, except for the state and transition numbers and the "play message" option, they are identical. To the extent that they are identical, the discussion and flow diagrams applicable to FIG. 5 apply to FIG. 11 as well.

Figure 101:
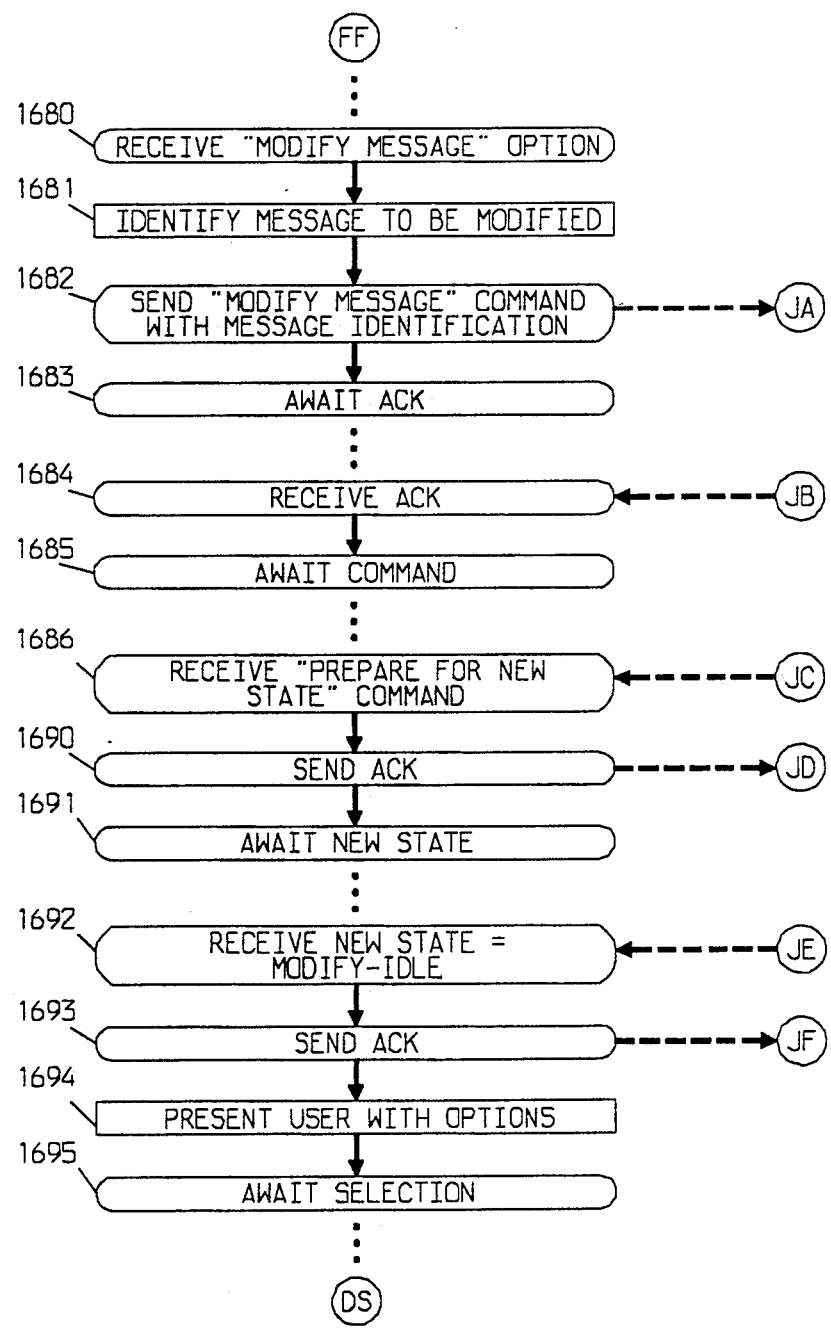
Figure 102:
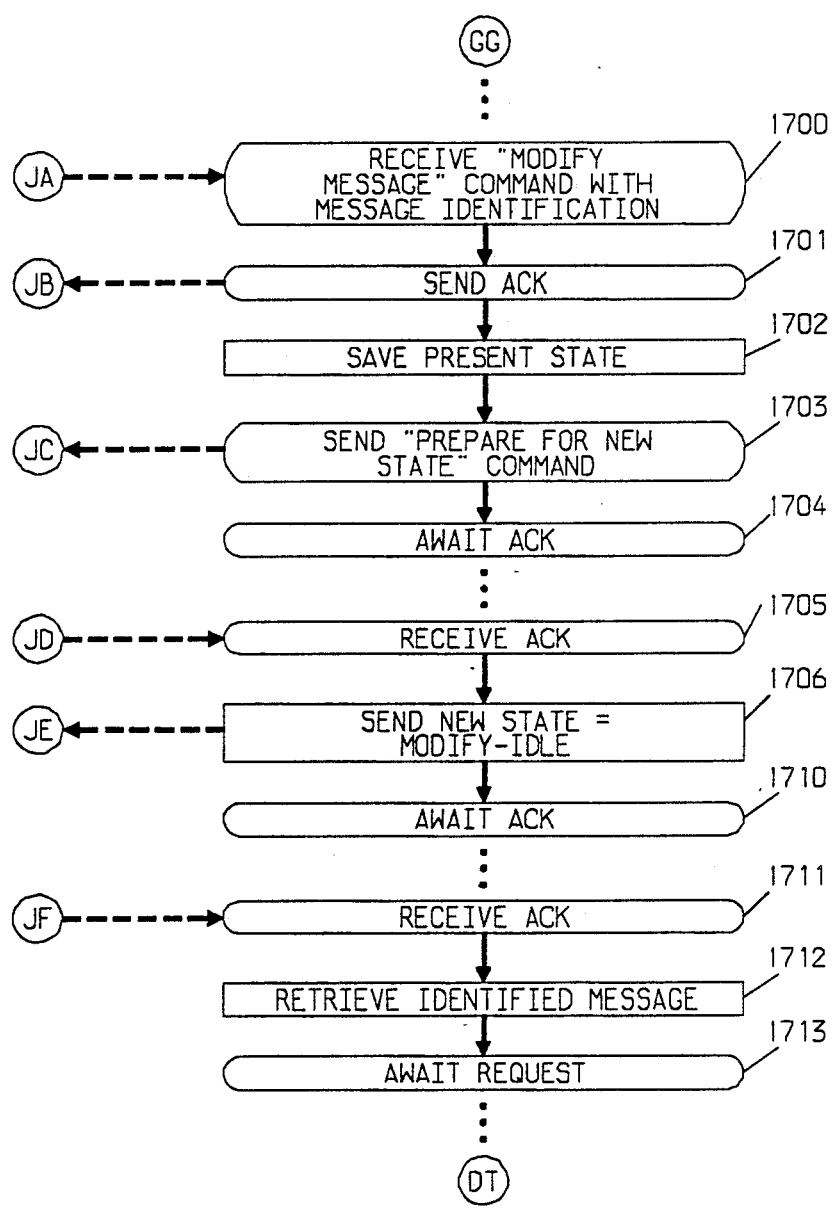

In FIG. 11 a "modify message" option and associated transition replace the "play message" option and transition of FIG. 5. Selection of the "modify message" option causes functions 30 and 31 to make a transition 3150 to "modify-idle" state 3304 of FIG. 12. The activities performed by functions 30 and 31 in response to this selection are shown in FIGS. 101 and 102, respectively. A comparison of FIGS. 101 and 102 with FIGS. 49 and 52 reveals that the activities performed in response to selection of the "modify message" option in scan-outgoing states 3000 and 3003–3004 are substantially identical to those performed in response to selection of the "play message" option in scan-incoming states 2030–2032, the exception being that function 30 sends the "modify message" and not the "play message" command in step 1682, function 31 specifies the new state to be "modify-idle" state 3304 of FIG. 12 and not "disposition-play" state 2060 of FIG. 6 in step 1706, and function 31 merely causes voice-call processing of system 16 to retrieve the identified message, but not to play it yet, at step 1712.

Figure 12:
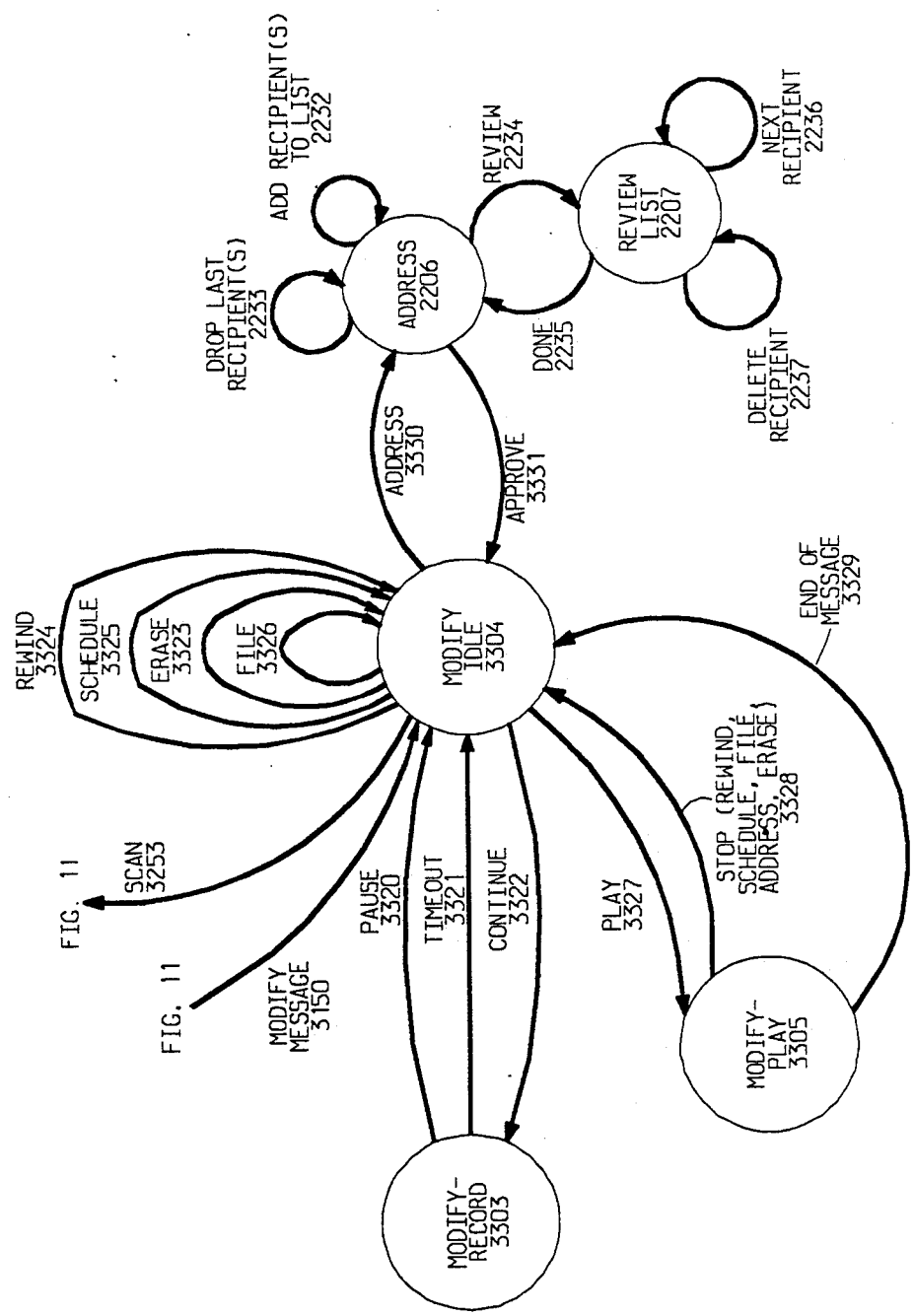

Selection of the "modify message" option offers the user substantially the same possibilities relating to outgoing message creation as does the "create message" option—one of the response options available for incoming messages. This is clearly seen from a comparison of FIG. 12 with FIG. 8, which comparison reveals the figures to be substantially identical. The exception is the lack of availability of the "delete" option in the states of FIG. 12: deletion of the old outgoing message is performed automatically therein. Because the outgoing message already exists in the scan-outgoing states 3000 and 3003–3004 of FIG. 12, there is no need to record it first, unlike in the case of the incoming message states. It is for this reason that the "modify message" option sends functions 30 and 31 into the idle state of FIG. 12, whereas the "create message" option sends functions 30 and 31 into "response-record" state 2203 of FIG. 8. Except for the state and transition numbers, the state of entry, and the "delete" option, FIGS. 8 and 12 are identical. To the extent that they are identical, the discussion and flow diagrams applicable to FIG. 8 apply to FIG. 12 as well.

Figure 103:
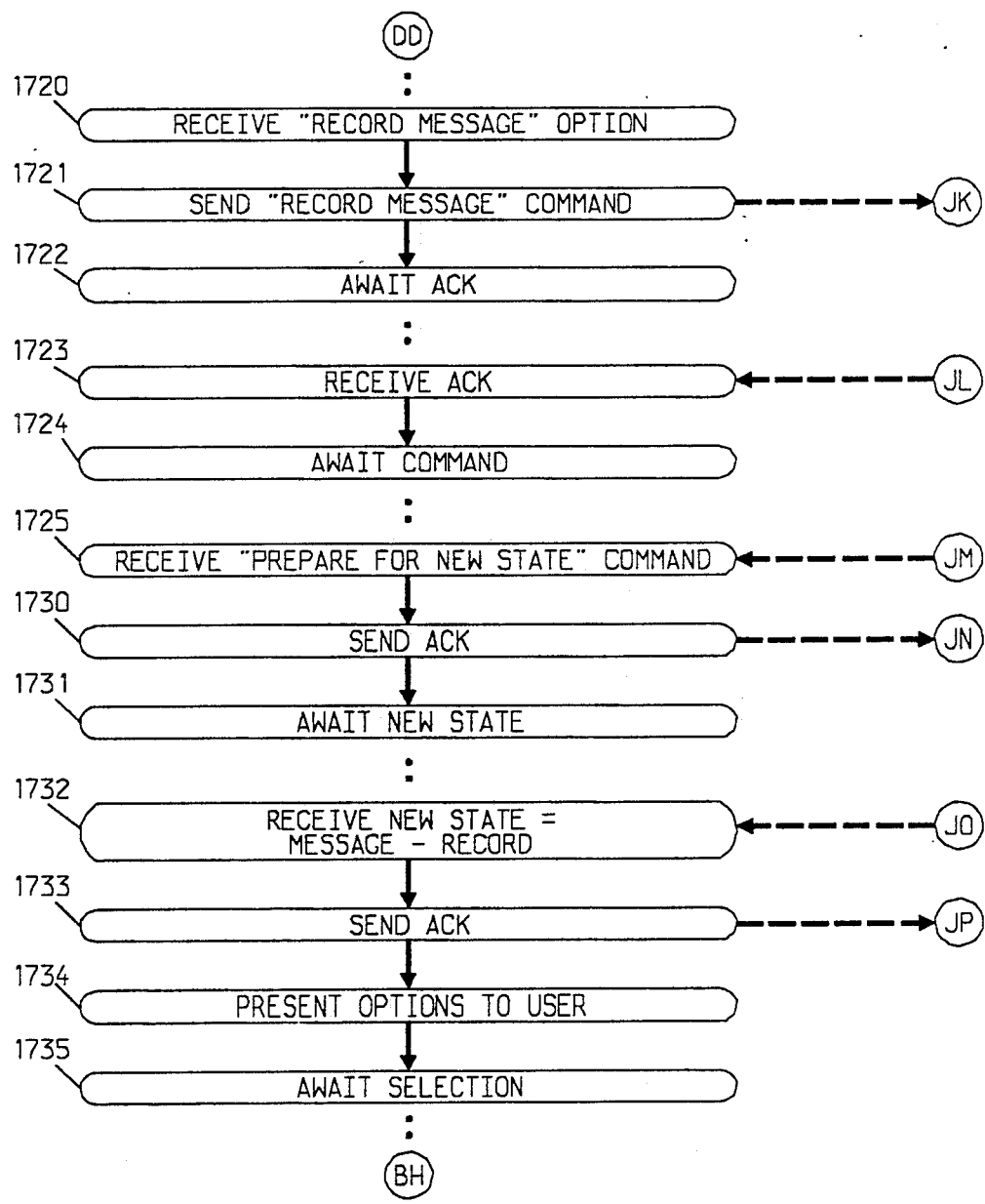
Figure 104:
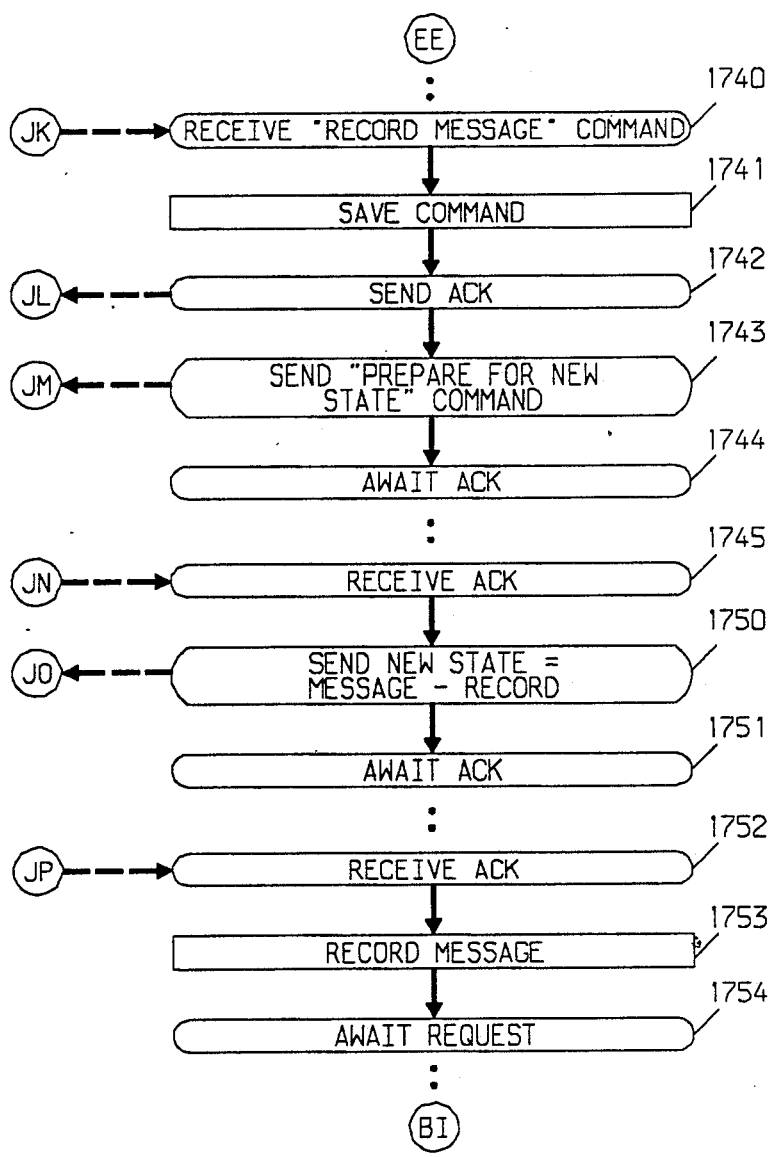

Once again returning to the options available to a user in "activity menu" state 2006 of FIGS. 2 and 3, the "record message" option will be considered next. Selection of this option causes functions 30 and 31 to make a state transition 2016 to "message-record" state 3503 of FIG. 13. The activities performed by functions 30 and 31 in response to this selection are shown in FIGS. 103 and 104 respectively. A comparison of FIGS. 101 and 102 with FIGS. 83 and 84 shows that the activities performed in response to selection of the "record message" option in "activity menu" state 2006 are substantially identical to those performed in response to selection of the "create message" option in one of the disposition states 2060 and 2061 of FIG. 6, the exceptions being that function 30 sends the "record message" and not the "create" command in step 1721, and function 31 specifies the new state to be "message-record" state 3503 and not "response-record" state 2203 in step 1750.

Selection of the "record message" option in "activity menu" state 2006 offers the user substantially the same possibilities relating to outgoing message creation as does the "create message" option available for incoming messages. This is clearly seen from a comparison of FIG. 13 with FIG. 8, comparison shows the figures to be substantially identical. The exception is again the lack of availability of the "delete" option in the states of FIG. 13, which deletion is again performed automatically therein. Except for the state and transition numbers, the only further difference between FIGS. 8 and 13 is the availability of the "return to activity menu" option instead of the "scan" option in FIG. 13. To the extent that the two figures are identical, the discussion and flow diagrams applicable to FIG. 8 apply to FIG. 13 as well.

Selection of the "return to activity menu" option in "message-idle" state 3504 causes functions 30 and 31 to make a transition 3562 to "activity menu" state 2006 of FIGS. 2 and 3. The activities performed by functions 30 and 31 in response to selection of this option are and 31 in response to selection of this option are shown in FIGS. 23 and 24, respectively.

The last option available in "activity menu" state 2006 of FIGS. 2 and 3 is the "greeting" option. Its selection causes functions 30 and 31 to make a transition 2015 to "greeting-idle" state 3601 of FIG. 14. The activities performed by functions 30 and 31 in response to this selection are shown in FIGS. 105 and 106, respectively.

Figure 105:
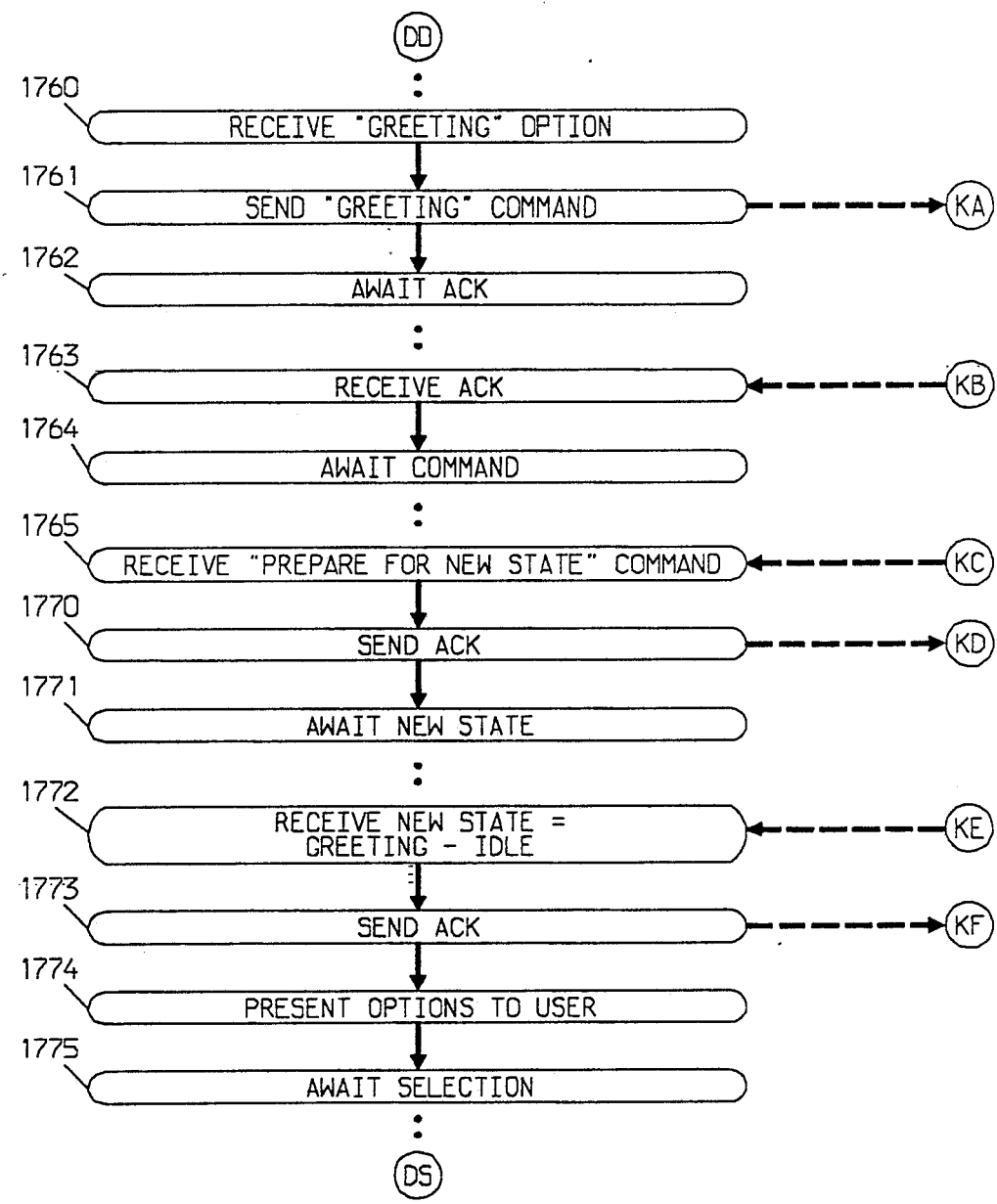

In response to receiving the user's selection of the "greeting" option, at step 1760 of FIG. 105, function 30 sends a "greeting" command to system 16 over the data channel, at step 1761, and then waits for an acknowledgment, at step 1762. Upon receipt thereof, at step 1763, function 30 waits for a command from system 16, at step 1764.

Figure 106:
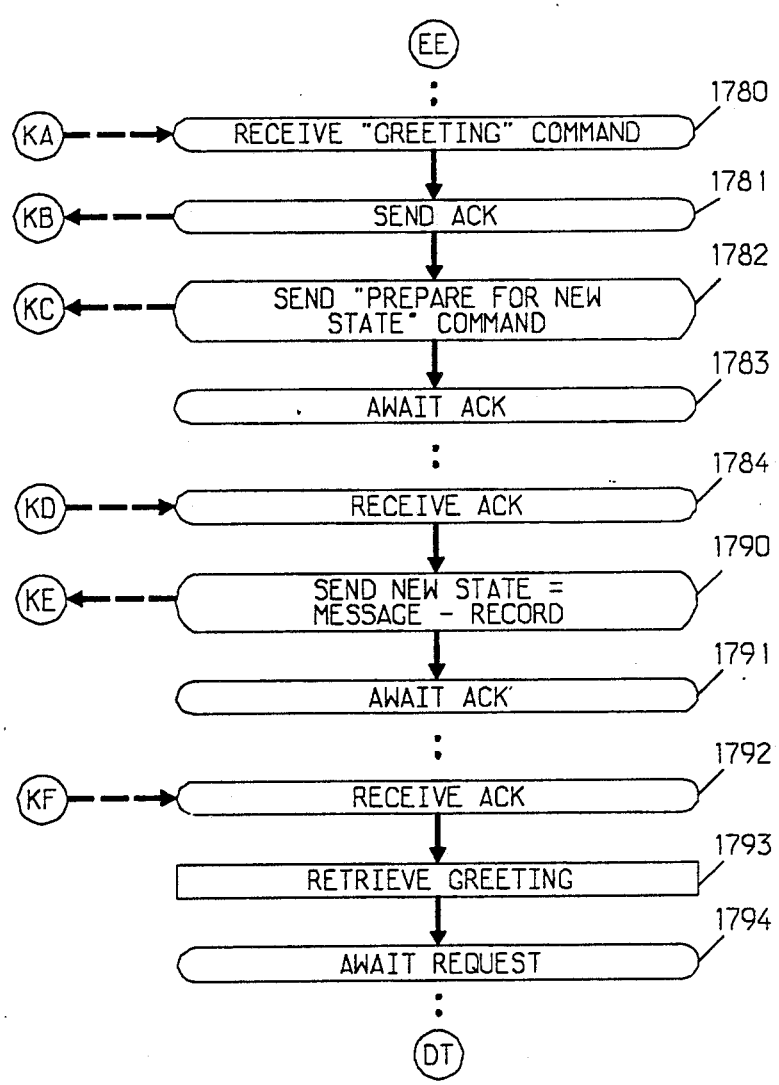

Function 31 receives the "greeting" command, at step 1780 of FIG. 106, acknowledges it, at step 1781, and then sends a "prepare for new state" command to terminal 11 over the data channel, at step 1782. Function 31 then waits for an acknowledgment, at step 1783, and upon receiving it, at step 1784, sends an indication to function 30 that the new state is "greeting-idle" state 3619, at step 1790, and waits for an acknowledgment, at step 1791. When the acknowledgment is received, at step 1792, function 31 informs voice-call processing of system 16 of the "greeting" command to cause it to retrieve the greeting and prepare to administer it, at step 1793. Function 31 then awaits a new request from terminal 11, at step 1794.

When function 30 receives the "prepare for new state" command, at step 1765 of FIG. 105, it acknowledges it, at step 1770, and then waits to receive the new state, at step 1771. Upon receipt of the new state indication, at step 1772, function 30 acknowledges it, at step 1773, and presents the options that are available in that state to the user, at step 1774. Function 30 then waits for the user's selection of one of those options, at step 1775.

The "greeting" option enables the user to administer his or her greeting. The activities involved therein are substantially identical to those involved in creating and administering an outgoing message. But because the greeting is not an outgoing message, it need not be addressed. Hence, selection of the "greeting" option offers the user substantially the same possibilities relating to message creation as does any one of the "reply" options available for incoming messages. This is made clear by comparing FIG. 14 with FIG. 7, which comparison shows the figures to be identical in many respects. Because the greeting already may exist when the "greeting" option is selected, there may be no need to record it first, unlike in the case of an incoming message reply. It is for this reason that the "greeting" option sends functions 30 and 31 into the idle state of FIG. 14, whereas the "reply" options send functions 30 and 31 into the record state of FIG. 7.

A comparison of FIG. 7 with FIG. 14 also shows that the "scan", "schedule", and "file" options available in "reply-idle" state 2201 of FIG. 7 have been replaced in FIG. 14 with the "return to activity menu", "activate", and "inactivate" options, respectively, available in "greeting-idle" state 3601, and that the "delete" option has been eliminated. Deletion of the old greeting is done automatically in the states of FIG. 14.

Selection of the "return to activity menu" option in "greeting-idle" state 3601 of FIG. 14 causes functions 30 and 31 to make a transition 3662 to "activity menu" state 2006 of FIGS. 2 and 3. The activities performed by functions 30 and 31 in reponse to selection of this option are shown in FIGS. 23 and 24, respectively.

Selection of the "activate" option causes functions 30 and 31 31 to make a transition 3660 in FIG. 14 without changing state. The activities performed by functions 30 and 31 in response to this option are shown in FIGS. 107 and 108, respectively.

In response to receiving the user's selection of the "activate" option, at step 1800 of FIG. 107, function 30 sends an "activate" command to system 16 over the data channel, at step 1801, and awaits an acknowledgment, at step 1802.

Function 31 receives the "activate" command, at step 1820 of FIG. 108, and passes it on to voice-call processing of system 16 to effect conventional activation of the greeting, at step 1821. Function 31 then waits for a notice from voice-call processing regarding whether or not the activation succeeded, at step 1822. If the activation fails—for example, because the user has not recorded a greeting—function 31 receives a failure notice, at step 1830, and in response sends an acknowledgment along with the failure notice to terminal 11, at step 1831. If it receives a notice indicating that the activation succeeded, at step 1823, function 31 sends an acknowledgment along with the success notice to terminal 11, at step 1824. Following either step 1824 or step 1831, function 31 returns to step 1794 to await a new request from terminal 11, at step 1832.

When it receives the acknowledgment from function 31, at step 1803 of FIG. 107, function 30 checks the accompanying indication to determine whether the activation succeeded or failed, at step 1804. If activation succeeded, function 30 presents a success notice to the user, at step 1805; if it failed, function 30 presents a failure notice, at step 1806. Function 30 then returns to step 1775 to await another user selection, at step 1807.

Selection of the "deactivate" option causes functions 30 and 31 to make a transition 3661 in FIG. 14 without changing state. The activities performed by functions 30 and 31 in response to this option are shown in FIGS. 109 and 110, respectively.

Figure 109:
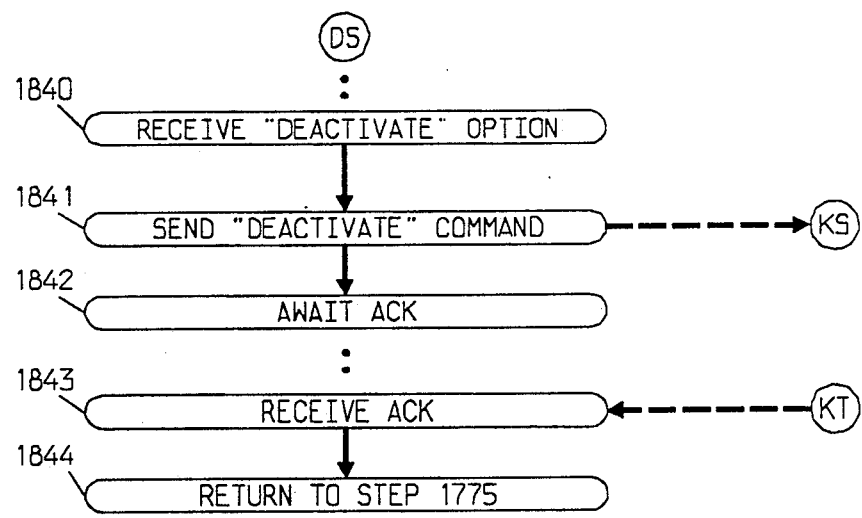

In response to receiving the user's selection of the "deactivate" option, at step 1840 of FIG. 109, function 30 sends a "deactivate" command to system 16 over the data channel, at step 1841, and waits for an acknowledgment, at step 1842.

Function 31 receives the "deactivate" command, at step 1850 of FIG. 110, and passes it on to voice-call processing of system 16 to effect conventional deactivation of the greeting, at step 1851. Function 31 then acknowledges the command, at step 1852, and returns to step 1794 of FIG. 106 to await further requests from terminal 11, at step 1853.

When it receives the acknowledgment from function 31, at step 1843 of FIG. 109, function 30 returns to step 1775 of FIG. 103 to wait for another user selection, at step 1844.

Of course, various changes and modifications to the illustrative embodiment described above will be apparent to those skilled in the art. Such changes and modifications can be made without departing from the spirit and the scope of the invention and without diminishing its attendant advantages. It is therefore intended that such changes and modifications be covered by the following claims.

We claim:

1. A voice and data interface to a voice message service system, comprising:
   means for coupling a plurality of voice communication channels to the system;
   means for coupling a plurality of data communication channels to the system at a same time as the plurality of voice channels are coupled to the system;
   means for pairing coupled voice and coupled data channels, each channel pair for use in a different communication session, including
   means for transmitting a unique identifier on a channel of one of the coupled voice and data channels, and
   means responsive to receipt of the unique identifier on a channel of the other of the coupled voice and data channels for pairing the channel on which the unique identifier was transmitted with the channel on which the unique identifier was received; and means responsive to control communications received over the data channel of a channel pair for providing over the voice and data channels of the channel pair those system services that are requested by the control communications received over the data channel of the channel pair, including communicating data responses to the received control communications over the data channel of the channel pair and communicating voice messages specified by the received control communications over the voice channel of the channel pair.

2. The interface of claim 1 wherein
the providing means communicates voice message headers that are specified by the control communications received over the data channel of a channel pair, in textual form over the data channel of channel pair.

3. The interface of claim 1 wherein
the providing means plays voice messages that are specified by the control communications received over the data channel of a channel pair, over the voice channel of the channel pair.

4. The interface of claim 1 wherein
the providing means records voice messages that are specified by the control communications received over the data channel of a channel pair, over the voice channel of the channel pair.

5. The interface of claim 1 wherein
the providing means comprises:
means responsive to a request for a voice message header received over the data channel of a channel pair, for transmitting the voice message header from the system over the data channel of the channel pair; and
means responsive to a request for a voice message received over the data channel of the channel pair, for transmitting the voice message from the system over the voice channel of the channel pair.

6. The interface of claim 1 wherein
the providing means comprises:
means responsive to a request for a voice message header received over the data channel of a channel pair, for transmitting at least one voice message header from the system over the data channel of the channel pair; and
means responsive to receipt over the data channel of the channel pair of a request for a voice message corresponding to a selected header that has been transmitted over the data channel of the channel pair, for transmitting the corresponding voice message from the system over the voice channel of the channel pair.

7. A voice and data interface to a voice message service system, comprising:
means for terminating a voice communication channel from the system;
means for terminating a data communication channel from the system contemporaneously with termination of the voice channel;
means for pairing the terminated voice channel and the terminated data channel for use in a single communication session with the system, including
means for receiving a unique identifier from the system on one of the voice channel and the data channel, and means for transmitting the unique identifier to the system on the other of the voice channel and the data channel to signal the pairing of the voice channel and the data channel to the system;

means for sending control communications to the system over the data channel of the channel pair to effect activities of the voice message service system, and for receiving data responses to the sent control communications over the data channel of the channel pair; and means for communicating over the voice channel of the channel pair voice messages that are specified by the control communications sent over the data channel of the channel pair.

8. The interface of claim 7 wherein
the sending and receiving means receives voice message headers that are specified by the sent control communications, in textual form over the data channel of the channel pair.

9. The interface of claim 7 wherein
the communicating means receives voice messages that are specified by the sent control communications and that are played by the system over the voice channel of the channel pair, in response to the sent control communications.

10. The interface of claim 7 wherein
the communicating means transmits over the voice channel of the channel pair voice messages that are specified by the sent control communications, for recording by the system in response to the sent control communications.

11. The interface of claim 9 wherein
the sending means comprises
means for sending a request for a voice message header and a request for a voice message over the data channel of the channel pair to the system, and for receiving the requested voice message header over the data channel of the channel pair from the system; and wherein
the communicating means comprises
means for receiving the requested voice message over the voice channel of the channel pair from the system.

12. The interface of claim 11 further comprising:
means for visually displaying the received voice message header; and
means for aurally playing the received voice message.

13. The interface of claim 7 wherein
the sending means comprises
means for selecting a voice message header from among a plurality of received voice message headers, and
means for sending a request for a voice message header and a request for a voice message corresponding to the selected voice message header over the data channel of the channel pair to the system, and for receiving at least one voice message header from the system over the data channel of the channel pair in response to the request for a voice message header; and wherein
the communicating means comprises
means for receiving the voice message corresponding to the selected voice message header from the system over the voice channel of the channel pair in response to the request for a voice message.

14. The interface of claim 13 further comprising
means for visually displaying received voice message headers, and means for aurally playing the received voice message; and wherein the selecting means comprises means for receiving user input identifying a displayed voice message header.

15. A method of providing concurrent voice and data access to a voice message service system that may have a plurality of voice channels and a plurality of data channels coupled thereto concurrently, comprising the steps of:

concurrently coupling at least one voice communication channel and at least one data communication channel to the system;

pairing the coupled voice channels and the coupled data channels, each channel pair for use in a different communication session, by transmitting a unique identifier on a channel of one of the coupled voice channels and data channels, receiving the unique identifier on a channel of the other of the coupled voice channels and data channels, and pairing the channel on which the unique identifier was transmitted with the channel on which the unique identifier was received;

receiving control communications over the data channel of a channel pair;

effecting activities of the voice message service system that are requested by the received control communications;

communicating data responses to control communications that were received over the data channel of the channel pair, over the data channel of the channel pair; and communicating voice messages specified by control communications that were received over the data channel of the channel pair, over the voice channel of the channel pair.

16. The method of claim 15 wherein the step of communicating data responses comprises the step of:

communicating voice message headers that are specified by the received control communications, in textual form over the data channel of the channel pair.

17. The method of claim 15 wherein the step of communicating voice messages comprises the step of:

playing voice messages that are specified by the received control communications, over the voice channel of the channel pair.

18. The method of claim 15 wherein the step of communicating voice messages comprises the step of:

recording voice messages that are specified by the received control communications, over the voice channel of the channel pair.

19. The method of claim 15 wherein the step of receiving control communications comprises the steps of receiving a request for a voice message header over the data channel of the channel pair, and receiving a request for a voice message over the data channel of the channel pair; wherein the step of communicating data responses comprises the step of transmitting the requested voice message header from the system over the data channel of the channel pair; and wherein the step of communicating voice messages comprises the step of transmitting the requested voice message from the system over the voice channel of the channel pair.

20. The method of claim 15 wherein the step of receiving control communications comprises the steps of receiving a request for a voice message header over the data channel of the channel pair, and receiving over the data channel of the channel pair a request for a voice message corresponding to a selected header that has been transmitted over the data channel of the channel pair; wherein the step of communicating data responses comprises the step of transmitting at least one voice message header from the system over the data channel of the channel pair; and wherein the step of communicating voice messages comprises the step of transmitting the corresponding voice message from the system over the voice channel of the channel pair.

21. A method of providing concurrent voice and data access to a voice message service system that may have a plurality of voice channels and a plurality of data channels coupled thereto concurrently, comprising the steps of:

concurrently terminating a voice communication channel and a data communication channel from the system;

pairing the terminated voice channel and the terminated data channel for use in a single communication session with the system, by receiving a unique identifier from the system on one of the voice channel and the data channel, and transmitting the unique identifier to the system on the other of the voice channel and the data channel to signal the pairing of the voice channel and the data channel to the system;

sending control communications to the system over the data channel of the channel pair to effect activities of the voice message service system;

receiving data responses to the sent control communications over the data channel of the channel pair; and communicating over the voice channel of the channel pair voice messages that are specified by the control communications sent over the data channel of the channel pair.

22. The method of claim 21 wherein the step of receiving data responses comprises the step of:

receiving voice message headers that are specified by the sent control communications, in textual form over the data channel of the channel pair.

23. The method of claim 21 wherein the step of communicating voice messages comprises the step of:

receiving over the voice channel of the channel pair those voice messages that are specified by the sent control communications and that are played by the system in response to the sent control communications.

24. The method of claim 21 wherein the step of communicating voice messges comprises the step of:

transmitting over the voice channel of the channel pair those voice messages that are specified by the sent control communications, for recording by the system in response to the sent control communications.

25. The method of claim 21 wherein
the step of sending control communications comprises the step of
sending a request for a voice message header and a request for a voice message over the data channel of the channel pair to the system; wherein
the step of receiving data responses comprises the step of
receiving the requested voice message header over the data channel of the channel pair from the system; and wherein
the step of communicating voice messages comprises the step of
receiving the requested voice message over the voice channel of the channel pair from the system.

26. The method of claim 25 further comprising the steps of:
visually displaying the received voice message header; and
aurally playing the received voice message.

27. The method of claim 21 wherein
the step of sending control communications comprises the steps of
selecting a voice message header from among a plurality of received voice message headers, and
sending a request for a voice message header and a request for a voice message corresponding to the selected voice message header over the data channel of the channel pair to the system; wherein
the step of receiving data responses comprises the step of
receiving at least one voice message header from the system over the data channel of the channel pair in response to the request for a voice message header; and wherein
the step of communicating voice messages comprises the step of
receiving the voice message corresponding to the selected voice message header from the system over the voice channel of the channel pair in response to the request for a voice message.

28. The method of claim 27 further comprising the steps of visually displaying received voice message headers, and aurally playing the received voice message; and wherein the step of selecting comprises the step of receiving user input identifying a displayed voice message header.

29. The method of claim 21 wherein
the step of receiving a unique identifier comprises the step of
receiving a unique identifier sent by the system on one of the terminated voice channel and the terminated data channel; and wherein
the step of transmitting the unique identifier comprises the step of
transmitting the unique identifier on the other of the terminated voice channel and the terminated data channel for receipt by the system to cause the system to pair the channel on which the system sent the identifier with the channel on which the system receives the identifier.

* * * * *